United States Patent
Lee et al.

(10) Patent No.: US 7,370,681 B2
(45) Date of Patent: *May 13, 2008

(54) SUBSTRATE BONDING APPARATUS FOR LIQUID CRYSTAL DISPLAY DEVICE

(75) Inventors: Sang Seok Lee, Taegu-kwangyokshi (KR); Myoung Gu Kang, Youngju-shi (KR); Young Kug Lim, Kyongsangbuk-do (KR); Soo Min Kwak, Kyongsangbuk-do (KR); Jong Han Kim, Taegu-kwangyokshi (KR); Heung Sun Kim, Yongin-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 277 days.

This patent is subject to a terminal disclaimer.

(21) Appl. No.: 10/712,936

(22) Filed: Nov. 14, 2003

(65) Prior Publication Data
US 2004/0114095 A1    Jun. 17, 2004

(30) Foreign Application Priority Data
Nov. 16, 2002  (KR) ............. 10-2002-0071367
Nov. 16, 2002  (KR) ............. 10-2002-0071369
Nov. 18, 2002  (KR) ............. 10-2002-0071712
Nov. 18, 2002  (KR) ............. 10-2002-0071713

(51) Int. Cl.
*B32B 41/00*  (2006.01)
*B32B 41/02*  (2006.01)
*B32B 37/10*  (2006.01)

(52) U.S. Cl. ............... 156/351; 156/358; 156/378; 156/379

(58) Field of Classification Search ........... 156/358, 156/351, 379, 378, 381, 382, 580, 556, 581; 29/833, 834
See application file for complete search history.

(56) References Cited

U.S. PATENT DOCUMENTS

| | | | |
|---|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |

(Continued)

FOREIGN PATENT DOCUMENTS

EP    1 003 066 A1    5/2000

(Continued)

OTHER PUBLICATIONS

Machine Translation of JP 2001-356353, submitted with IDs filed on Dec. 16, 2003.*

*Primary Examiner*—George Koch
(74) *Attorney, Agent, or Firm*—McKenna Long & Aldridge, LLP

(57) ABSTRACT

A substrate bonding apparatus for fabricating an LCD device aligns upper and lower stages to accurately bond first and second substrates. The distance to which the upper and lower substrates are spaced apart from each other during bonding is adjustable depending on the determined thickness of the first and second substrates. Further, sealant material disposed on a substrate may be prevented from becoming contaminated by foreign material.

105 Claims, 45 Drawing Sheets

U.S. PATENT DOCUMENTS

| | | |
|---|---|---|
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,766,407 A * | 6/1998 | Miwa et al. ............... 156/382 |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato |
| 5,952,678 A | 9/1999 | Ashida |
| 5,956,112 A | 9/1999 | Fujimori et al. |
| 5,979,739 A * | 11/1999 | Jin et al. ..................... 228/6.2 |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | von Gutfeld |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 6,837,672 B1 * | 1/2005 | Tateyama et al. ............ 414/815 |
| 2001/0005669 A1* | 6/2001 | Lofaro ....................... 451/398 |
| 2001/0021000 A1 | 9/2001 | Egami |
| 2002/0062787 A1* | 5/2002 | Hashizume et al. ........ 118/664 |

FOREIGN PATENT DOCUMENTS

| | | |
|---|---|---|
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | 62-054225 | 3/1987 |
| JP | 62-054228 | 3/1987 |
| JP | 62-054229 | 3/1987 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | 03-009549 | 1/1991 |
| JP | 05-036425 | 2/1993 |
| JP | 05-036426 | 2/1993 |
| JP | 05-107533 | 4/1993 |
| JP | 05-127179 A1 | 5/1993 |
| JP | 05-154923 | 6/1993 |
| JP | 05-265011 A1 | 10/1993 |
| JP | 05-281557 A1 | 10/1993 |
| JP | 05-281562 A1 | 10/1993 |
| JP | 06-018829 | 1/1994 |
| JP | 06-051256 A1 | 2/1994 |
| JP | 06-061328 * | 3/1994 |
| JP | 06-064229 | 3/1994 |
| JP | 06-148657 A1 | 5/1994 |
| JP | 06-160871 | 6/1994 |
| JP | 06-194637 | 7/1994 |
| JP | 06-235925 | 8/1994 |
| JP | 06-265915 A1 | 9/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | 07-275770 | 10/1995 |
| JP | 07-275771 | 10/1995 |
| JP | 08-076133 | 3/1996 |
| JP | 08-095066 A1 | 4/1996 |
| JP | 08-101395 | 4/1996 |
| JP | 08-106101 A1 | 4/1996 |
| JP | 08-110504 | 4/1996 |
| JP | 08-136937 | 5/1996 |
| JP | 08-171094 A1 | 7/1996 |
| JP | 08-173874 | 7/1996 |
| JP | 08-190099 A1 | 7/1996 |
| JP | 08-240807 A1 | 9/1996 |
| JP | 09-001026 | 1/1997 |
| JP | 09-005762 A1 | 1/1997 |
| JP | 09-026578 A1 | 1/1997 |
| JP | 09-061829 | 3/1997 |
| JP | 09-073075 A1 | 3/1997 |
| JP | 09-073096 A1 | 3/1997 |
| JP | 09-094500 | 4/1997 |
| JP | 09-096822 | 4/1997 |
| JP | 09-127528 A1 | 5/1997 |
| JP | 09-230357 A1 | 9/1997 |
| JP | 09-281511 A1 | 10/1997 |
| JP | 09-311340 A1 | 12/1997 |
| JP | 10-123537 A1 | 5/1998 |
| JP | 10-123538 A1 | 5/1998 |
| JP | 10-142616 A1 | 5/1998 |
| JP | 10-174924 | 6/1998 |
| JP | 10-177178 | 6/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 A1 | 1/1999 |
| JP | 11-038424 A1 | 2/1999 |
| JP | 11-064811 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | 11-262712 | 9/1999 |
| JP | 11-264991 | 9/1999 |
| JP | 11-326922 | 11/1999 |
| JP | 11-344714 A1 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |

| | | | | | | |
|---|---|---|---|---|---|---|
| JP | 2001-005401 | 1/2001 | | JP | 2002-082340 A1 | 3/2002 |
| JP | 2001-005405 | 1/2001 | | JP | 2002-090759 A1 | 3/2002 |
| JP | 2001-013506 | 1/2001 | | JP | 2002-090760 A1 | 3/2002 |
| JP | 2001-033793 | 2/2001 | | JP | 2002-107740 A1 | 4/2002 |
| JP | 2001-042341 | 2/2001 | | JP | 2002-122870 | 4/2002 |
| JP | 2001-051284 | 2/2001 | | JP | 2002-122872 A1 | 4/2002 |
| JP | 2001-066615 | 3/2001 | | JP | 2002-122873 A1 | 4/2002 |
| JP | 2001-091727 | 4/2001 | | JP | 2002-0034881 | 5/2002 |
| JP | 2001-117105 | 4/2001 | | JP | 2002-131762 | 5/2002 |
| JP | 2001-117109 | 4/2001 | | JP | 2002-139734 | 5/2002 |
| JP | 2001-133745 | 5/2001 | | JP | 2002-156518 | 5/2002 |
| JP | 2001-133794 | 5/2001 | | JP | 2002-169166 | 6/2002 |
| JP | 2001-133799 | 5/2001 | | JP | 2002-169167 | 6/2002 |
| JP | 2001-142074 | 5/2001 | | JP | 2002-182222 | 6/2002 |
| JP | 2001-147437 | 5/2001 | | JP | 2002-202512 A1 | 7/2002 |
| JP | 2001-154211 | 6/2001 | | JP | 2002-202514 A1 | 7/2002 |
| JP | 2001-166272 | 6/2001 | | JP | 2002-214626 A1 | 7/2002 |
| JP | 2001-166310 | 6/2001 | | JP | 2002-229042 | 8/2002 |
| JP | 2001-183683 | 7/2001 | | JP | 2002-236276 | 8/2002 |
| JP | 2001-209052 | 8/2001 | | JP | 2002-236292 | 8/2002 |
| JP | 2001-209056 | 8/2001 | | JP | 2002-258299 | 9/2002 |
| JP | 2001-209057 | 8/2001 | | JP | 2002-277865 | 9/2002 |
| JP | 2001-209058 | 8/2001 | | JP | 2002-277866 | 9/2002 |
| JP | 2001-209060 | 8/2001 | | JP | 2002-277881 | 9/2002 |
| JP | 2001-222017 | 8/2001 | | JP | 2002-287156 | 10/2002 |
| JP | 2001-235758 | 8/2001 | | JP | 2002-296605 | 10/2002 |
| JP | 2001-215459 | 9/2001 | | JP | 2002-311438 | 10/2002 |
| JP | 2001-255542 | 9/2001 | | JP | 2002-311440 | 10/2002 |
| JP | 2001-264782 | 9/2001 | | JP | 2002-311442 | 10/2002 |
| JP | 2001-201750 | 10/2001 | | JP | 2002-323687 | 11/2002 |
| JP | 2001-272640 | 10/2001 | | JP | 2002-323694 | 11/2002 |
| JP | 2001-281675 | 10/2001 | | JP | 2002-333628 | 11/2002 |
| JP | 2001-281678 | 10/2001 | | JP | 2002-333635 | 11/2002 |
| JP | 2001-282126 | 10/2001 | | JP | 2002-333843 | 11/2002 |
| JP | 2001-305563 | 10/2001 | | JP | 2002-341329 | 11/2002 |
| JP | 2001-330837 | 11/2001 | | JP | 2002-341355 | 11/2002 |
| JP | 2001-330840 A1 | 11/2001 | | JP | 2002-341356 | 11/2002 |
| JP | 2001-356353 | 12/2001 | | JP | 2002-341357 | 11/2002 |
| JP | 2001-356354 A1 | 12/2001 | | JP | 2002-341358 | 11/2002 |
| JP | 2002-014360 A1 | 1/2002 | | JP | 2002-341359 | 11/2002 |
| JP | 2002-023176 A1 | 1/2002 | | JP | 2002-341362 | 11/2002 |
| JP | 2002-049045 A1 | 2/2002 | | KR | 2000-035302 A1 | 6/2000 |
| JP | 2002-079160 | 3/2002 | | | | |
| JP | 2002-080321 | 3/2002 | | * cited by examiner | | |

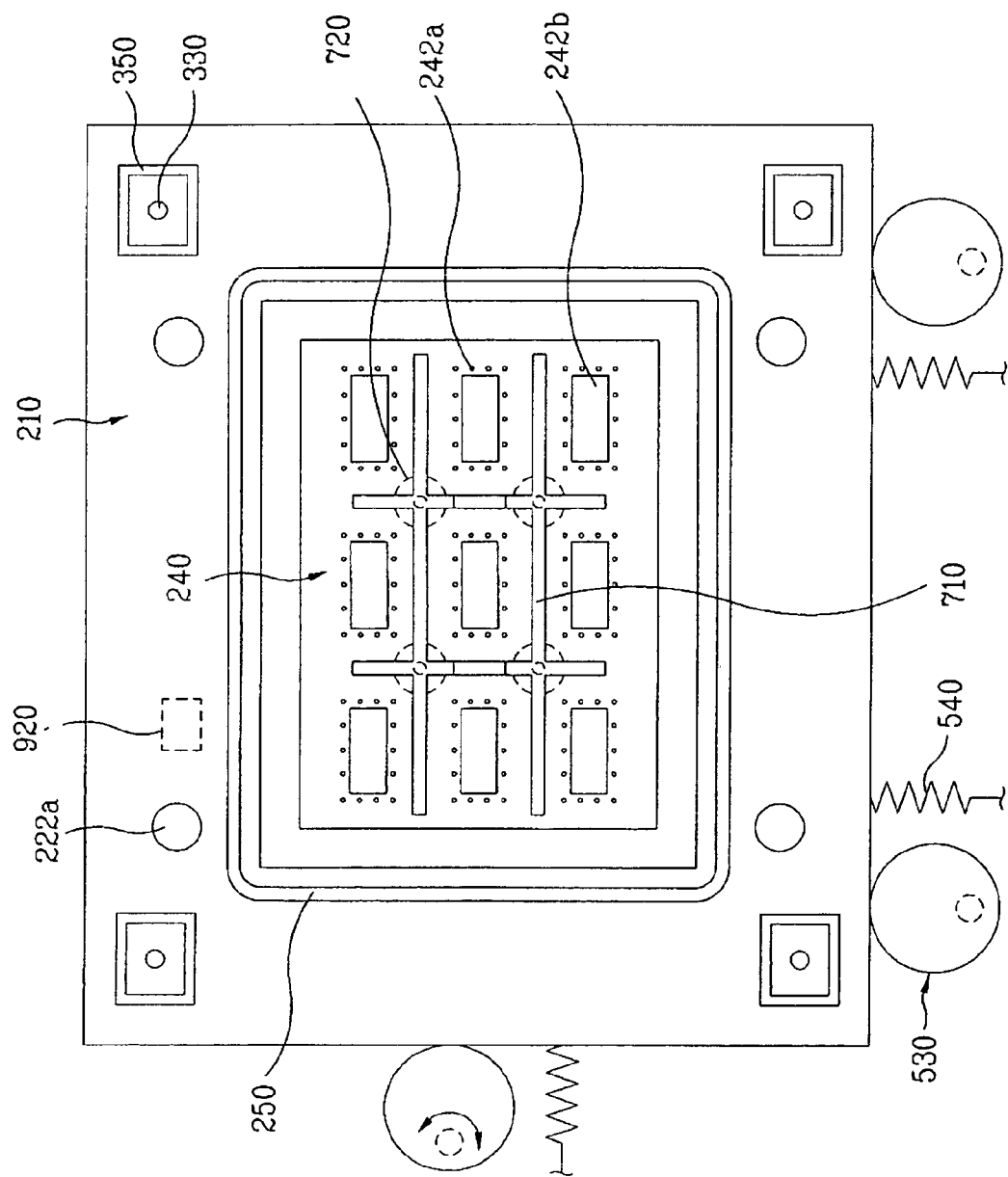

SUBSTRATE BONDING APPARATUS FOR LIQUID CRYSTAL DISPLAY DEVICE

This application claims the benefit of the Korean Application Nos. P2002-71367 and P2002-71369, both filed on Nov. 16, 2002, and P2002-71712 and P2002-71713, both filed on Nov. 18, 2002, which are hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to an apparatus used in fabricating liquid crystal display (LCD) devices. More particularly, the present invention relates to a substrate bonding apparatus used in fabricating (LCD) devices.

2. Discussion of the Related Art

As the development of diverse types of information devices proliferate and become available to consumers, demands on displays used by the information devices have increased. To meet such demands, many types of flat panel display devices including Liquid Crystal Display (LCD) devices, Plasma Display Panels (PDP), Electro Luminescent Display (ELD), Vacuum Fluorescent Display (VFD), etc., are currently being developed and, in some instances, are actually employed as displays.

Among the various types of flat panel displays, LCD devices are commonly used as portable display devices. Due to their beneficial characteristics such as excellent picture quality (e.g., high resolution and luminance), light weight, thin profile, large display area, and low power consumption, LCD devices are commonly used in applications previously dominated by Cathode Ray Tubes (CRTs). Accordingly, LCD devices are commonly used as monitors of notebook computers, monitors of computers, as TVs capable of receiving and displaying broadcasting signals, etc.

Generally, LCD devices are fabricated according to liquid crystal injection or liquid crystal dispensing methods. Using related art liquid crystal injection methods, LCD devices are fabricated by bonding substrates together in a vacuum via sealant material, wherein the sealant material is patterned to define a liquid crystal injection hole. After being bonded, liquid crystal material is injected through the liquid crystal injection hole and between the bonded substrates. Japanese Laid Open Patent Nos. 2000-284295 (Japanese Patent Application 1999-089612) and 2001-005405 (Japanese Patent Application 1999-172903) can be understood to teach a related art liquid crystal dispensing method wherein liquid crystal material is dispensed directly onto a first substrate. Subsequently, the first substrate is bonded to a second substrate in a vacuum, wherein the dispensed liquid crystal material is arranged between the first and second substrates. Because the liquid crystal dispensing method dispenses liquid crystal material directly onto the first substrate prior to bonding, various time consuming steps (e.g., formation of the liquid crystal injection hole, injection of the liquid crystal, sealing of the liquid crystal injection hole, etc.), essential to the liquid crystal injection method, are not required. Accordingly, the liquid crystal dispensing method can be used to fabricate LCD devices in less time than the liquid crystal injection method. As a result, much research has been performed in developing apparatuses capable of fabricating LCD devices while implementing liquid crystal dispensing methods.

FIGS. 1 and 2 illustrate a related art substrate bonding apparatus for fabricating LCD devices according to a liquid crystal dispensing method.

Referring to FIGS. 1 and 2, a related art substrate bonding apparatus includes a frame 10, an upper stage 21, a lower stage 22, a sealant dispenser (not shown), a liquid crystal dispenser 30, an upper chamber unit 31, a lower chamber unit 32, chamber moving means, and stage moving means. The sealant dispenser and liquid crystal dispenser 30 are mounted at side positions of the frame 10. The upper chamber unit 31 can be selectively joined to the lower chamber unit 32. The chamber moving means includes a driving motor 40 for moving the lower chamber unit 32 to position S1, where sealant material and liquid crystal material can be dispensed onto a substrate, and to position S2, where substrates can be bonded together. The stage moving means includes a driving motor 50 for raising and lowering the upper stage 21 before, during, and after the substrates have been bonded. Having described the related art substrate bonding apparatus above, the process by which the related art substrate bonding apparatus fabricates an LCD device will now be described in greater detail below.

To fabricate an LCD device using the related art substrate bonding apparatus described above, a first substrate 51 is held by the upper stage 21 while a second substrate 52 is held by the lower stage 22, as shown in FIG. 1. Next, the chamber moving means moves the lower chamber unit 32, supporting the lower stage 22, to the position S1. Subsequently, sealant material and liquid crystal material are dispensed onto the second substrate 52 held by the lower stage 22. After sealant material and liquid crystal material are dispensed onto the second substrate 52, the chamber moving means moves the lower chamber unit 32 to position S2, as shown in FIG. 2, whereby the first and second substrates 51 and 52, respectively, can be bonded together. With the lower chamber unit 32 at position S2, the chamber moving means joins the upper chamber unit 31 to the lower chamber unit 32. Upon being joined, the upper chamber unit 31 and the lower chamber unit 32 define an interior space that encloses the upper and lower stages 21 and 22, respectively, and is sealed from an external environment by a sealing means (not shown). Using a vacuum means (not shown), the interior space is evacuated to create a vacuum. Within the evacuated interior space, the stage moving means lowers the upper stage 21 such that the first substrate 51, held by the upper stage 21, moves toward the second substrate 52, held by the lower stage 22. As the upper stage 21 descends, the first and second substrates 51 and 52, respectively, become bonded to each other, thereby completing fabrication of the LCD device.

Fabricating LCD devices using the related art substrate bonding apparatus, however, is disadvantageous because, the related art substrate bonding apparatus applies sealant and liquid crystal material to substrates supporting thin film transistors and color filter layers and bonds the two substrates together. Accordingly, the overall size of the related art substrate bonding apparatus can become excessively large. This is especially so when the related art substrate bonding apparatus is designed to fabricate large-sized LCD devices.

Moreover, a substantially high degree of alignment is required to position the lower chamber unit 32 and facilitate adequate bonding of the first and second substrates. However, since the lower chamber unit 32 must be re-positioned numerous times, such alignment can be extremely difficult to obtain and is an unduly time consuming process, lengthening the entire process of fabricating LCD devices.

Further, an imperfect seal can be formed between the joined upper and lower chamber units 31 and 32, respectively. As a result, air may leak or foreign materials may be introduced from the external environment into the interior space defined by the upper and lower chamber units and the substrates may become damaged during bonding, thereby creating a defective bond.

Still further, the related art substrate bonding apparatus described above is calibrated to bond substrates of a predetermined reference thickness. In practice, however, the actual thickness of substrates loaded into the related art substrate bonding apparatus often vary from the reference thickness. Accordingly, recalibrating the related art substrate bonding apparatus to adequately process substrates having an actual thickness different from the reference thickness can be difficult and consume excessive amounts of time.

Moreover, the related art substrate bonding apparatus often disposed sealant material onto the same surface of a substrate that contacts a substrate loader. Accordingly, sealant material can be deleteriously contaminated by foreign materials introduced by the substrate loader.

Lastly, while sealing means may be provided within the related art substrate bonding apparatus to seal the interior space from the external environment, the sealing means can wear, rendering it impracticable to adequately seal the interior space between the joined chamber units.

SUMMARY OF THE INVENTION

Accordingly, the present invention is directed to a substrate bonding apparatus for a liquid crystal display (LCD) device that substantially obviates one or more of the problems due to limitations and disadvantages of the related art.

An advantage of the present invention provides a substrate bonding apparatus for fabricating LCD devices, wherein LCD devices may be fabricated within a minimized amount of time.

Another advantage of the present invention provides a substrate bonding apparatus for fabricating LCD devices, opposing substrates may be horizontally aligned and vertically leveled with respect to each other.

Still another advantage of the present invention provides a substrate bonding apparatus for fabricating LCD devices capable of bonding substrates of various thicknesses.

Yet another advantage of the present invention provides a substrate bonding apparatus for fabricating LCD devices having a substrate loader that contacts an upper surface of a substrate to be held to an upper stage such that sealant material may be prevented from contacting a substrate loader.

A further advantage of the present invention provides a substrate bonding apparatus for fabricating LCD devices having a sealing means that facilitates bonding of substrates within a vacuum.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a substrate bonding apparatus for fabricating LCD devices according to a first embodiment of the present invention may, for example, include a base frame; an upper chamber unit, the upper chamber unit including an upper base and an upper chamber plate; a lower chamber unit mounted to the base frame, the lower chamber unit including a lower base and a lower chamber plate, wherein the lower chamber unit is selectively connectable with the upper chamber unit; chamber moving means for raising and lowering the upper chamber unit; an upper stage mounted to the upper chamber unit for holding a first substrate; a lower stage mounted to the lower chamber unit for holding a second substrate; sealing means provided to a surface of the upper or lower chamber units; first alignment means for leveling the upper stage with respect to the lower stage; and second alignment means for aligning the upper stage with respect to the lower stage.

A substrate bonding apparatus for fabricating LCD devices according to a second embodiment of the present invention may, for example, include a base frame; an upper chamber unit, the upper chamber unit including an upper base and an upper chamber plate; a lower chamber unit mounted to the base frame, the lower chamber unit including a lower base and a lower chamber plate, wherein the lower chamber unit is selectively connectable with the upper chamber unit; an upper stage mounted to the upper chamber plate for holding a first substrate; a lower stage mounted to the lower chamber plate for holding a second substrate; at least one first interval control groove arranged within a surface of one of the upper and lower chamber plates; sealing means provided to a surface of the other one of the upper and lower chamber plates; and plate moving means for horizontally moving the lower chamber plate.

A substrate bonding apparatus for fabricating LCD devices according to a third embodiment of the present invention may, for example, include a base frame; an upper chamber unit, the upper chamber unit including an upper base and an upper chamber plate; a lower chamber unit mounted to the base frame, the lower chamber unit including a lower base and a lower chamber plate, wherein the lower chamber unit is selectively connectable with the upper chamber unit; an upper stage mounted to the upper chamber plate for holding a first substrate; a lower stage mounted to the lower chamber plate for holding a second substrate; at least one first interval control groove arranged within a surface of one of the upper and lower chamber plates; a sealing means provided to a surface of the other one of the upper and lower chamber plates within which the at least one first interval control groove is arranged and arranged in correspondence with the at least one first interval control groove; at least one second interval control groove arranged within the surface of the one of the upper and lower chamber plates; an auxiliary sealing member provided to the surface of the other one of the upper and lower chamber plates within which the at least one second interval control groove is arranged and arranged in correspondence with each second interval control groove; and plate moving means for horizontally moving the lower chamber plate.

A substrate bonding apparatus for fabricating LCD devices according to a fourth embodiment of the present invention may, for example, include a base frame; an upper chamber unit; a lower chamber unit mounted to the base frame, wherein the lower chamber unit is selectively connectable with the upper chamber unit; chamber moving means for raising and lowering the upper chamber unit; an upper stage mounted to the upper chamber unit for holding a first substrate; a lower stage mounted to the lower chamber unit for holding a second substrate; first alignment means for leveling the upper stage with respect to the lower stage; interval control means fixed to one of the upper and lower chamber units for pushing against the other of the upper and lower chamber units; and sealing means provided to a surface of the upper or lower chamber units.

A substrate bonding apparatus for fabricating LCD devices according to a fifth embodiment of the present invention may, for example, include an upper stage for holding an upper surface of a first substrate, wherein the upper stage includes at least one guiding groove for receiving corresponding fingers of a substrate loader, wherein the upper surface of the first substrate is held to the fingers of the substrates loader; and a lower stage opposing the upper stage for holding a second substrate.

A substrate bonding apparatus for fabricating LCD devices according to a sixth embodiment of the present invention may, for example, include an upper stage for holding an upper surface of a first substrate; passages arranged within the upper stage and intersecting with a lower surface of the upper stage; a lower stage for holding a second substrate; suction force transmitters arranged within the passages, wherein each suction force transmitter may include a transmission source that is projectable from within each passage to a predetermined distance from the lower surface of the upper stage for holding the upper surface of the first substrate; and a substrate loader for arranging the first substrate operably proximate the upper stage.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 illustrates a plan view of an arrangement of a second alignment means and a lower chamber unit of the substrate bonding apparatus used in fabricating LCD devices according to the first embodiment of the present invention;

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

FIGS. 3 to 25 illustrate a substrate bonding apparatus used in fabricating LCD devices according to a first embodiment of the present invention.

Figure 1:
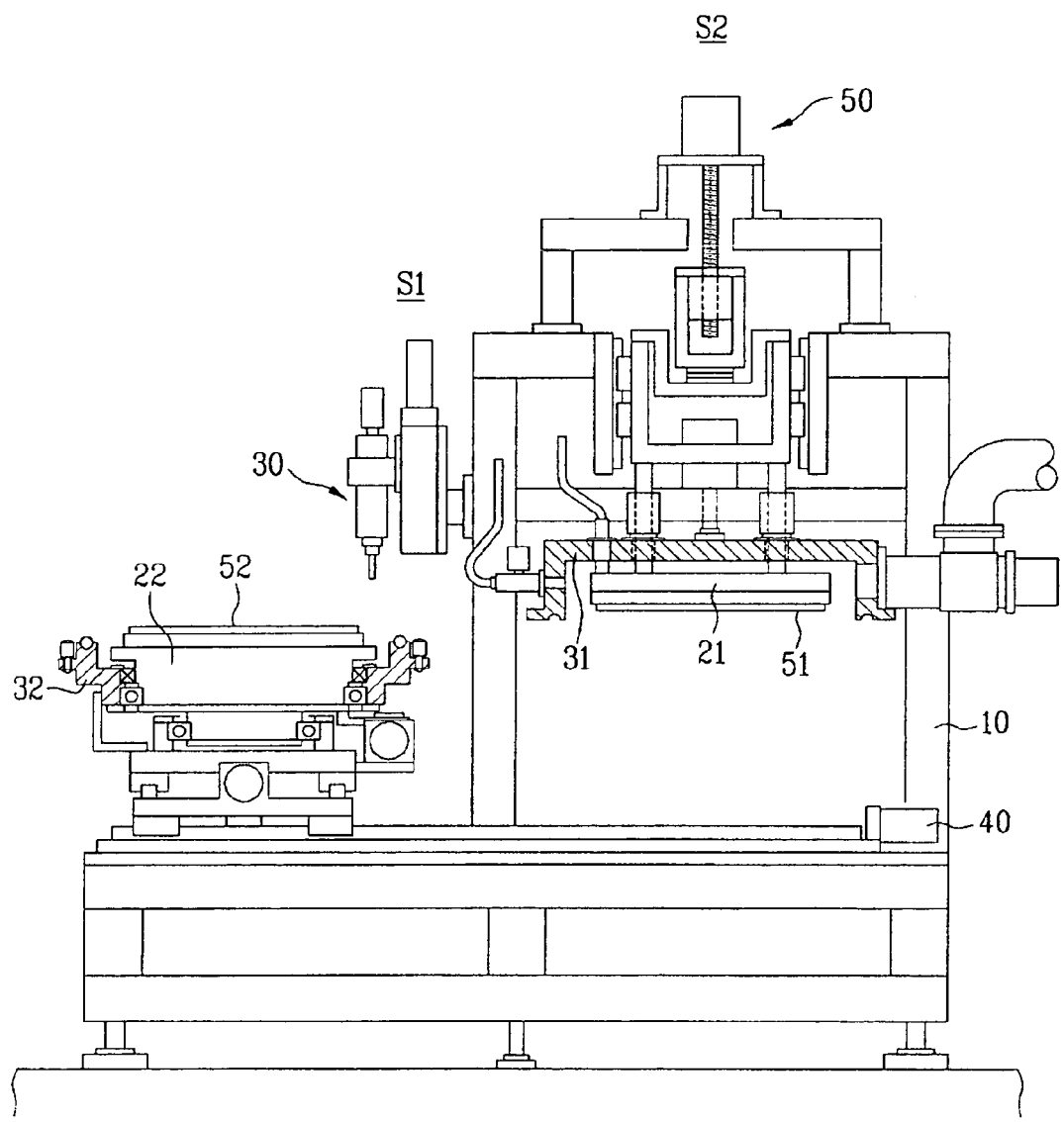
FIGS. 1 and 2 illustrate a related art substrate bonding apparatus for fabricating LCD devices according to a liquid crystal dispensing method.
Figure 2:
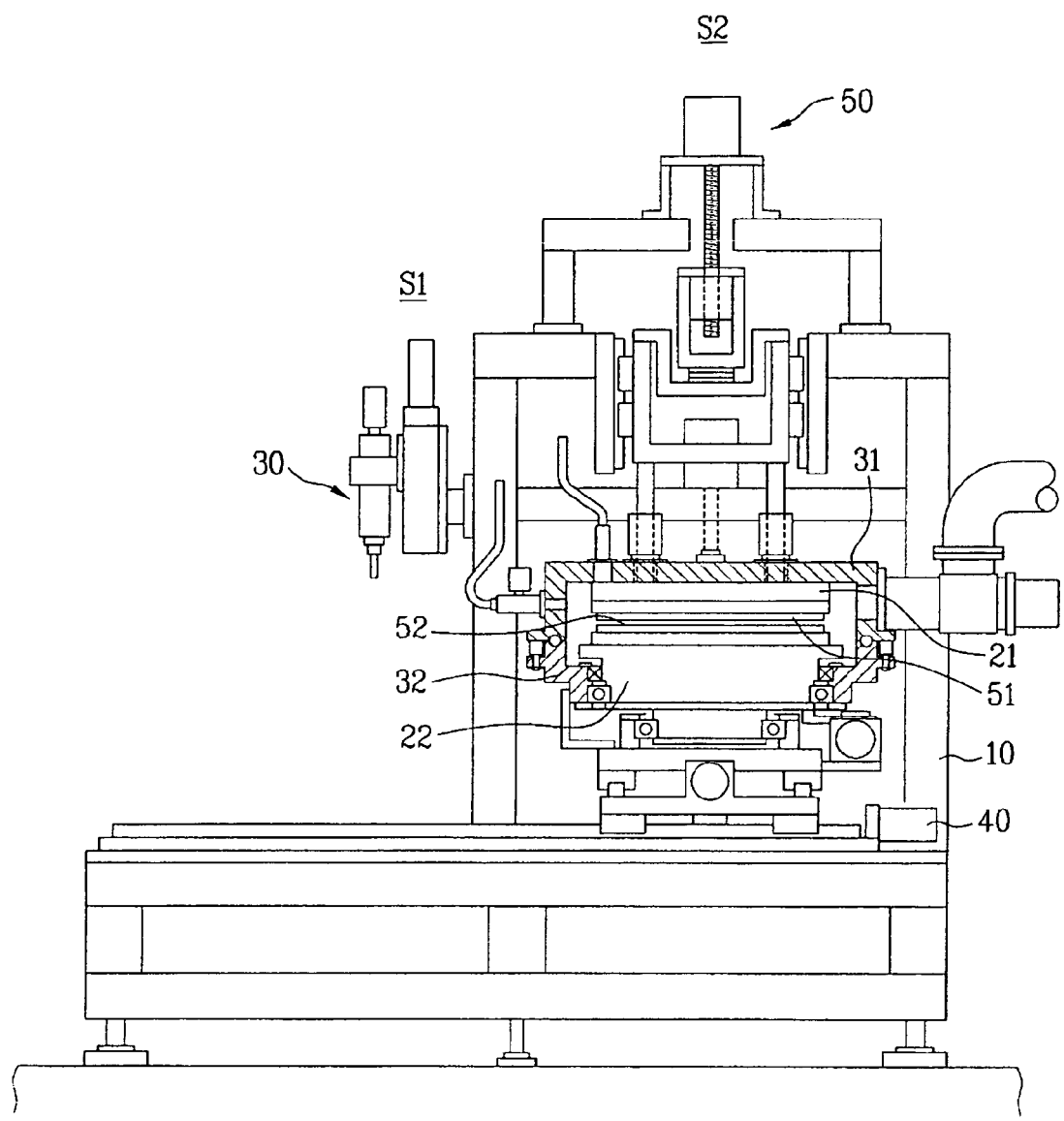
Figure 3A:
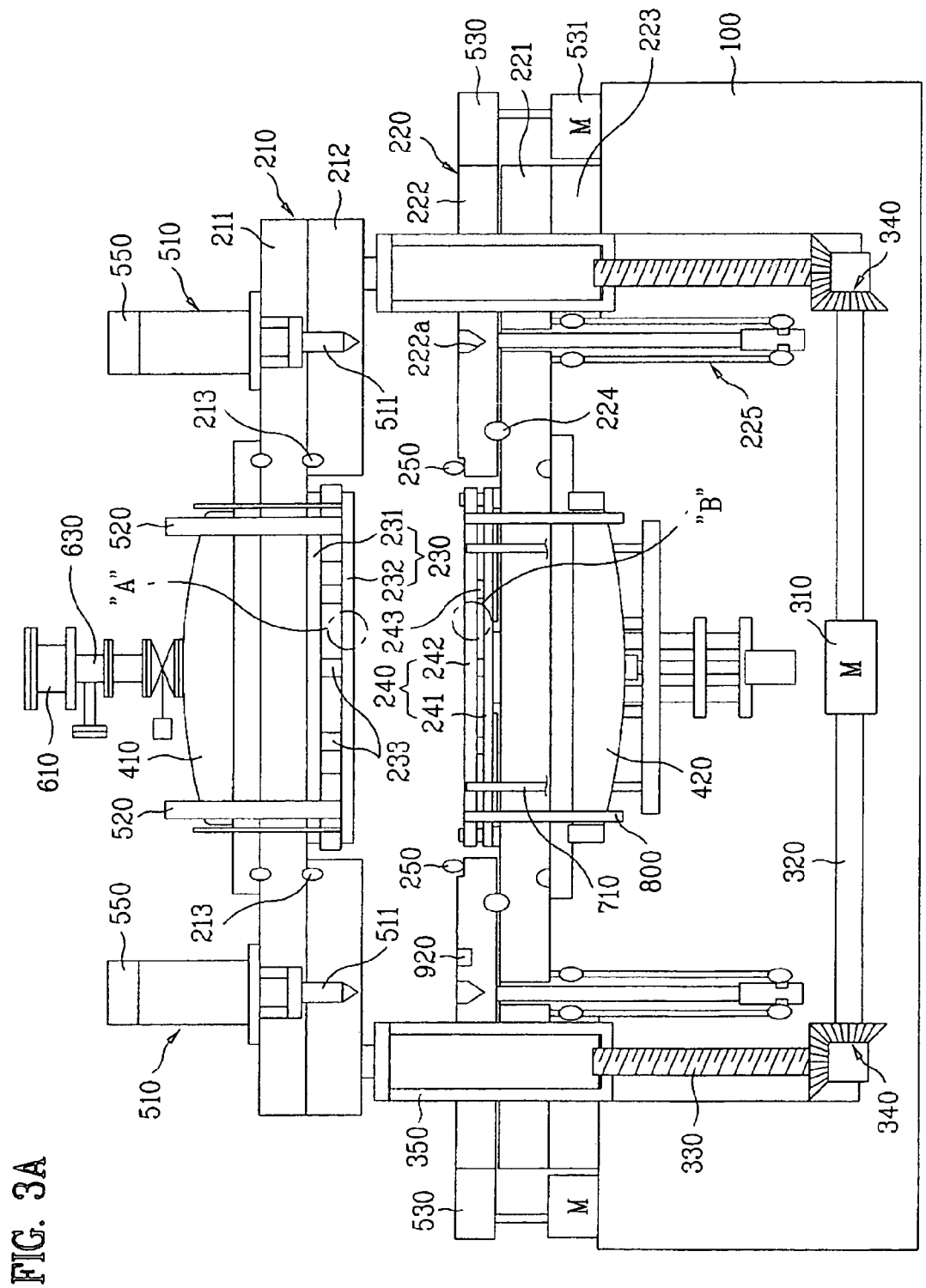
FIG. 3A illustrates a schematic view of a substrate bonding apparatus used in fabricating LCD devices according to one aspect of the first embodiment of the present invention.
Figure 3B:
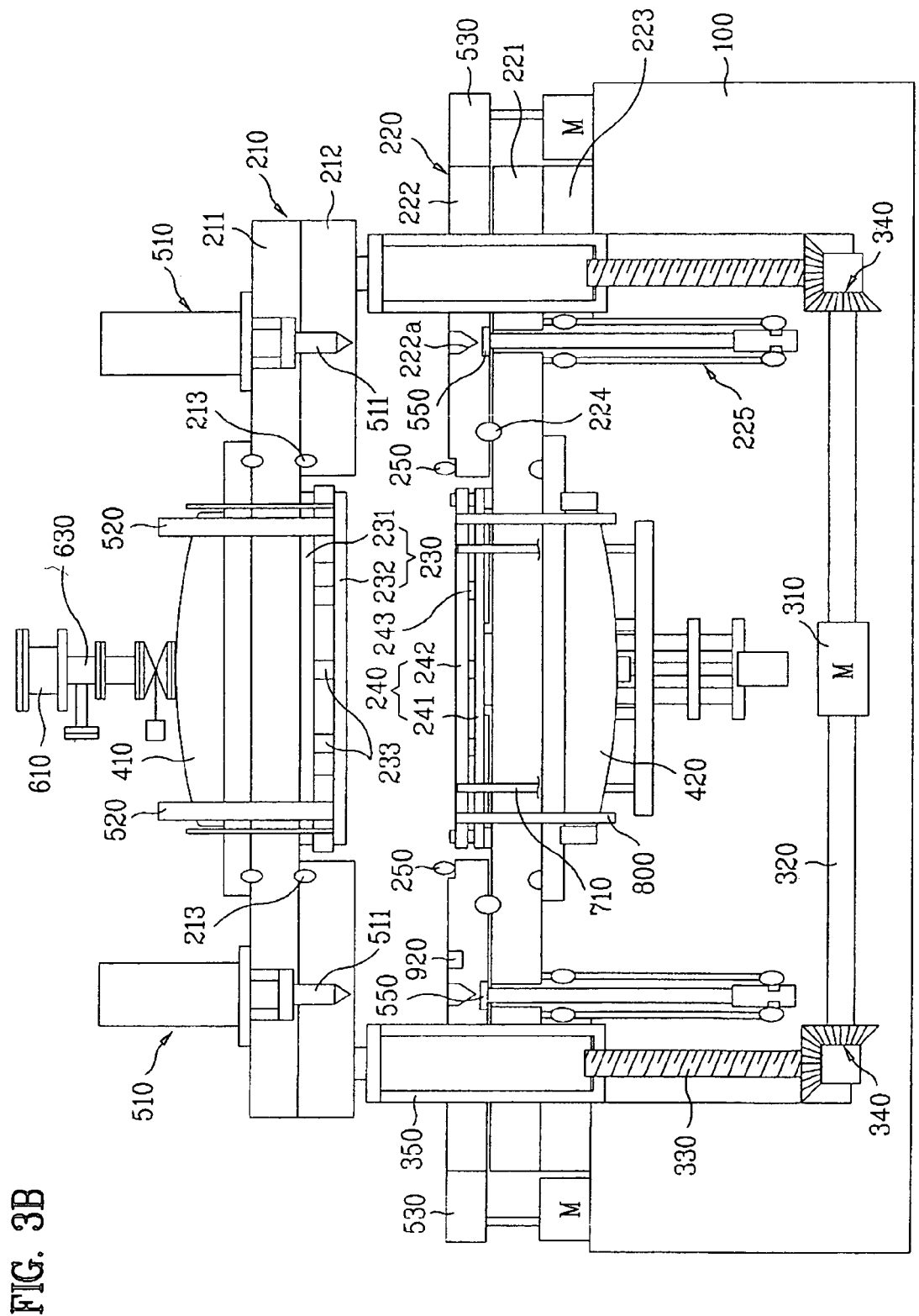
FIG. 3B illustrates a schematic view of a mounting location for a load cell of a first alignment means according to another aspect of the first embodiment of the present invention.

Referring generally to FIG. 3A, a substrate bonding apparatus according to the first embodiment of the present invention may, for example, be provided with a base frame 100, an upper chamber unit 210, and a lower chamber unit 220, chamber moving means, an upper stage 230, a lower stage 240, sealing means, first alignment means, second alignment means, vacuum pumping means, and support means.

The base frame 100 may be fixed to a supporting structure or surface (e.g., the ground), may form the exterior appearance of the substrate bonding apparatus, and may support various components as will be discussed in greater detail below.

The upper chamber unit 210 may, for example, include an upper base 211, movably connected to the base frame 100, and an upper chamber plate 212, immovably connected to a bottom peripheral surface of the upper base 211. In one aspect of the present invention, the upper chamber plate 212 may define an upper space, within which the upper stage 230 may be arranged and coupled to the upper base 211. Coupled to the upper base 211, the upper stage 230 may move in unison with the upper base 211 and upper chamber plate 212. In one aspect of the present invention, an upper sealing member 213 may be arranged between the upper base 211 and the upper chamber plate 212 for preventing leakage of air through any gap that may be formed between the upper base 211 and the upper chamber plate 212. The upper sealing member 213 may, for example, be provided as a gasket, an O-ring, etc., and made of a material that is suitable for sealing (e.g., rubber, plastic, etc.).

The lower chamber unit 220 may, for example, include a lower base 221, immovably connected to the base frame 100, and a lower chamber plate 222, movably arranged over a top peripheral surface of the lower base 221. In one aspect of the present invention, the lower chamber unit 220 may include a fixing plate 223 for immovably fixing the lower base 221 to the base frame 100. In another aspect of the present invention, the lower chamber plate 222 may define a lower space, within which the lower stage 240 may be arranged and coupled to the lower base 221. In still another aspect of the present invention the lower chamber plate 222 may be movable in left, right, forward, and backward (i.e., lateral) directions with respect to the lower base 221. In yet another aspect of the present invention, a lower sealing member 224 may be arranged between the lower base 221 and the lower chamber plate 222 for preventing leakage of air through any gap that may be formed between the lower base 221 and the lower chamber plate 222. The lower sealing member 224 may, for example, be provided as a gasket, an O-ring, etc., and made of a material that is suitable for sealing (e.g., rubber, plastic, etc.).

At least one support part 225 may be arranged between the lower base 221 and the lower chamber plate 222 for ensuring that the lower chamber plate 222 is maintained a predetermined a distance from the upper surface of the lower base 221. The support part 225 may, for example, include a first end attached to a bottom portion of the lower chamber plate 222 and a second end that is movable in lateral directions with respect to the lower base 221. In one aspect of the present invention, the second end of the support part 225 may be attached to a piece coupled to a bottom portion of the lower base 221. Accordingly, the support part 225 enables the lower chamber plate 222 to move in left, right, forward, and backward directions relative to the lower base 221.

The upper and lower chamber units 210 and 220 may be selectively connected to each other to define an interior space. In one aspect of the present invention, the peripheral boundary of the interior space may be defined by the sealing means, as will be discussed in greater detail below. In another aspect of the present invention, the upper and lower chamber units 210 and 220 may be selectively connected to each other via a chamber moving means. The chamber moving means may, for example, include a driving motor 310 fixed to the base frame 100, a driving shaft 320 coupled to the driving motor 310, a connecting shaft 330 arranged substantially perpendicular to the driving shaft 320 for receiving a driving force from the driving shaft 320, a connecting part 340 for connecting the driving shaft 320 to the connecting shaft 330, and a jack part 350 mounted at an end of the connecting shaft 330.

The driving motor 310 may be arranged within an interior bottom portion of the base frame 100 and may be provided as a bilateral shaft motor, having shafts horizontally projecting from both sides of the driving motor 310. The driving shaft 320 may be connected to the driving motor 310 and transmit driving forces along a horizontal direction to the connecting part 340 while the connecting shaft 330 may be connected to the connecting part 340 to transmit the driving force along a vertical direction with respect to the driving shaft 320 to the jack park 350. Provided at the end of the connecting shaft 330, the jack part 350 may be connected to the upper chamber unit 210, and may include a nut housing for raising and lowering the upper chamber unit 210 depending on a rotation direction of the connecting shaft 330. The connecting part 340 may be provided as a system of bevel gears to translate a rotational force supplied from the driving shaft 320 along a horizontal direction into a vertical rotational force to the connecting shaft 330.

The upper and lower stages 230 and 240, respectively, may be coupled to a respective one of the upper and lower bases 211 and 221, respectively, via upper and lower fixing plates 231 and 241, respectively. In one aspect of the present invention, the upper and lower stages 230 and 240 may include an upper and lower holding plate 232 and 242, respectively, for holding respective ones of subsequently provided substrates. In another aspect of the present invention, the upper and lower stages 230 and 240 may include a plurality of upper and lower fixing blocks 233 and 243, respectively, arranged between respective pairs of the upper and lower fixing plates 231 and 241 and the upper and lower holding plates 232 and 242. In still another aspect of the present invention, the upper and lower holding plates 232 and 242 may comprise electrostatic chucks (ESC) (see, for example FIG. 5 at 242b) formed of a material capable of transmitting an electrostatic charge to a respective substrate (e.g., polyimide) to thereby hold the substrate to the stage.

Figure 4A:
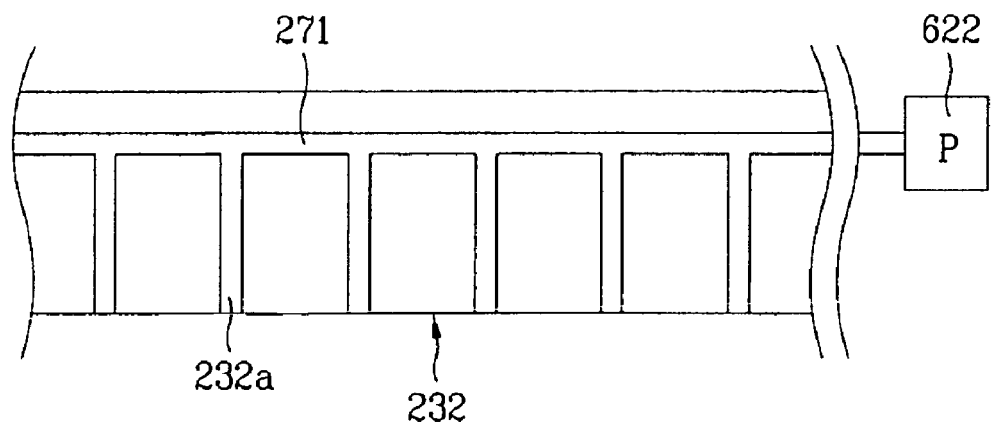
FIG. 4A illustrates an enlarged sectional view of region "A" shown in FIG. 3A.
Figure 4B:
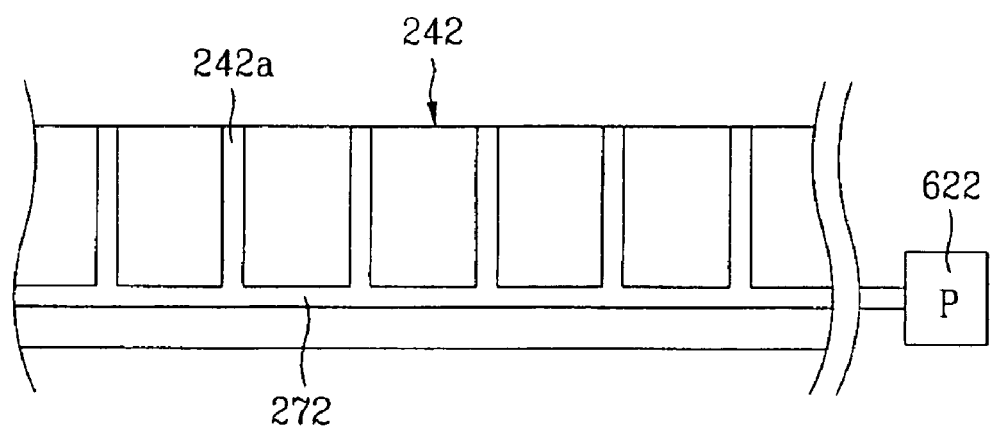
FIG. 4B illustrates an enlarged sectional view of region "B" shown in FIG. 3A.

FIG. 4A illustrates an enlarged sectional view of region "A" shown in FIG. 3A. FIG. 4B illustrates an enlarged sectional view of region "B" shown in FIG. 3A.

Referring to FIGS. 4A and 4B, the upper and lower holding plates 232 and 242 may each include a plurality of upper and lower vacuum holes 232a and 242a, respectively, for transmitting a suction force to a respective substrate such that the substrate may be held to its respective stage. Accordingly, the plurality of vacuum holes 232a and 242a may be in fluid communication with a respective one of an upper and lower vacuum pipeline 271 and 272, respectively, formed within a respective one of the upper stage 230 and lower stage 240. In one aspect of the present invention, each vacuum pipeline 271 and 272 may be connected to a vacuum pump 622 for generating the suction force.

Referring back to FIG. 3A, the sealing means may be arranged between the upper and lower chamber units such that the interior space defined by the upper and lower chamber units 210 and 220 is substantially sealed from an external environment. In one aspect of the present invention, the sealing means may be provided as a central sealing member 250 fitted along a top surface of the lower chamber plate 222 of the lower chamber unit 220. In another aspect of the present invention, the central sealing member 250 may be provided, for example, as an O-ring and formed of a material such as rubber. In still another aspect of the present invention, the central sealing member 250 may project from the top surface of the lower chamber plate 222 to a predetermined height and be formed to a predetermined thickness sufficient to prevent substrates, held by their respective stages, from becoming adhered to each other when the upper and lower chamber units 210 and 220 are initially connected to each other. In another aspect of the present invention, the predetermined thickness of the central sealing member 250 may be sufficient to permit the substrates to become bonded to each other when the central sealing member 250 is compressed. Accordingly, the predetermined thickness of the central sealing member 250 may be between about 30 µm and about 50 µm.

The first alignment means may be provided for leveling the upper stage 230 with respect to the lower stage 240. In one aspect of the present invention, the first alignment means may, for example, include at least one first actuator 510, at least one first shaft 511, and at least one receiving groove 222a.

The first actuator 510 may be coupled to the upper chamber unit 210. In one aspect of the present invention, the first actuator 510 may, for example, include a linear actuator and may raise and lower a corresponding first shaft 511 with respect to the upper chamber unit 210. Each first shaft 511 may be independently through the upper chamber plate 212 and lowered into a respective receiving groove 222a, formed within the upper surface of the lower chamber plate 212.

In one aspect of the present invention, the first alignment means may, for example, include a single first actuator 510. In another aspect of the present invention, the first alignment means may, for example, include first actuators 510 arranged in at least two opposing corners of the upper chamber unit 210, wherein the precision to which the upper stage 230 may be leveled with respect to the lower stage 240 increases as the number of first actuators 510 provided increases. In still another aspect of the present invention, the first alignment means may, for example, include first actuators 510 arranged in four opposing corners of the upper chamber unit 210.

As mentioned above, at least one receiving groove 222a may be provided within the upper surface of the lower chamber plate 222 for receiving respective ones of the first shafts 511. In one aspect of the present invention, the dimensions of the receiving grooves 222a may substantially conform to the dimensions of end portions of respective first shafts 511. For example, the end portions of the first shafts 511 may be tapered, having a sloped structure. Accordingly, the receiving grooves 222a dimensioned such that a center region of the receiving groove 222a is deeper than peripheral regions of the receiving groove 222a. Therefore, even if the first shafts 511 and the holes 222a are not initially perfectly aligned, end portions of the first shafts 511 may contact and be guided by the sloped dimensions of respective receiving grooves 222a such that the first shafts 511 and the receiving grooves 222a may aligned substantially perfectly.

The first alignment means may further include a sensing means. The sensing means may, for example, include load cell 550 arranged within the first actuator 510 to determine whether the first shaft 511 is in contact with a surface of the lower chamber plate 222. For example, when the first shaft 511 contacts the surface of the lower chamber plate 222, the load cell 550 detects a change in the load of the first actuator. Referring now FIG. 3B, the load cell 550 may be arranged within a portion of the lower chamber plate 222 that is contactable by the first shaft 511. Alternatively, the load cell 550 may be arranged on the support part 225 between the lower base 221 and the lower chamber plate 222. Moreover, the load cell 550 may be arranged in a portion of the first actuator 510 and in contact with the first shaft 511. Lastly, the load cell 550 may be arranged within any combination of the aforementioned locations. In one aspect of the present invention, the sensing means may, for example, include a gap sensor 920 for measuring a gap between the lower chamber plate 222 and the first shaft 511. In one aspect of the present invention, the gap sensor 920 may be arranged within the top surface of the lower chamber plate 222.

Accordingly, the first actuator(s) 510 of the first alignment means may selectively lower a respective first shaft 511 into a receiving groove 222a so as to push the first shaft 511 against the receiving groove 222a using a predetermined amount of force. Thus, the first alignment means may facilitate the leveling of the upper stage 230 with respect to the lower stage 240 by adjusting a orientation of the upper stage 230 to be substantially parallel to the orientation of the lower stage 240.

With reference to FIGS. 3A (or 3B) and 5, the second alignment means may be provided for horizontally aligning the upper stage 230 with respect to the lower stage 240. In one aspect of the present invention, the second alignment means may, for example, include a plurality of alignment cameras 520, a plurality of cams 530, and a plurality of restoring means 540.

According to the principles of the present invention, the alignment cameras 520 may be arranged within the upper base 211 or lower base 221 at positions corresponding to at least two corners of substrates upper and lower 110 and 120, respectively, such that alignment marks (not shown) arranged on the respective substrates 110 and 120 may be observed.

As shown in FIG. 5, cams 530 may be rotatably arranged to selectively contact a peripheral surface of the lower chamber plate 222. In one aspect of the present invention, three cams 530 may be provided within the substrate bonding apparatus of the present invention. In another aspect of the present invention, each of the cams may be eccentrically rotatable via motors 531 such that, upon rotating, the lower chamber plate 222 may be pushed in a predetermined direction. In accordance with the principles of the present invention, the lower chamber unit may be defined by four sides, wherein a first pair of opposing sides may be longer than a second pair of opposing sides. Accordingly, two cams 530 may be arranged to selectively contact one side of the first pair of opposing sides and one cam 530 may be arranged to selectively contact a middle portion of one side of the second pair of opposing sides such that the lower chamber plate 222 may be movable in the left, right, forward, and backward directions. Individual ones of the restoring means 540 may be provided adjacent to a respective cam 530 and may exert a restoring force in a direction opposite to the direction the corresponding cam 530 pushes lower chamber plate 222. In one aspect of the present invention, the restoring means 540 may be provided as a spring having a first end connected, for example, to the base frame 100 and a second end connected to the peripheral surface of the lower chamber plate 222. According to the principles of the present invention, the second alignment means may be proximately arranged adjacent edges of the lower chamber plate 222, opposing edges of the lower chamber plate 222, or any combination thereof, such that the lower chamber plate may be moved in front, back, left, and right directions.

Referring still to FIG. 5, the connecting shaft 330 and the jack part 350 may be connected between the connecting part 340 and the upper chamber unit 210 through holes formed in the lower chamber plate 222 having dimensions suitable for allowing the lower chamber plate 222 to be horizontally moved without contacting either the connecting shaft 330 or the jack part 350.

Accordingly, the second alignment means may move the lower chamber plate 222 of the lower chamber unit 220 which, in turn moves the upper chamber plate 212 of the upper chamber unit 210 due to the receipt of the first shaft 511 within the receiving groove 222a. Since the upper chamber plate 212 is immovably connected to the upper base 211, the upper base 211 moves in unison with the lower chamber plate 222. Moreover, since the upper stage 230 is connected to the upper base 211, the upper stage 230 may move in unison with the lower chamber plate 222 and, therefore be substantially aligned with the lower stage 240 connected to the lower base 221.

Figure 6:
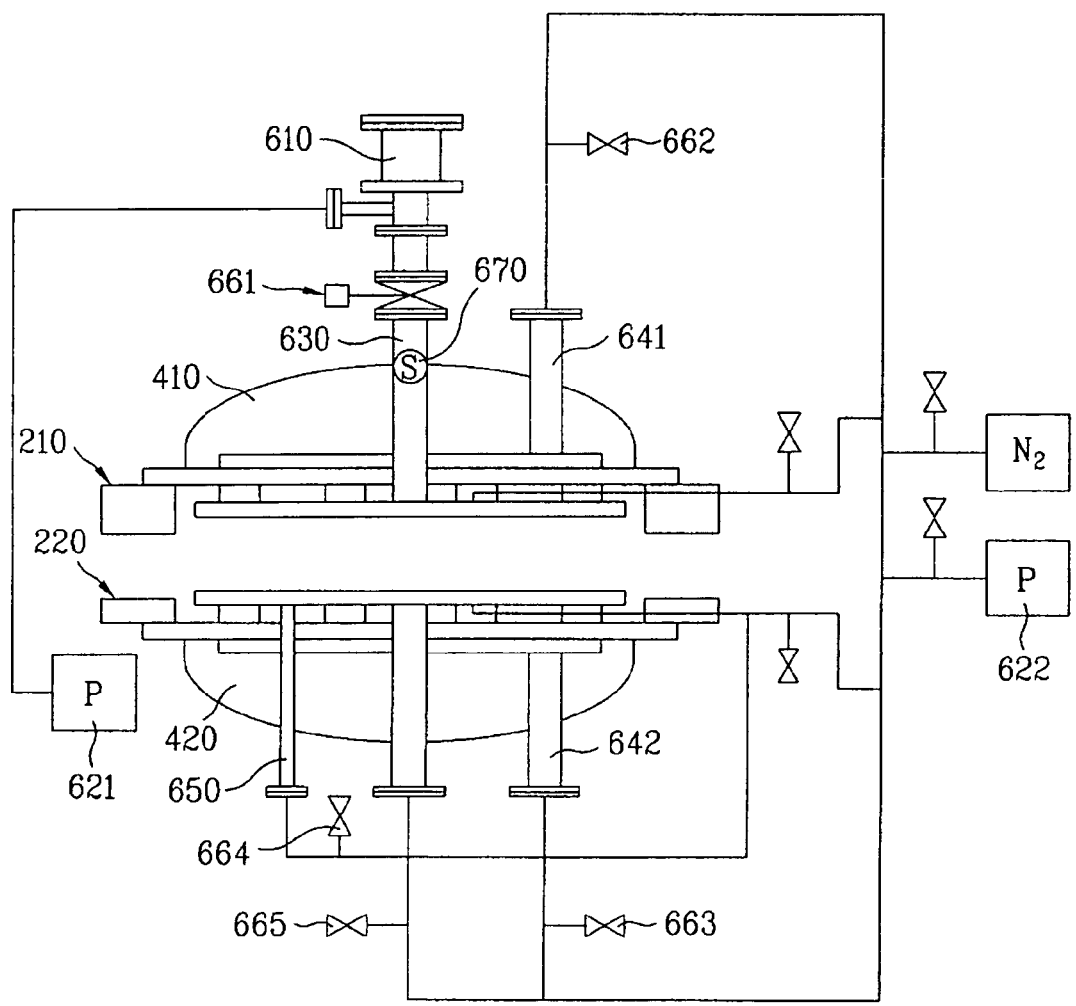
FIG. 6 schematically illustrates a vacuum pumping means of the substrate bonding apparatus used in fabricating LCD devices according to the first embodiment of the present invention.

FIG. 6 schematically illustrates a connection state of a vacuum pumping means of the substrate bonding apparatus used in fabricating LCD devices according to the first embodiment of the present invention.

Referring to FIGS. 3A (or 3B) and 6, the aforementioned vacuum pumping means may be provided to at least one of the upper and lower chamber units 210 and 220 and may evacuate the sealed interior space defined by the upper and lower chamber units 210 and 220 joined together. In one aspect of the present invention, the vacuum pumping means may, for example, include a high vacuum pump (Turbo Molecular Pump, "TMP") 610 and a first and second low vacuum pump (Dry-Pump) 621 and 622, respectively.

The first low vacuum pump 621 may be connected to a high vacuum chamber pipeline 630 provided at a central region of the upper chamber unit 210 and enable the high vacuum pump 610 and the interior spaces defined by the upper and lower chamber plates 212 and 222 to be in communication with each other. Moreover, the first low vacuum pump may evacuate the sealed interior space, definable by the joined upper and lower chamber units 210 and 220 to a predetermined pressure.

The second low vacuum pump 622 may be connected to low vacuum chamber pipelines 641 and 642 passing through side regions of the upper and lower chamber units 210 and 220. Further, the second low vacuum pump 622 may be connected to upper and lower vacuum pipelines 271 and 272 in the upper and lower stages 230 and 240, respectively, and to a substrate securing pipeline 650 connected to the stages 230 and 240, respectively, for transmitting a suction force to the substrates, thereby enabling the substrates to be held to their respective stages. The pipelines 630, 641, 642, and 650 may include at least one shut off valve 661, 662, 663, 664, and 665. The high pressure vacuum pipeline 630 may include a pressure sensor 670 for measuring a pressure inside of the interior spaces the substrates are held therein.

The low vacuum chamber pipelines 641 and 642 and the substrate securing pipeline 650, in communication with the second low vacuum pump 622, may be used to perform a venting process, as will be described in greater detail below. Accordingly, gas (e.g., $N_2$ gas) may be injected into the sealed interior space definable by the upper and lower chamber units 210 and 220 for returning a pressure therein from a vacuum state to an atmospheric pressure.

In one aspect of the present invention, the first and second low vacuum pumps 621 and 622 may be used to evacuate interior spaces of the upper and lower low vacuum chamber units 410 and 420, respectively. According to principles of the present invention, the upper and lower low vacuum chamber units 410 and 420, respectively, may each include interior spaces capable of being substantially evacuated. Further, the upper and lower low vacuum chamber units 410 and 420 may contact a top surface of the upper chamber unit 210 and a bottom surface of the lower chamber unit 220, respectively. When the upper chamber unit 210 and the lower chamber unit 220 are joined, an interior space may be defined and sealed by the joined chamber units. Since the upper and lower stages 230 and 240 are arranged within the sealed interior space, the upper and lower stages 230 and 240 may become bent due to a pressure difference between the vacuum created within the sealed interior space and an atmospheric pressure of the external environment. Accordingly, vacuums created within the interior spaces of the upper and lower low vacuum chamber units 410 and 420 may minimize the degree to which the upper and lower stages 230 and 240 bend.

Figure 7:
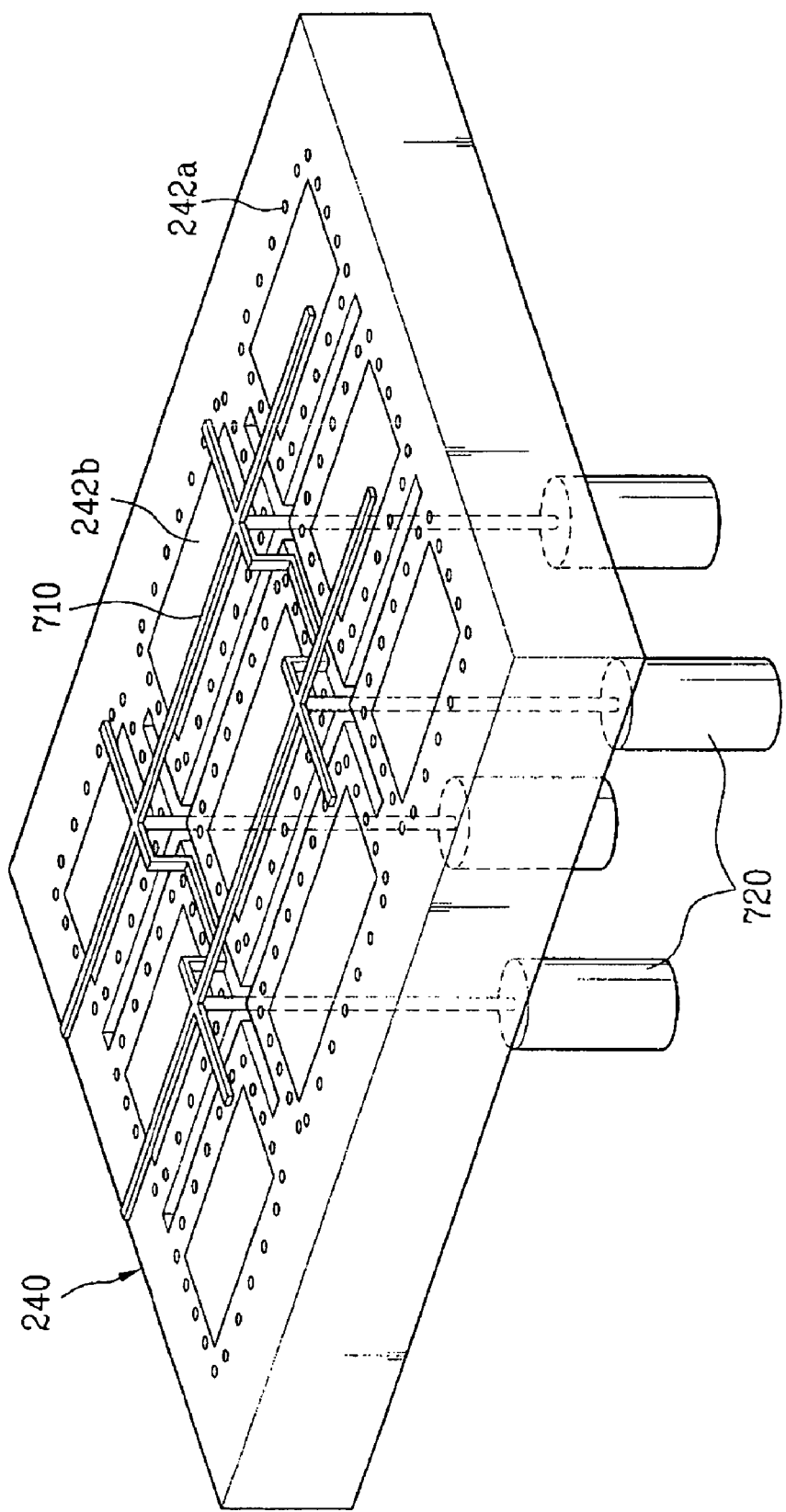
FIG. 7 illustrates a perspective view of a support means of the substrate bonding apparatus used in fabricating LCD devices according to the first embodiment of the present invention.

FIG. 7 illustrates a perspective view of a support means of the substrate bonding apparatus used in fabricating LCD devices according to the first embodiment of the present invention.

Referring to FIGS. 3A (or 3B) and 7, the support means may, for example, include a lift pin 710 and a plurality of second actuators 720. In one aspect of the present invention, the lift pin 710 may have a thickness sufficient to support at least one substrate while substantially preventing the at least one substrate from sagging. A central region of the lift pin 710 may include at least one downwardly bent portion for allowing a substrate loader 910 to support the at least one substrate without interfering with the lift pin 710 (see, for example, FIG. 12). Moreover, portions of the lift pin 710 may be raised through the lower stage 240 and above the upper surface of the lower stage 240 to facilitate the safe seating of a substrate onto the lower stage 240. In one aspect of the present invention, when a substrate is not loaded onto the lower stage 240, a top surface of the lift pin 710 may be positioned below the top surface of the lower stage 240. In another aspect of the present invention, a plurality of second actuators 720 may raise and lower the lift pin 710 as required. Accordingly, the support means may facilitate the loading and unloading of bonded and unbonded substrates with respect to the lower stage 240.

Referring back to FIG. 3A (or 3B), and in accordance with the principles of the present invention, a photo-hardening means 800 may be mounted through at least one of the upper and lower chamber units 210 and 220, respectively, to partially harden sealant material disposed on predetermined regions of the loaded substrates, held by their respective stages 230 and 240. In one aspect of the present invention, the photo-hardening means 800 may, for example, include a UV directing part for directing UV light to the sealant material.

Having described the substrate bonding apparatus used in fabricating LCD devices with respect to FIGS. 3-7, a method of fabricating LCD devices using the substrate bonding apparatus shown in FIGS. 3-7 will now be described in greater detail with reference to FIGS. 8-25.

Figure 8:
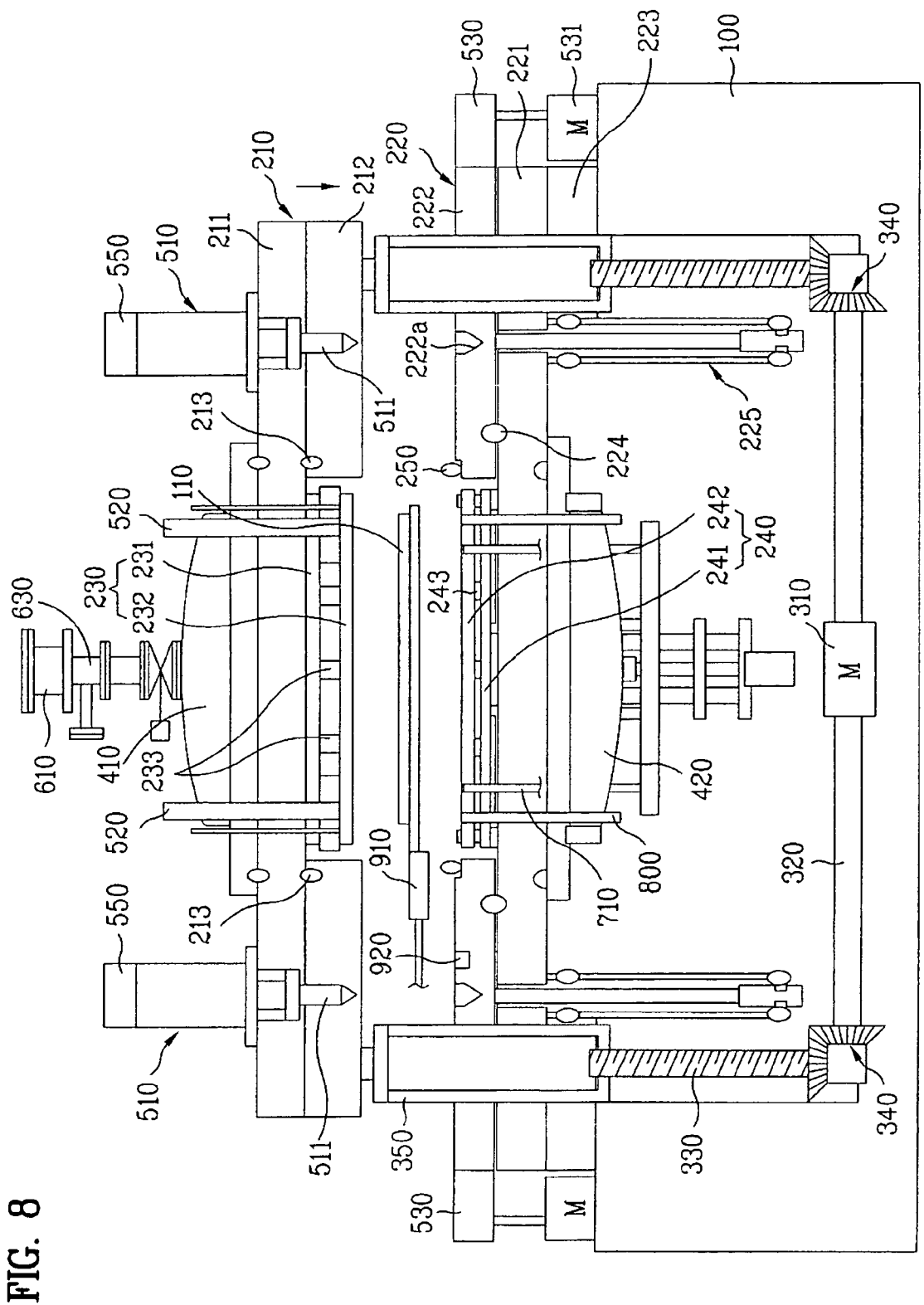
FIG. 8 illustrates the loading of a first substrate into the substrate bonding apparatus used in fabricating LCD devices according to the first embodiment of the present invention.

Initially, a substrate loader 910 may be used to load a first substrate 110, having sealant material disposed thereon, into a space between the upper and lower stages 230 and 240 of FIG. 3A (or 3B), as shown in FIG. 8.

Figure 9:
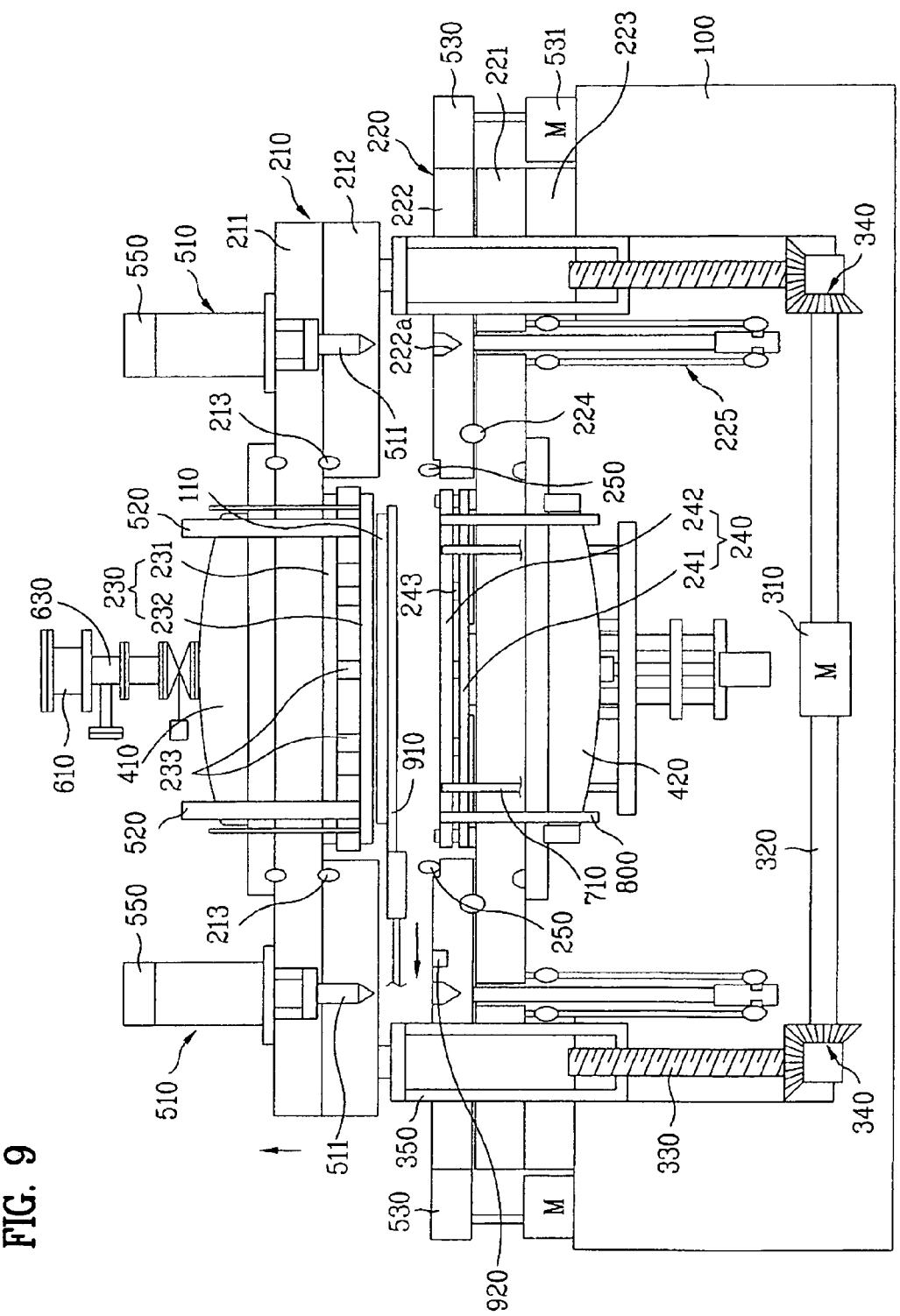
FIGS. 9 and 10 illustrate the holding of the first substrate to an upper stage of the substrate bonding apparatus used in fabricating LCD devices according to the first embodiment of the present invention.

Next, and with reference to FIG. 9, the upper chamber unit 210 may be lowered from its original position such that the upper stage 230 is arranged proximate the first substrate 110. The first substrate 110 may then be held to the upper stage 230 by a suction force generated by the second low vacuum pump 622 and/or by an electrostatic charge (ESC) generated by the holding plate 232. In one aspect of the present invention, the first substrate 110 may be held to the upper stage 230 by simultaneously applying the suction force and the electrostatic charge. In another aspect of the present invention, the first substrate 110 may be held to the upper stage 230 by applying the suction force either before or after the electrostatic charge is applied. However, if the electrostatic charge is applied first, sparks may be generated between the substrate 110 and the holding plate 232. Accordingly, it may be beneficial to hold the first substrate 110 to the upper stage 230 by applying the suction force first, followed by the application of the electrostatic charge.

Figure 10:
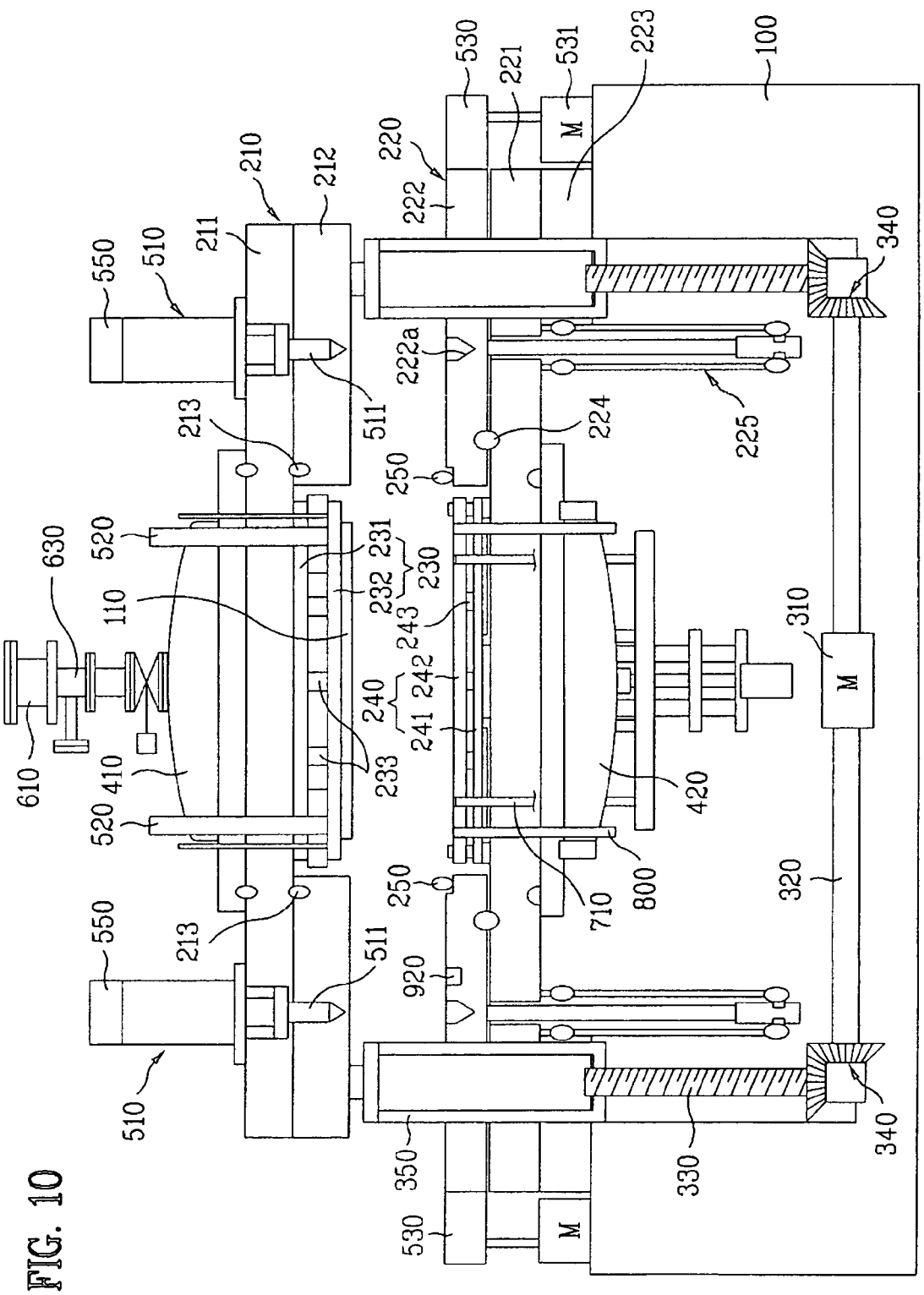

Referring now to FIG. 10, after the first substrate 110 is held to the upper stage 230, the upper chamber unit 210 may be raised to its original position and the substrate loader 910 may be removed from the substrate bonding apparatus.

Figure 11:
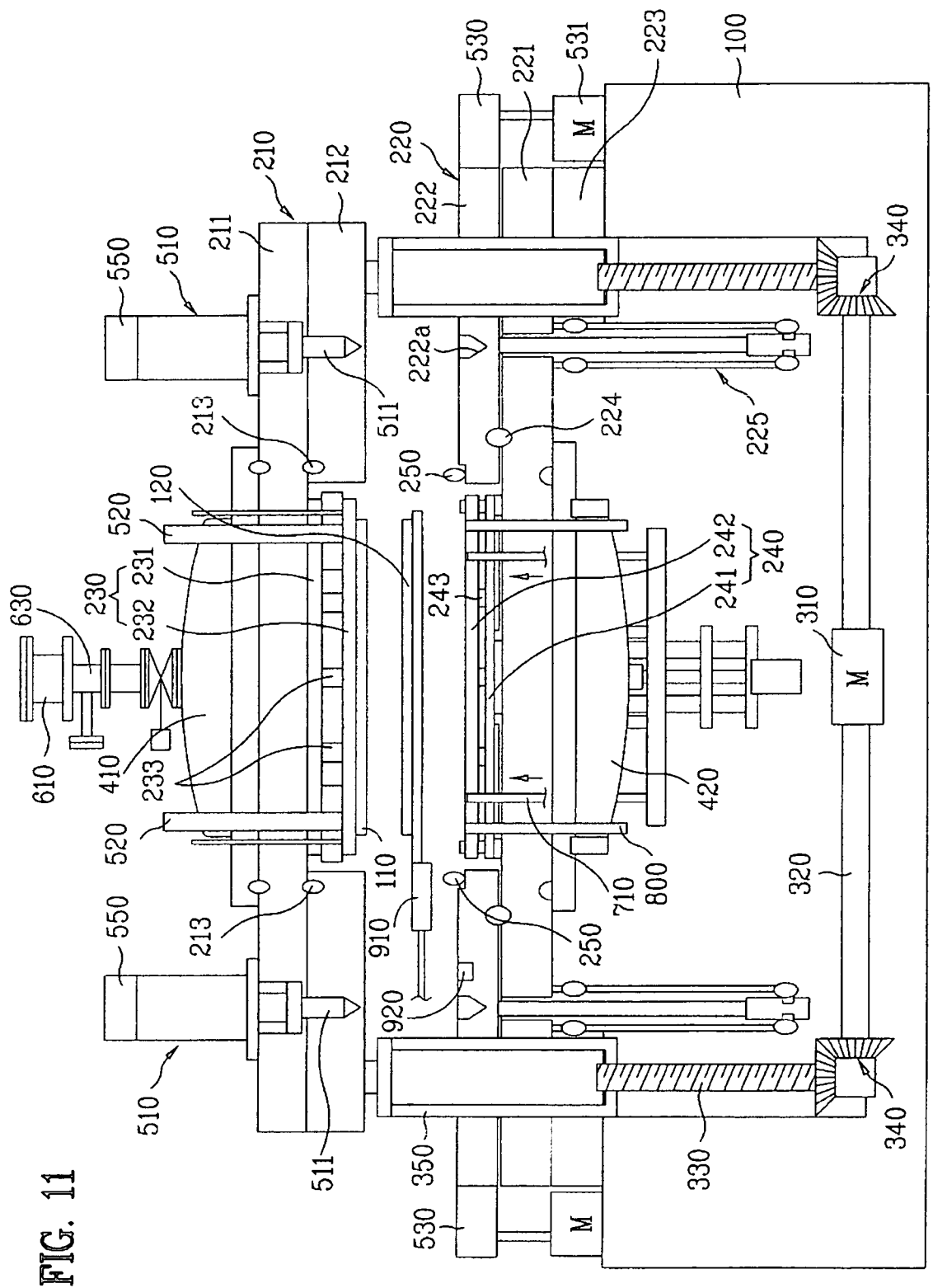
FIGS. 11 to 13 illustrate the loading and holding of a second substrate to a lower stage of the substrate bonding apparatus used in fabricating LCD devices according to the first embodiment of the present invention.
Figure 12:
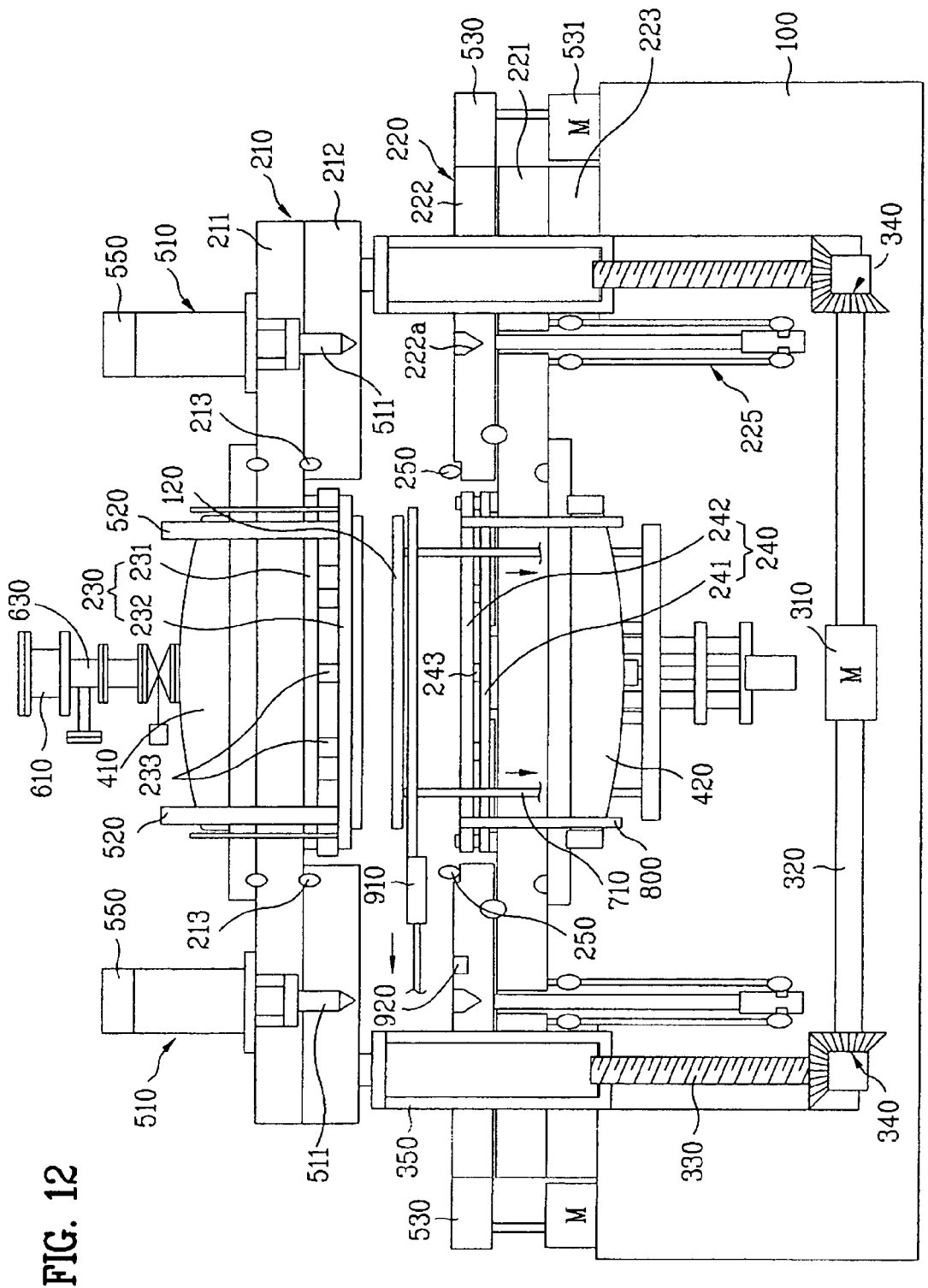

Next, and with reference to FIG. 11, the substrate loader 910 may be reinserted into the substrate bonding apparatus while supporting a second substrate 120. Upon loading the second substrate 120 into the substrate bonding apparatus, the lift pin 710 may be raised from its original position, through the lower stage 230 and from below the upper surface of the lower stage 230, to push the second substrate 120 away from the substrate loader 910. Accordingly, the lift pin 710 may support the second substrate 210 at a predetermined height above the substrate loader 910 (as shown in FIG. 12). When the second substrate 120 is supported at the predetermined height, the substrate loader 910 may be removed from the substrate bonding apparatus.

Figure 13:
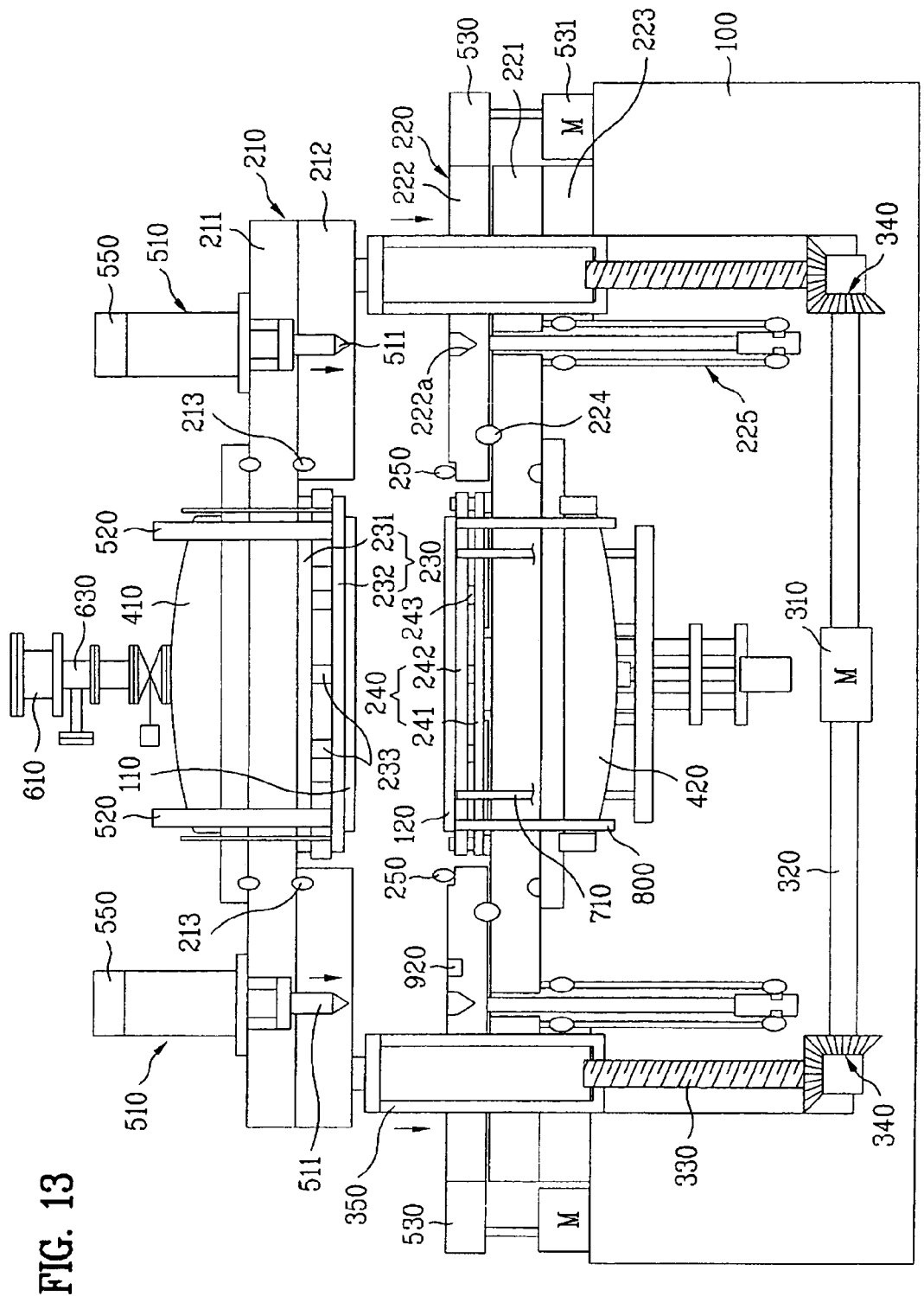

Next, as shown in FIG. 13, the lift pin 710 may be lowered such that the second substrate 120 rests on, and is supported by the lower stage 240. When the second substrate 120 is supported by the lower stage 240, the second substrate 120 may be held to the lower stage 240 using suction forces and electrostatic charges. When the first and second substrates 110 and 120 are held to their respective stages 230 and 240, loading of the substrate bonding apparatus is complete.

Figure 14:
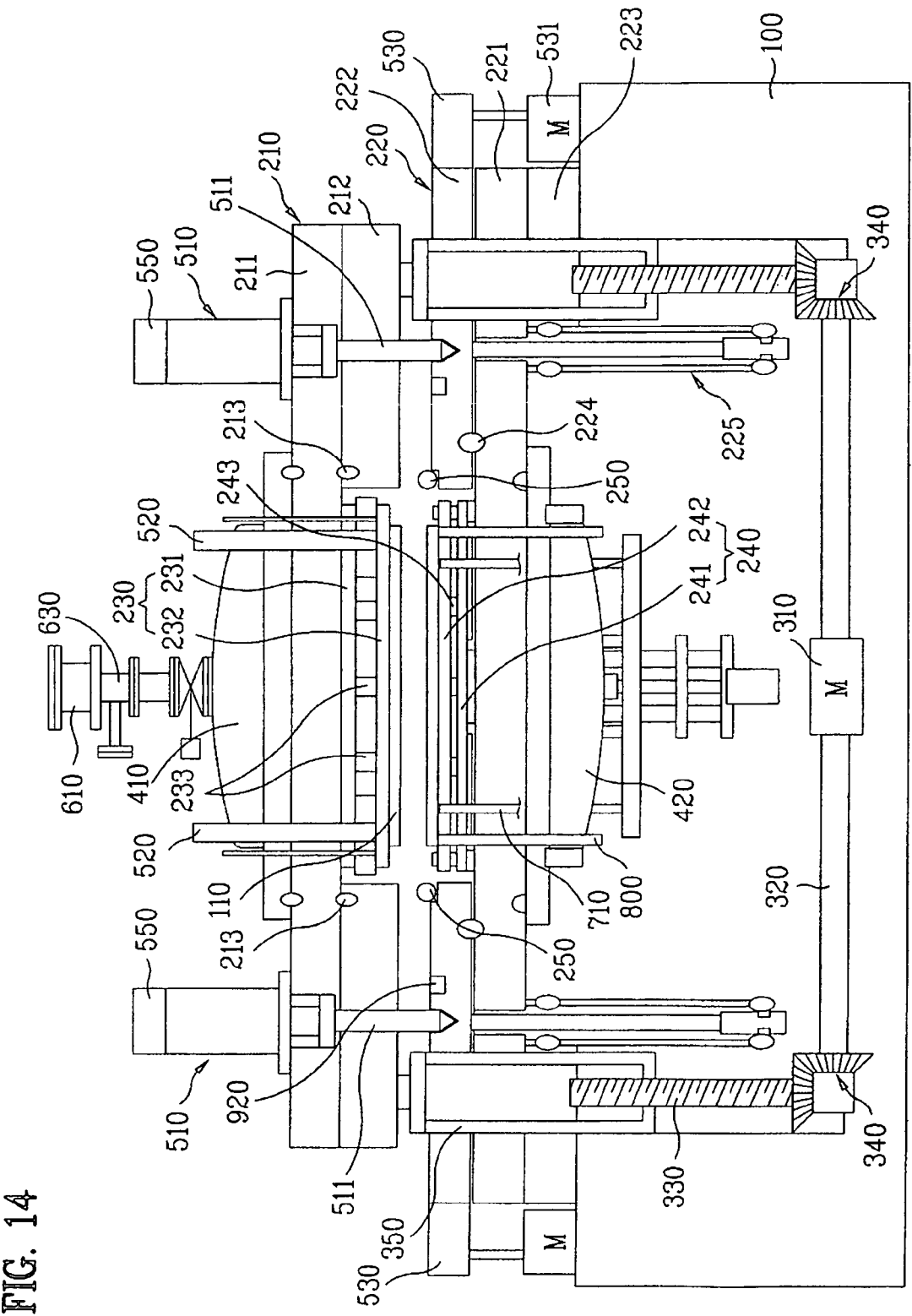
FIGS. 14 to 18 illustrate the bonding of the first and second substrates within the substrate bonding apparatus used in fabricating LCD devices according to the first embodiment of the present invention.

Referring to now FIG. 14, after loading of the substrate bonding apparatus is complete, the driving motor 310 of the chamber moving means may rotate the driving shafts 320 and the connecting shafts 330 to lower the jack parts 350. Accordingly, the upper chamber unit 210 may be lowered in unison with the jack parts 350. Further, the first actuators 510 may lower the plurality of first shafts 511 such that the first shafts 511 project to a predetermined height from the bottom surface of the upper chamber plate 212. As a result of the lowering of the upper chamber unit 210 and of the projection of the first shafts 511, the end portions of the first shafts 511 may be received within, and contact interior surfaces of respective ones of the receiving grooves 222a formed in the lower chamber plate 222.

In the event that the upper chamber unit 210 is not adequately level with respect to the lower chamber unit 220, the first shafts 511 may contact the interior surfaces of the receiving grooves 222a in succession. As mentioned above, the load cells 550 may determine when one of the first shafts 511 contacts a corresponding receiving groove 222a before others of the first shafts 511 contact their respective receiving grooves 222a. Further, the load cells 550 may determine when one of the first shafts 511 is pushing against a receiving groove 222a with a greater force than others of the first shafts 511 pushing against their respective receiving grooves 222a. Based on any of the determinations above, the load cells 550 may detect the orientation of the upper chamber unit 210 with respect to the lower chamber unit 220 and thus the orientation of the upper stage 230 with respect to the lower stage 240.

Figure 15:
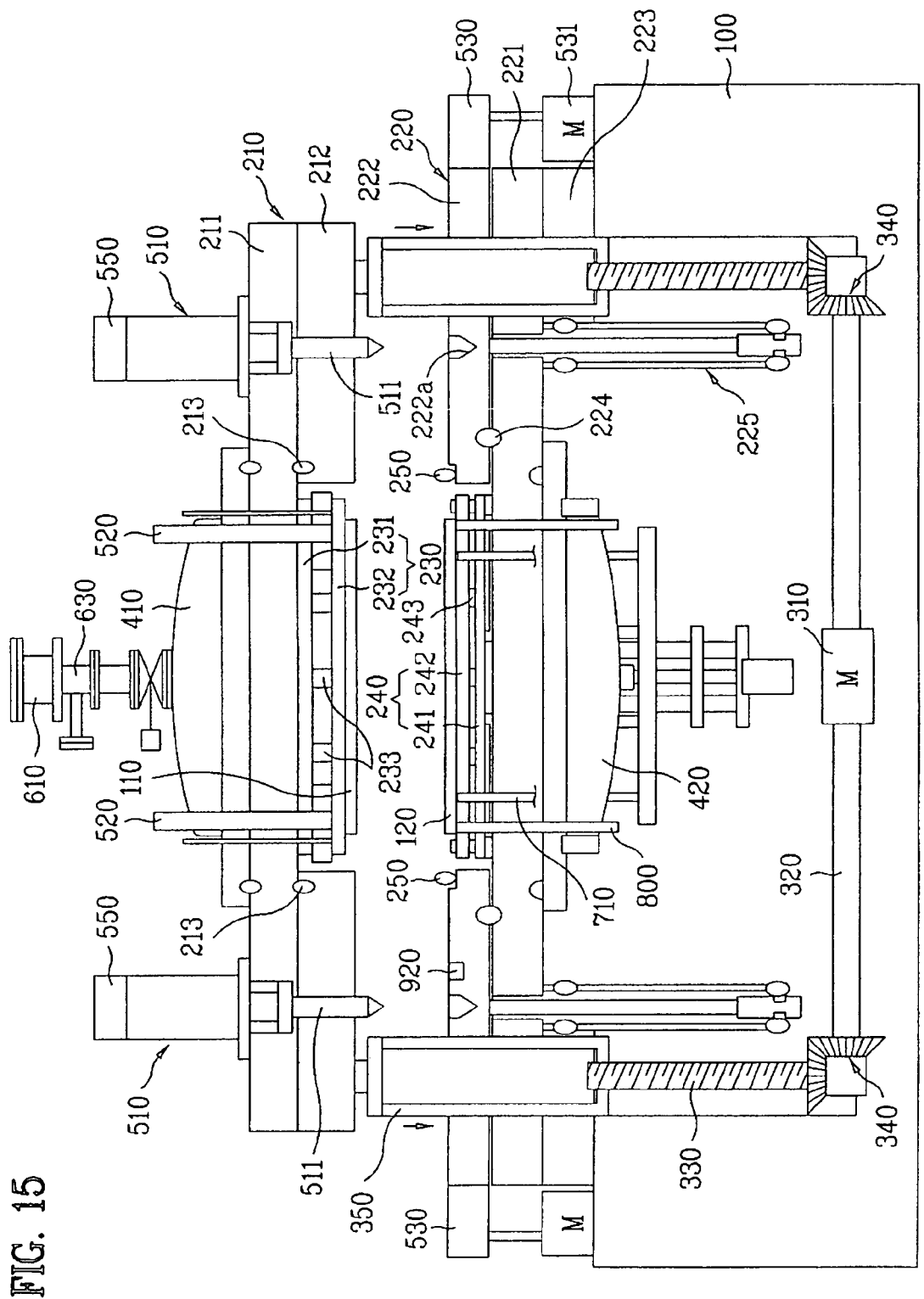

As shown in FIG. 15, if it is determined that the that the upper chamber unit 210 is not sufficiently level with respect to the lower chamber unit 220, the chamber moving means may raise the upper chamber unit 210, including the first actuators 510 and first shafts 511. Next, the first actuators 510 may selectively raise or lower predetermined ones of the first shafts 511 by a predetermined distances to ensure that the upper chamber unit 210 is properly oriented with respect to the lower chamber unit 220 upon being connected together and defining the interior space, thereby ensuring that the upper stage 230 is substantially parallel with the lower stage 240.

Figure 16:
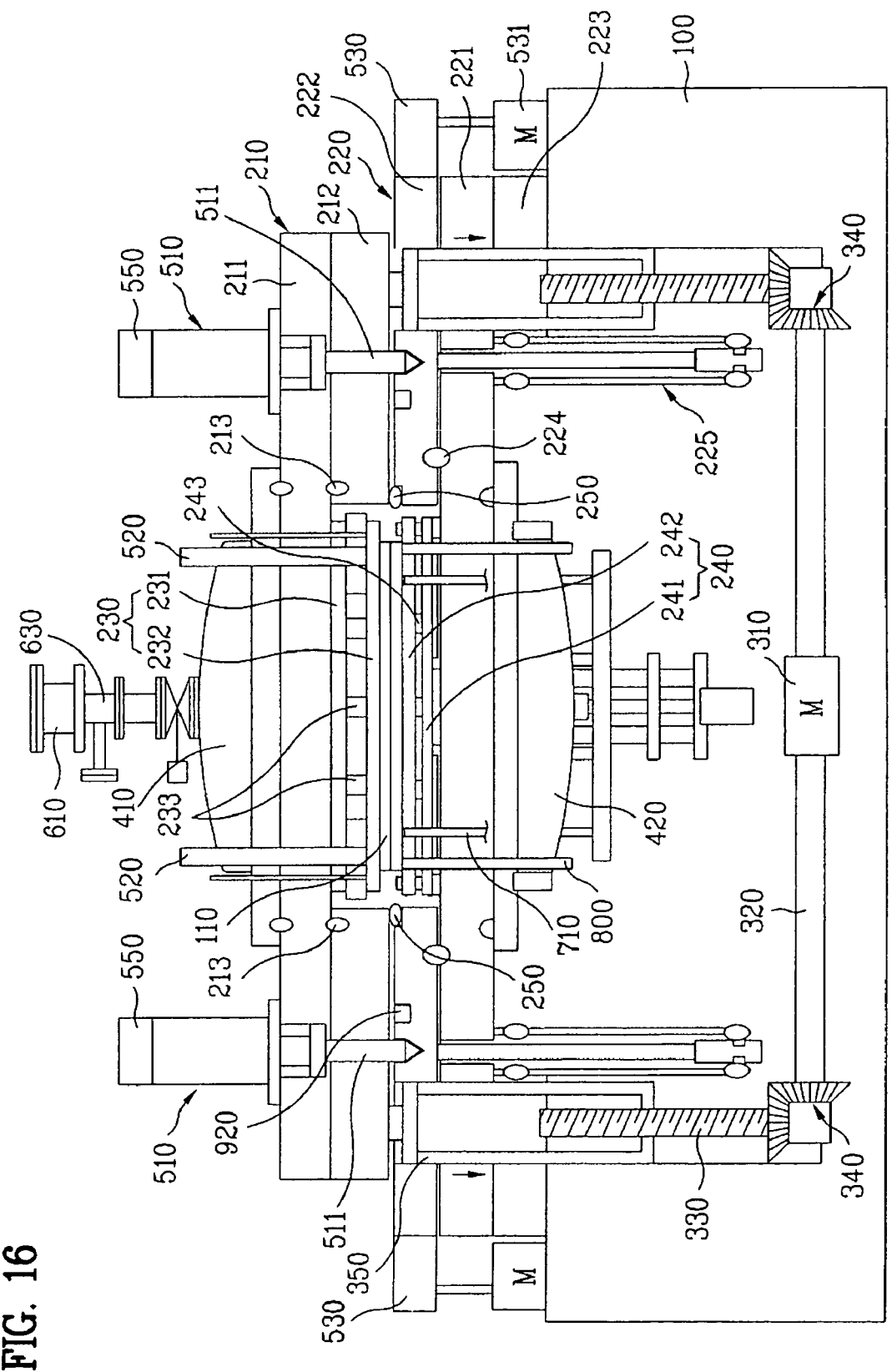

Referring now to FIG. 16, as the upper chamber unit 210 is lowered, the end portions of the first shafts 511 are received within the receiving grooves 222a. Accordingly, the chamber moving means lowers the upper chamber unit 210 such that a bottom surface of the upper chamber plate 212 contacts a top surface of the central sealing member 250, fitted to a periphery of the lower chamber plate 222.

Figure 17:
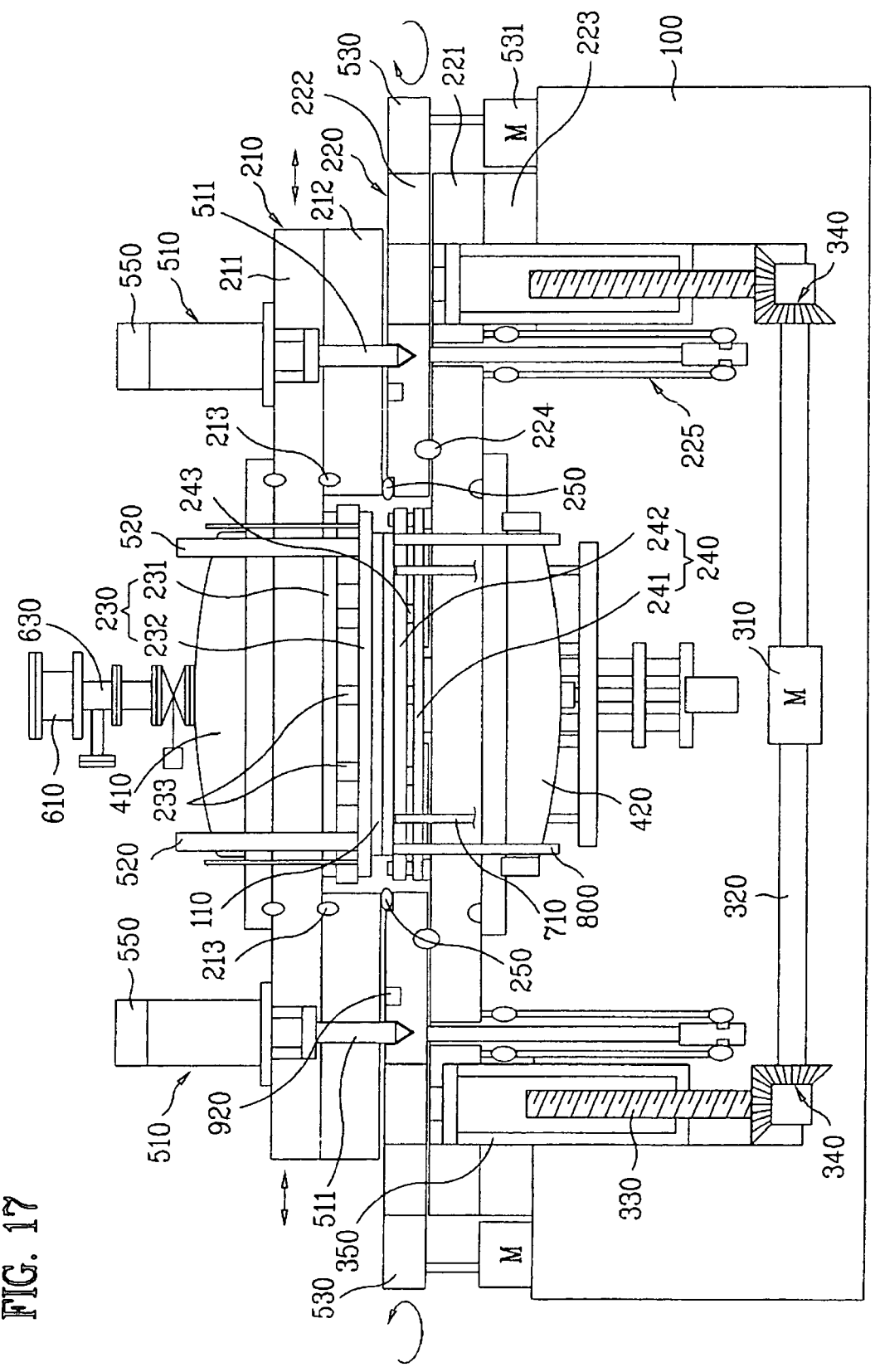

Referring to FIG. 17, as the jack parts 350 are lowered further, they move out from between the upper chamber unit 210 and the lower chamber unit 220 such that a sealed interior space, defined by the upper and lower chamber units 210 and 220 is created. Accordingly, central sealing member 250 is compressed to a thickness of about 5 μm and the interior space is substantially sealed from the external environment due to the weight of the upper chamber unit 210 pressing upon the central sealing member 250. Therefore, the first and second substrates 110 and 120 may be substantially isolated from the external environment while being spaced apart from each other by a predetermined distance.

Once sealed, the interior space defined by the upper and lower chamber units 210 and 220 may be evacuated using the first low vacuum pump 621. In one aspect of the present invention, the first low vacuum pump 621 may evacuate the sealed interior space to a first pressure, measured by the pressure sensor 670. After it is determined that the first low vacuum pump 621 has evacuated the interior space to the first pressure, the high vacuum pump 610 may be activated to substantially evacuate the interior space. In one aspect of the present invention, the high and first low vacuum pumps 610 and 621 may be connected to the same pipeline 630. Therefore, the first low vacuum pump 621 may be deactivated when the high vacuum pump 610 is activated. After the interior space is substantially evacuated, the first and second substrates 110 and 120, arranged within the evacuated, sealed interior space may be aligned by the second alignment means.

Upon aligning the first and second substrates 110 and 120, the alignment cameras 520 may view alignment marks (not shown) formed on the first and second substrates 110 and 120. Subsequently, any deviation in alignment between the substrates 110 and 120 may be determined in a first determination step; based on the first determination step, a distance required to horizontally move the upper stage 230 and correct the deviation in alignment may be determined in a second determination step; based on the second determination step, the degree to which the cams 530 must be rotated to correct the deviation in alignment may be determined in a third determination step; based on the third determination step, the cams 530 may be rotated by a predetermined amount to horizontally move the lower chamber plate 222 and correct the deviation in alignment. For example, if the upper stage 230 must be moved 1 mm and 0.5 mm toward the rear and left sides, respectively, of the substrate bonding apparatus, the cams 530 may be rotated to move the lower chamber plate 222 1 mm and 0.5 mm toward the rear and left sides, respectively, of the substrate bonding apparatus. In one aspect of the present invention, the cams 530 may be arranged to selectively contact peripheral front (or rear) and left (or right) sides of the lower chamber plate 222. In another aspect of the present invention, the restoring means 540 enables the lower chamber plate 222 to maintain contact with the lower chamber plate 222 and thus facilitates alignment of the first and second substrates 110 and 120.

According to the principles of the present invention, the lower chamber plate 222 may be coupled to the upper chamber unit 210 via the first actuators 510. Further, the lower chamber plate 222 may be arranged over the lower base 221 by a predetermined distance via the support part 225. Therefore, the upper chamber unit 210 may move substantially in unison with the lower chamber plate 222 as dictated by the rotation of the cams 530 and restoration means 540. Moreover, since the lower chamber plate 222 is separated from the lower stage 240 (e.g., capable of moving independently of the lower stage 240) the first and second substrates 110 and 120, held by their respective stages 230 and 240, may be smoothly aligned by moving only the upper stage 230.

In one aspect of the present invention, the first and second substrates 110 and 120 may be aligned by aligning alignment marks (not shown) formed on the substrates. In another aspect of the present invention, the alignment marks may be provided as rough alignment marks and fine alignment marks. In one aspect of the present invention, the rough and fine alignment marks may be formed by carving predetermined regions of the substrates. Accordingly, an alignment process may, for example, be carried out by performing a rough alignment process using the rough alignment marks followed by performing a fine alignment process using the fine alignment marks.

Figure 18:
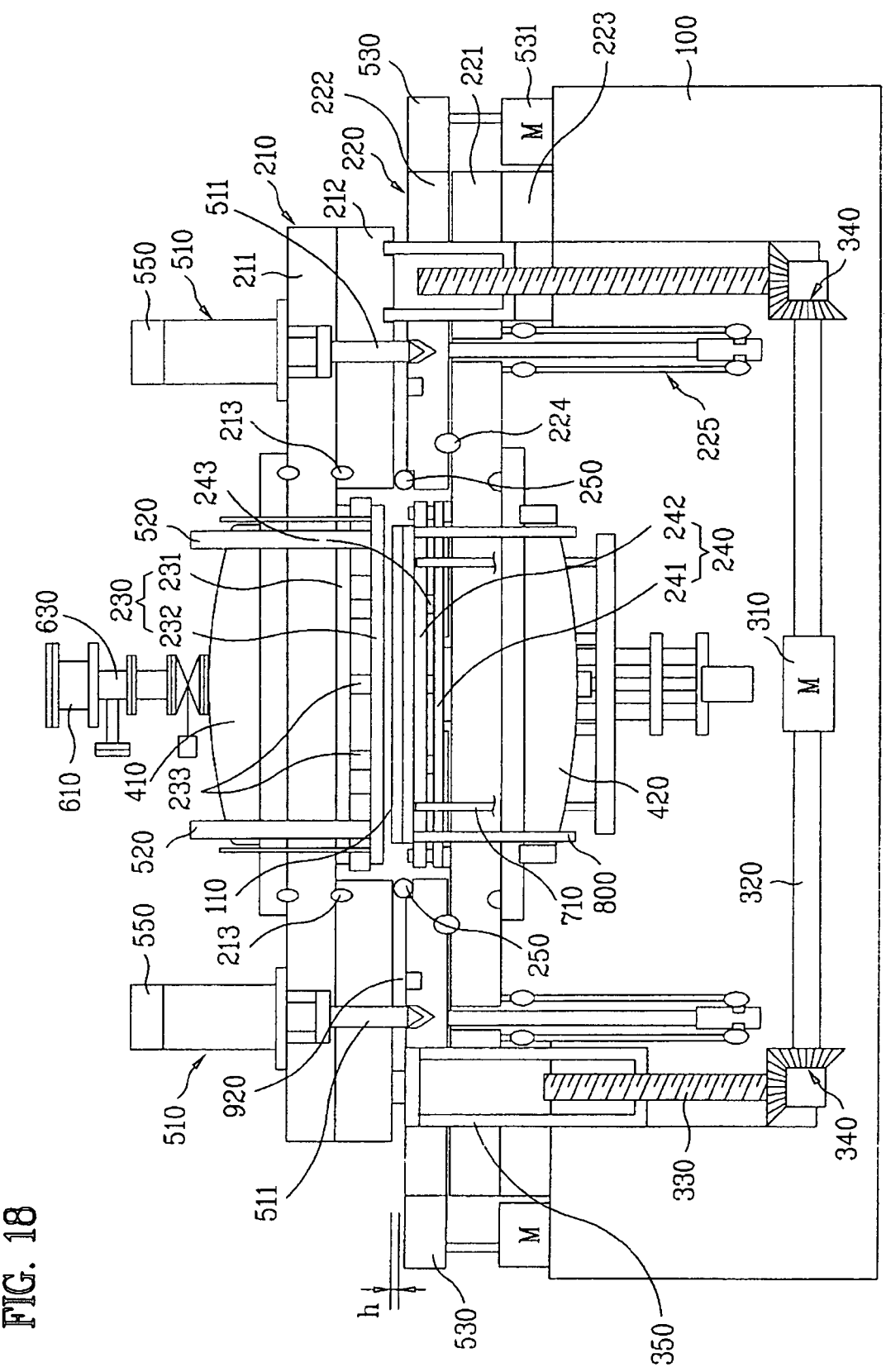

Referring to FIG. 18, after alignment of the first and second substrates 110 and 120 is complete, a power applied to the upper stage 230 generating the electrostatic charge may be turned off, the chamber moving means raise the upper chamber unit 210 upward to a predetermined height, h, and the interior space may be vented to, for example, atmospheric pressure.

In one aspect of the present invention, the predetermined height, h, may be large enough such that the first substrate 110 may be separated from the upper stage 230 and adhered to the second substrate 120, wherein the interior space remains sealed from the external environment via the central sealing member 250. In another aspect of the present invention, venting of the sealed interior space may be accomplished by injecting a gas such as nitrogen ($N_2$) into the interior space via the upper and lower vacuum pipelines 271 and 272 connected to the second low vacuum pump 622 and thus through the upper and lower vacuum holes 232a and 242a within respective holding plates 232 and 242 of the upper and lower stages 230 and 240, respectively. In one aspect of the present invention, venting of the sealed interior space may further be accomplished, for example, by injecting a gas such as nitrogen ($N_2$) into the interior space through the low vacuum pipelines 641 and 642 connected to the second low vacuum pump 622.

Accordingly, upon turning off the power applied to the upper stage 230, the first substrate 110 may become separated from the upper stage 230 and remain arranged on the second substrate 120, held by the lower stage 240. Moreover, the first and second substrates 110 and 120 may become bonded to each other due to the pressure induced by gas flowing through the upper and lower passages 232a and 242a. Further, the first and second substrates 110 and 120 may become bonded to each other due to the increased difference in the pressure within the cell gap of the bonded substrates and the pressure within the vented, sealed interior space defined by the upper and lower chamber units 210 and 220.

After venting of the sealed interior space defined by the upper and lower chamber units 210 and 220 is complete, the bonded substrates may be unloaded from the substrate bonding apparatus and the aforementioned processes may be repeated with other sets of substrates.

Figure 19:
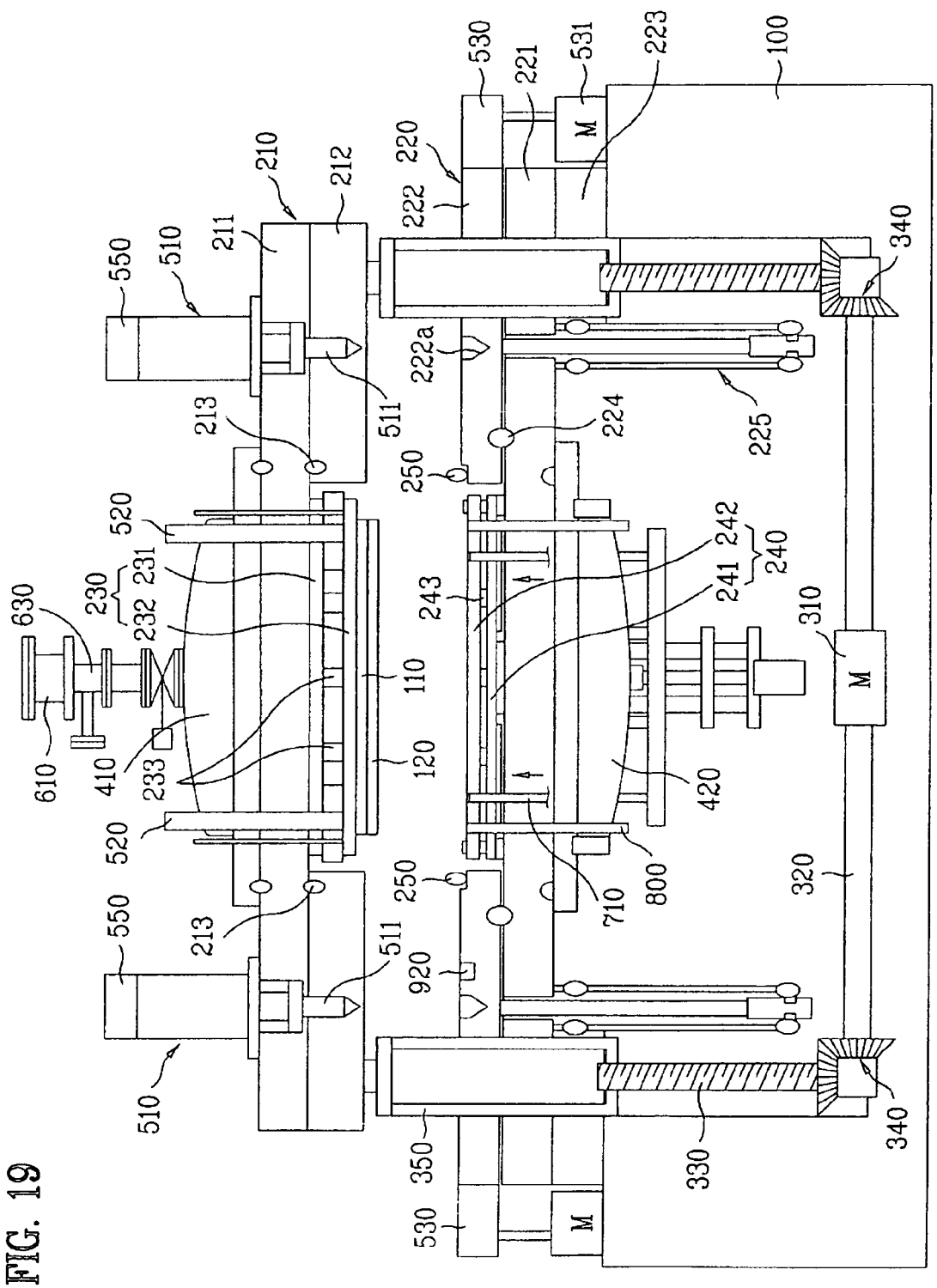
FIGS. 19 to 22 illustrate the unloading of bonded substrates from the substrate bonding apparatus used in fabricating LCD devices according to one aspect of the first embodiment of the present invention.

In one aspect of the present invention, and with reference to FIG. 19, the bonded substrates 110 and 120 may be unloaded from within the substrate bonding apparatus by deactivating the electrostatic charge and suction force applied by the lower stage 240, holding the bonded substrates to the upper stage 230 by the suction force and by the electrostatic charge, raising the upper stage 230 to a predetermined height such that a subsequently inserted substrate loader 910 does not damage the bonded substrates held to the upper stage 230.

Figure 20:
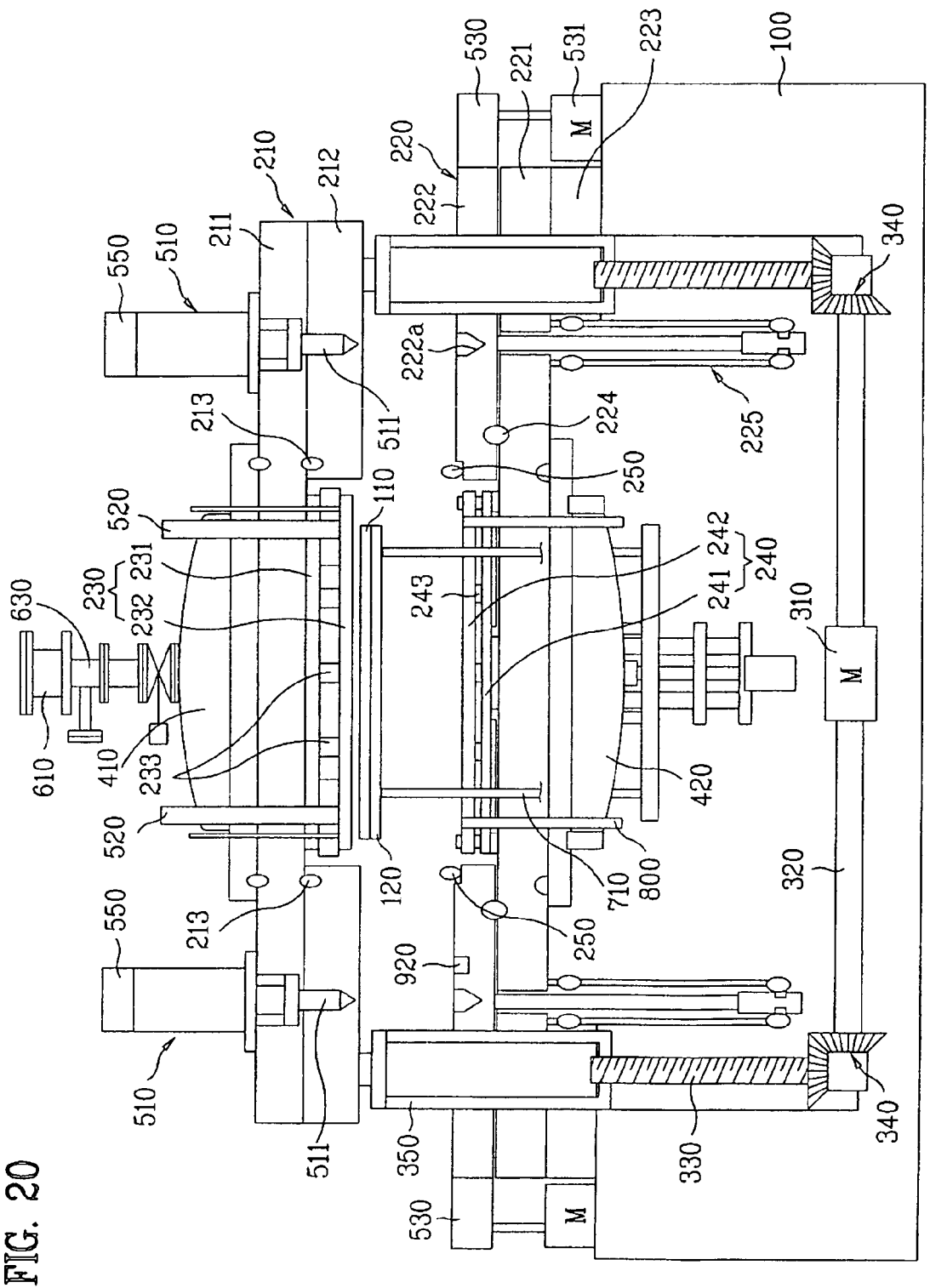

Referring to FIG. 20, the lift pin 710 of the support means may then be raised over the upper surface of the lower stage 240 proximate the bonded substrates 110 and 120, secured to the upper stage 230. Next, the suction force and the electrostatic charge applied by the upper stage 230 may be turned off, releasing the bonded substrates from the upper stage 230, and allowing the bonded substrates to become supported by the top surface of the lift pin 710.

Figure 21:
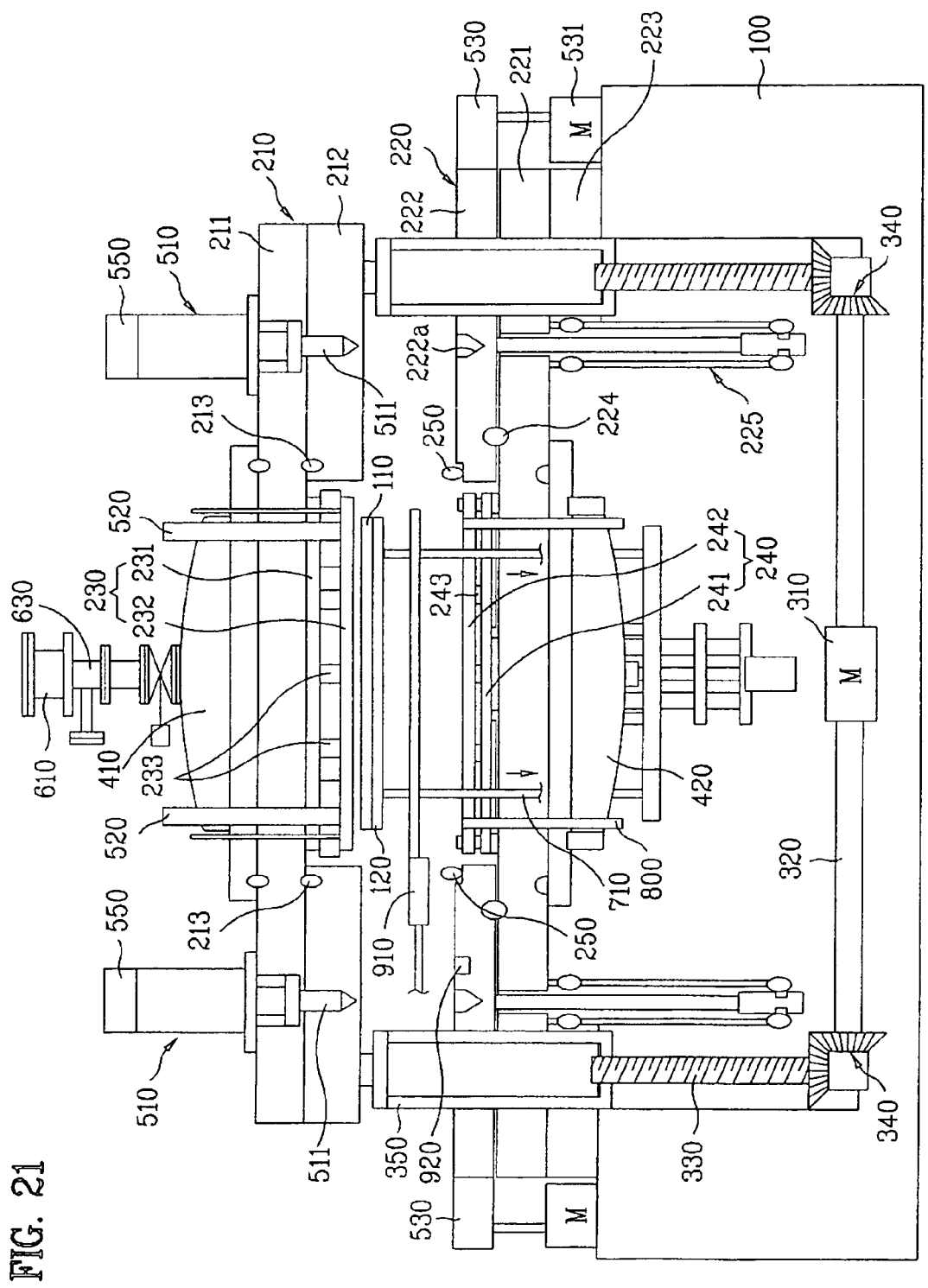
Figure 22:
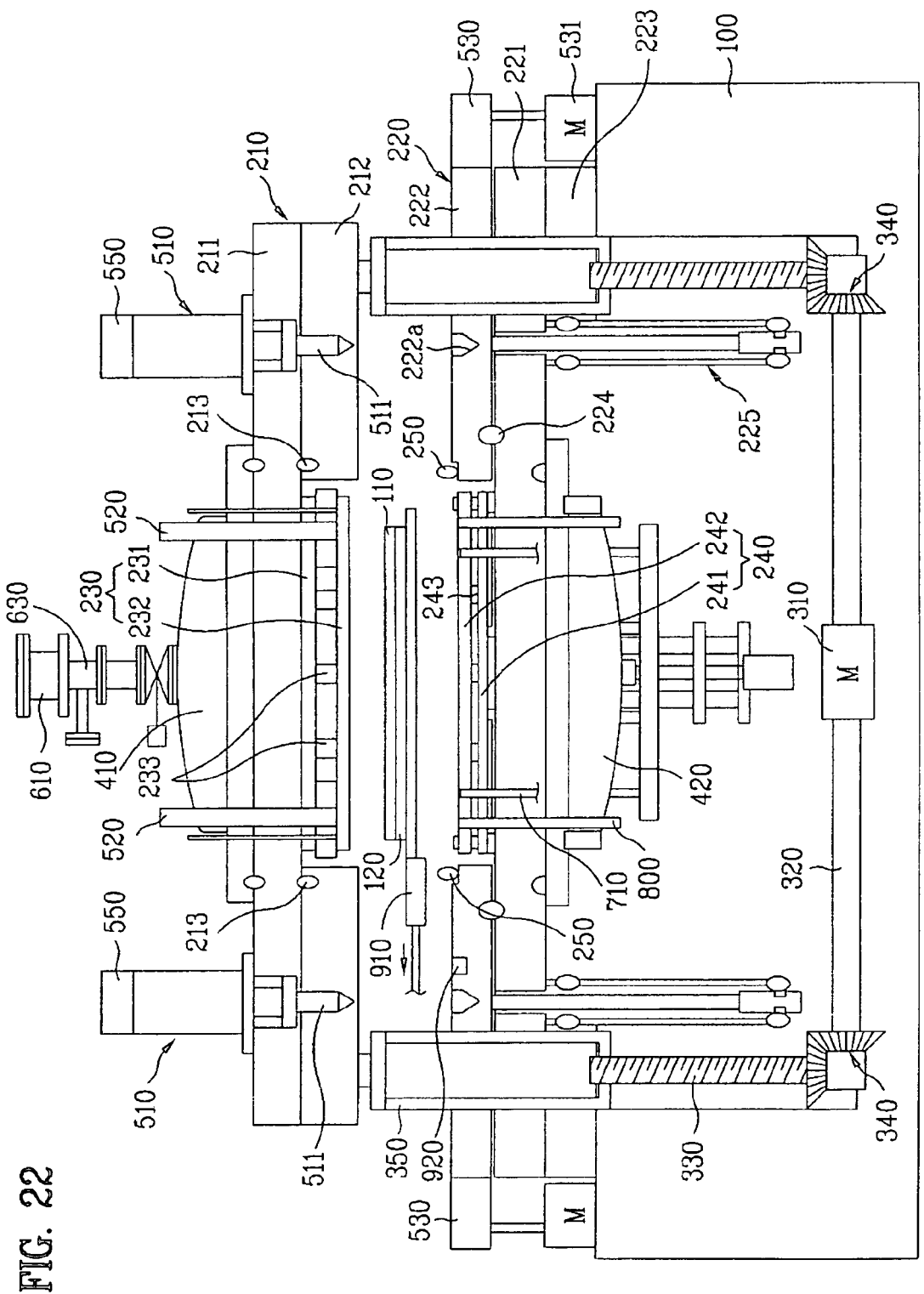

Referring to FIG. 21, the substrate loader 910 may be inserted into the substrate bonding apparatus and arranged proximate a lower portion of the lift pin 710. Subsequently, and with reference to FIG. 22, the lift pin 710 may then be lowered such that the bonded substrates become supported by the substrate loader 910. The substrate loader 910 may then be removed from the substrate bonding apparatus and to thereby complete unloading of the bonded substrates 110 and 120.

In another aspect of the present invention, the bonded substrates 110 and 120 may be unloaded by holding the bonded substrates 110 and 120 to the upper stage 230, raising the upper stage 230, inserting the substrate loader 910 into the substrate bonding apparatus and proximate the bonded substrates held to the upper stage 230, releasing bonded substrates directly onto the substrate loader 910, and removing the substrate loader 910 supporting the bonded substrates from the substrate bonding apparatus. Subsequently, the substrate loader 910 may load an unbonded first substrate 110 into the substrate bonding apparatus to be held by the upper stage 230.

Figure 23:
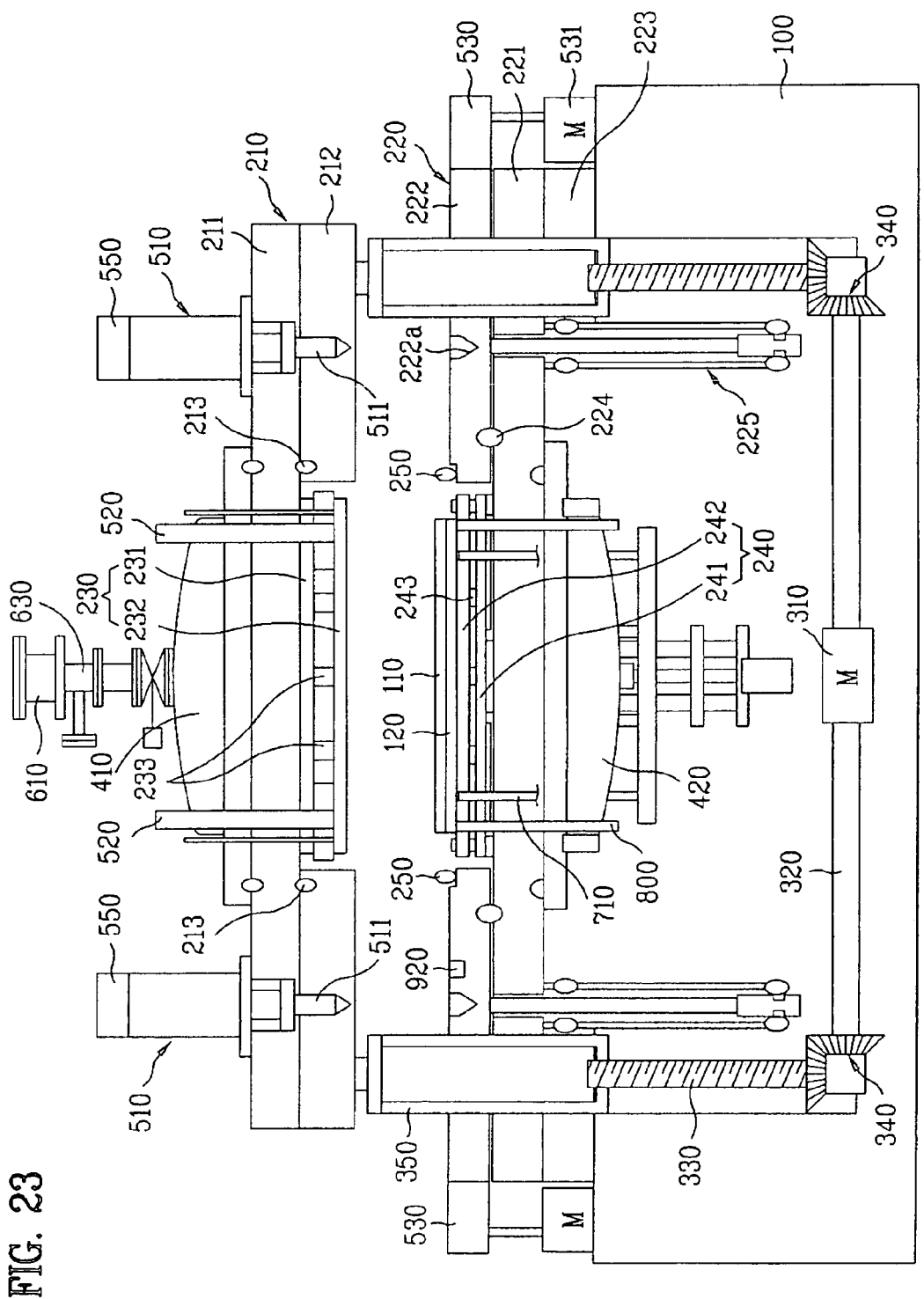
FIGS. 23 to 25 illustrate the unloading of bonded substrates from the substrate bonding apparatus used in fabricating LCD devices according to another aspect of the first embodiment of the present invention.
Figure 24:
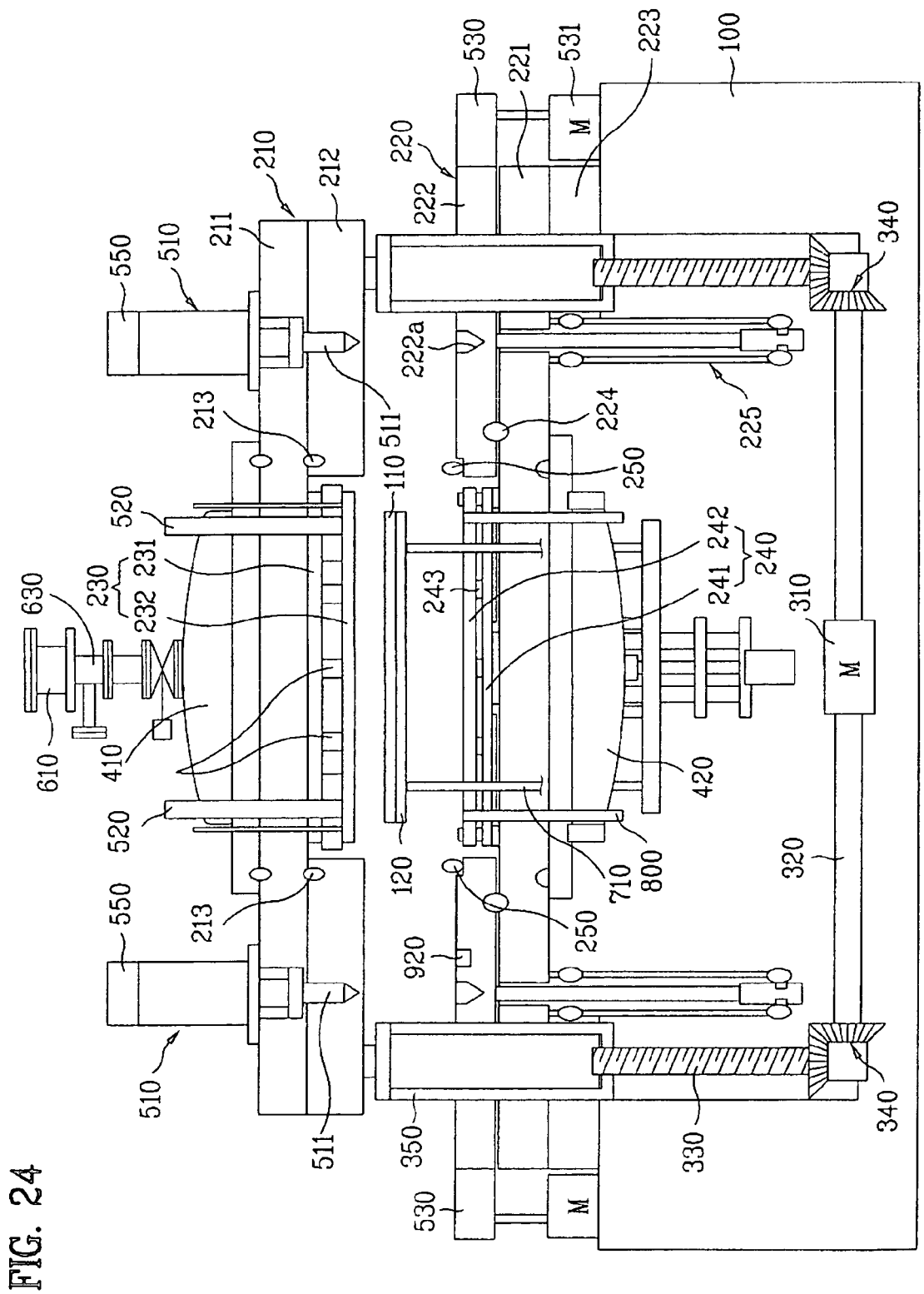
Figure 25:
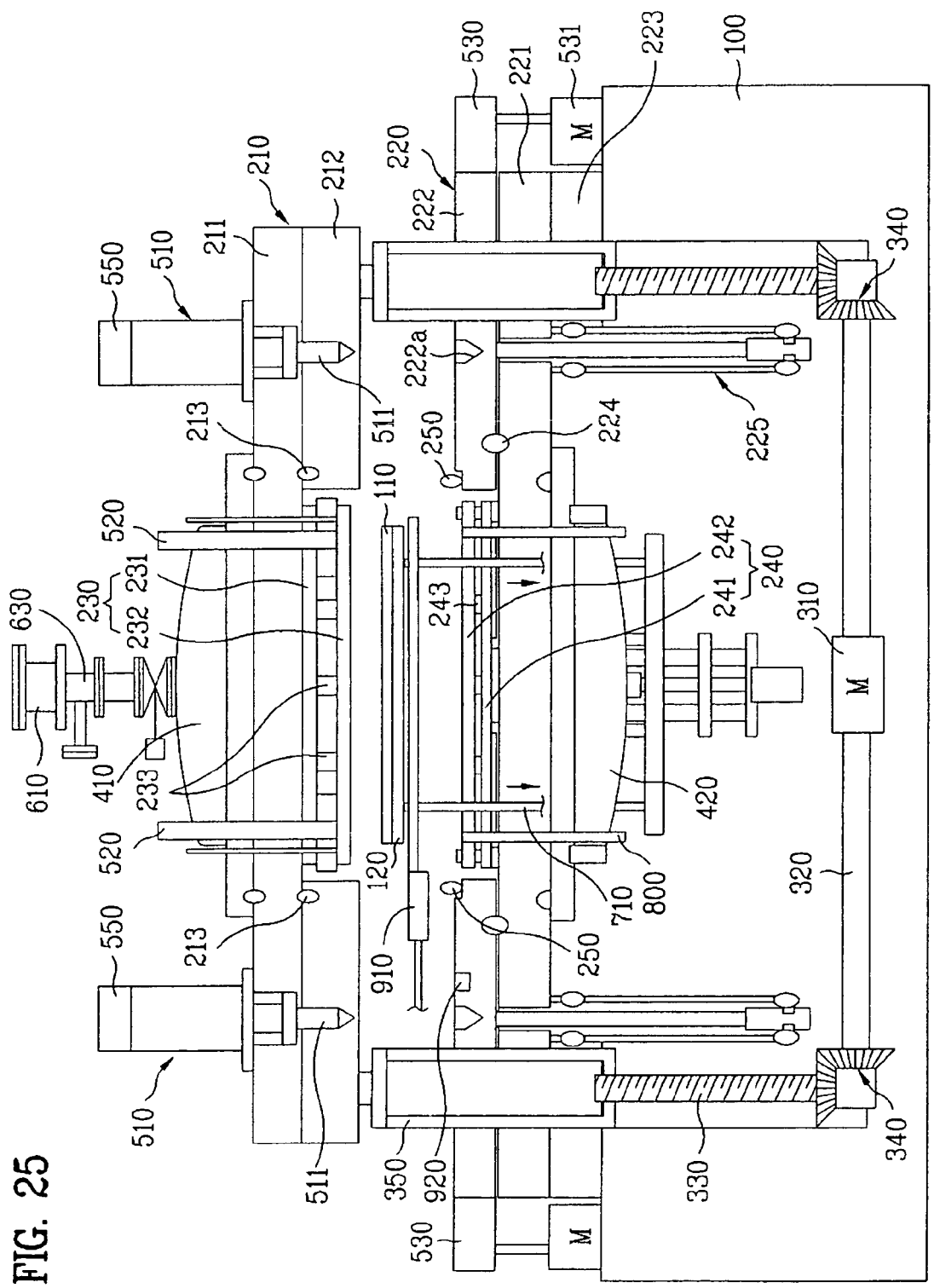

In yet another aspect of the present invention, and with reference to FIG. 23, the bonded substrates 110 and 120 may be removed by deactivating the suction force and electrostatic charge applied by the upper stage 230 and raising the upper chamber unit 210 to a predetermined standby height, wherein the bonded substrates are not held to the upper stage 230. Next, referring to FIG. 24, the lift pin 710 may be raised to lift the bonded substrates 110 and 120 above the lower stage 240. Referring to FIG. 25, the substrate loader 910 may be inserted into the substrate bonding apparatus and arranged proximate to the bonded substrates, the lift pin 710 may be lowered such that the bonded substrates are supported by the substrate loader 910, and the substrate loader 910 supporting the bonded substrates may be removed from the substrate bonding apparatus to thereby complete unloading of the bonded substrates 110 and 120.

According to principles of the present invention, sealant material (not shown) arranged between the first and second substrates may be exposed to UV light by the photohardening means 800 before the raising the upper chamber unit 210 by the predetermined distance, h, before the venting, after the venting, or any combination thereof. Directing the UV light to the sealant material may substantially minimize the degree to which the first and second substrates 110 and 120 become misaligned as a result of the venting. According to another aspect of the present invention, the UV light may be directed to the sealant material after the venting to substantially minimize the degree to which the bonded substrates become misaligned from external impacts sustained while being transported to a subsequent processing station.

As mentioned above, the central sealing member 250 has the predetermined thickness and projects to a predetermined height above the top surface of the lower chamber plate 222. Moreover, the thickness of the central sealing member 250 corresponds to a reference thickness of substrates to be bonded within the substrate bonding apparatus of the first embodiment of the present invention. Accordingly, when the actual thickness of substrates loaded into the substrate bonding apparatus of the first embodiment of the present invention deviates from the reference thickness, the thickness of the central sealing member 250 within the substrate bonding apparatus of the first embodiment of the present invention must also change if the loaded substrates are to be properly bonded together within the evacuated interior space.

Therefore, and with reference to FIGS. 26-30, a substrate bonding apparatus in accordance with principles of a second embodiment of the present invention may, for example, include least one first interval control groove 210a arranged within a bottom surface of the upper chamber plate 212 and a plate moving means for horizontally moving the lower chamber plate 222 with respect to the upper chamber plate 212 or for horizontally moving the upper chamber plate 212 with respect to the lower chamber plate 212. In an alternate aspect of the present invention, the central sealing member 250 may be arranged on the surface of the upper chamber plate 212 while the first interval control groove 210a may be arranged within the lower chamber plate 222.

According to the principles of the present invention, the central sealing member 250 projects from the bottom surface of the lower chamber plate 212 to a predetermined height to enable the substrates to be bonded to each other while maintaining contact with the upper chamber unit 210, thereby sealing the interior space from the exterior environment. Accordingly, the distance to which the upper and lower stages 230 and 240 must be spaced apart from each other (i.e., the bonding distance) to adequately bond the first and second substrates 110 and 120 while ensuring that the interior space is sufficiently sealed depends upon the thickness of the first and second substrates. Therefore, the height of the first interval control groove 210a within the upper chamber plate 212 (or its depth within the lower chamber plate 222) may correspond to the thickness of the loaded substrates. For example, and as described above with respect to the first embodiment, the central sealing member 250 may be compressed to a thickness of about 5 μm to bond loaded substrates having some reference thickness. If, however, the actual thickness of the loaded substrates to be bonded is about 3 μm less than the reference thickness, then the first interval control groove 210a may, for example, have a height within the upper chamber plate 212 (or depth within the lower chamber plate 222) of about 2 μm.

In one aspect of the present invention, and depending on the thickness of the loaded substrates, the central sealing member 250 may be aligned with respect to the upper chamber plate 212 such that the entire central sealing member 250 is received within the first interval control groove 210a or such that first portions of the central sealing member 250 are received within the first interval control groove 210a and second portions contact portions of the upper chamber plate 212 outside the first interval control groove 210a. Due to the elastic properties of the central sealing member 250, the interior space defined by the upper and lower chamber units 210 and 220, respectively, may be completely sealed even when the central sealing member 250 is aligned with respect to the upper chamber plate 212 such that first portions of the central sealing member 250 are received within the first interval control groove 210a and second portions contact portions of the upper chamber plate 212 outside the first interval control groove 210a. Moreover, the elastic properties of the central sealing member 250 enable the distance between the upper and lower stages 230 and 240, respectively, to be substantially uniformly maintained.

According to the principles of the present invention, the at least one first interval control groove 210a may include a single first interval control groove 210a. In another aspect of the present invention, the at least one first interval control groove 210a may include a plurality of first interval control grooves 210a. In still another aspect of the present invention, the first interval control groove 210a may be formed to a predetermined height within the upper chamber plate 212 and may receive the central sealing member 250. In yet another aspect of the present invention, the predetermined height to which the first interval control groove 210a is formed within the upper chamber plate 212 may vary with the distance of the first interval control groove 210a from the upper space defined by the upper chamber plate 212. For example, the height of the first interval control groove 210a may vary step-wise in accordance with the distance of the first interval control groove 210a from the upper space defined by the upper chamber plate 212. In still a further aspect of the present invention, a plurality of concentrically arranged first interval control grooves 210a may be arranged within the bottom surface of the upper chamber plate 212, wherein the heights of the plurality of first interval control grooves 210a vary in accordance with the distance of each first interval control groove 210a from the upper space defined by the upper chamber plate 212.

In one aspect of the present invention, the plate moving means may, for example, comprise at least a portion of the aforementioned second alignment means. Accordingly, the plate moving means may, for example, include at least one cam motor 531 mounted to the lower base 221, at least one cam 530 rotatably arranged to selectively contact a peripheral surface of the lower chamber plate 222, and at least one restoring means provided adjacent to a respective cam 530 for exerting a restoring force in a direction opposite to the direction the cam 530 pushes on the lower chamber plate 222. Accordingly the at least one cam 530 may be eccentrically rotatable by the cam motor 531.

Figure 26:
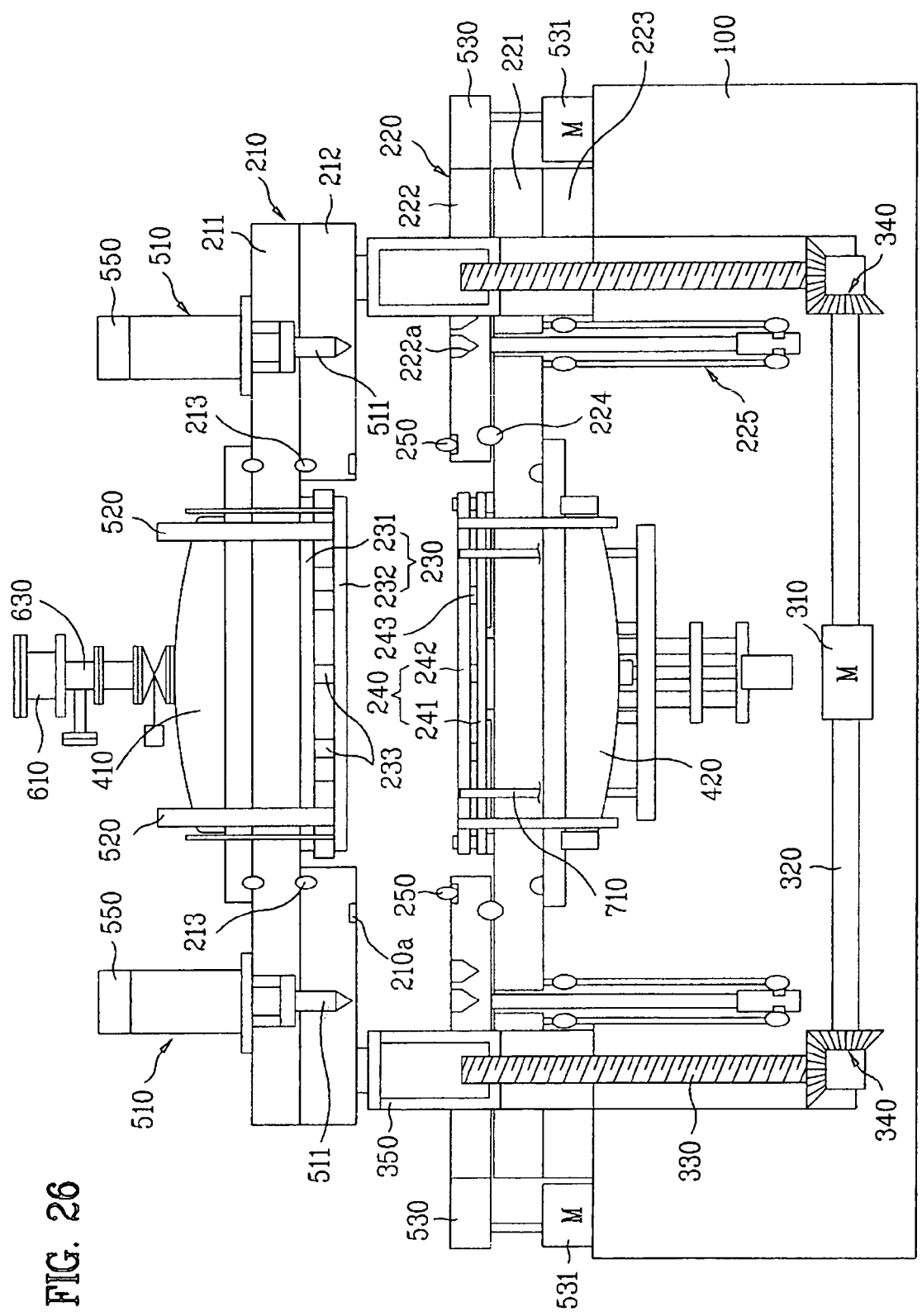
FIG. 26 illustrates a schematic view of a substrate bonding apparatus used in fabricating LCD devices according to a second embodiment of the present invention.

Having described the substrate bonding apparatus according to the second embodiment of the present invention, a method of fabricating LCD devices using the substrate bonding apparatus shown in FIG. 26 will now be described in greater detail with reference to FIGS. 26-30.

Prior to loading any substrate within the substrate bonding apparatus of the second embodiment of the present invention, the thickness of the first and second substrates 110 and 120 may be determined. In one aspect of the present invention, the thickness of a substrate to be loaded may be determined by measuring the actual thickness of the substrate or by determining the reference thickness of the substrate. Based on the determined thickness of the first and second substrates 110 and 120 to be loaded, the moving distance (i.e., the distance the upper chamber unit 210, along with its components (e.g., upper base 211, upper chamber plate 212, upper stage 230, etc.) is lowered to bond the first and second substrates) is calculated. Accordingly, the moving distance corresponds to a distance between a first portion of the upper chamber plate 212 arranged opposite the central sealing member 250 and a portion of the first interval control groove 210a arranged within the upper chamber plate 212. Depending on the calculated moving distance, the central sealing member 250 may contact the bottom surface of the upper chamber plate 212 or the ceiling of the first interval control groove 210a.

Figure 27:
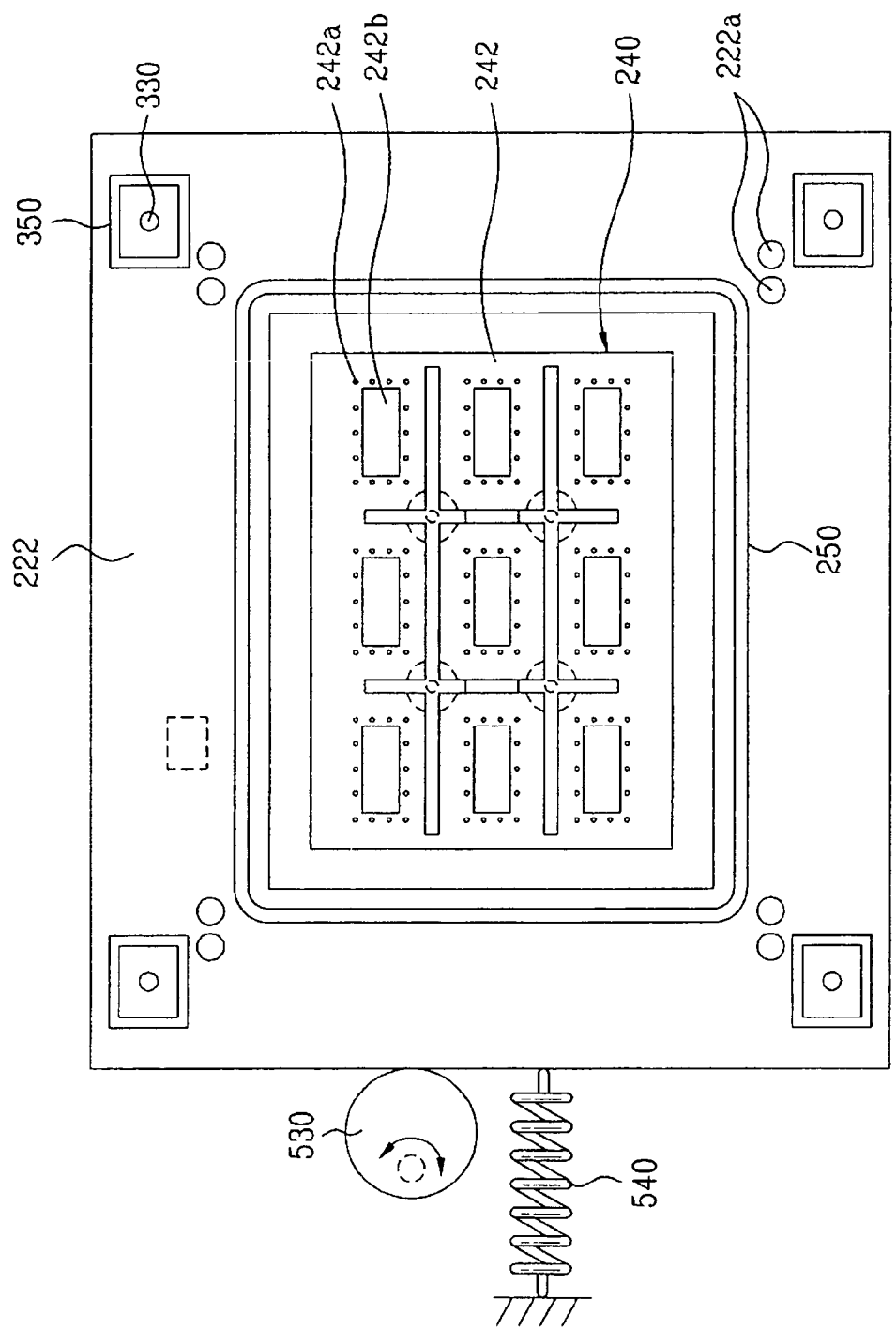
FIG. 27 illustrates a plan view of an arrangement of a plate moving means and a lower chamber unit of the substrate bonding apparatus used in fabricating LCD devices according to the second embodiment of the present invention.
Figure 28:
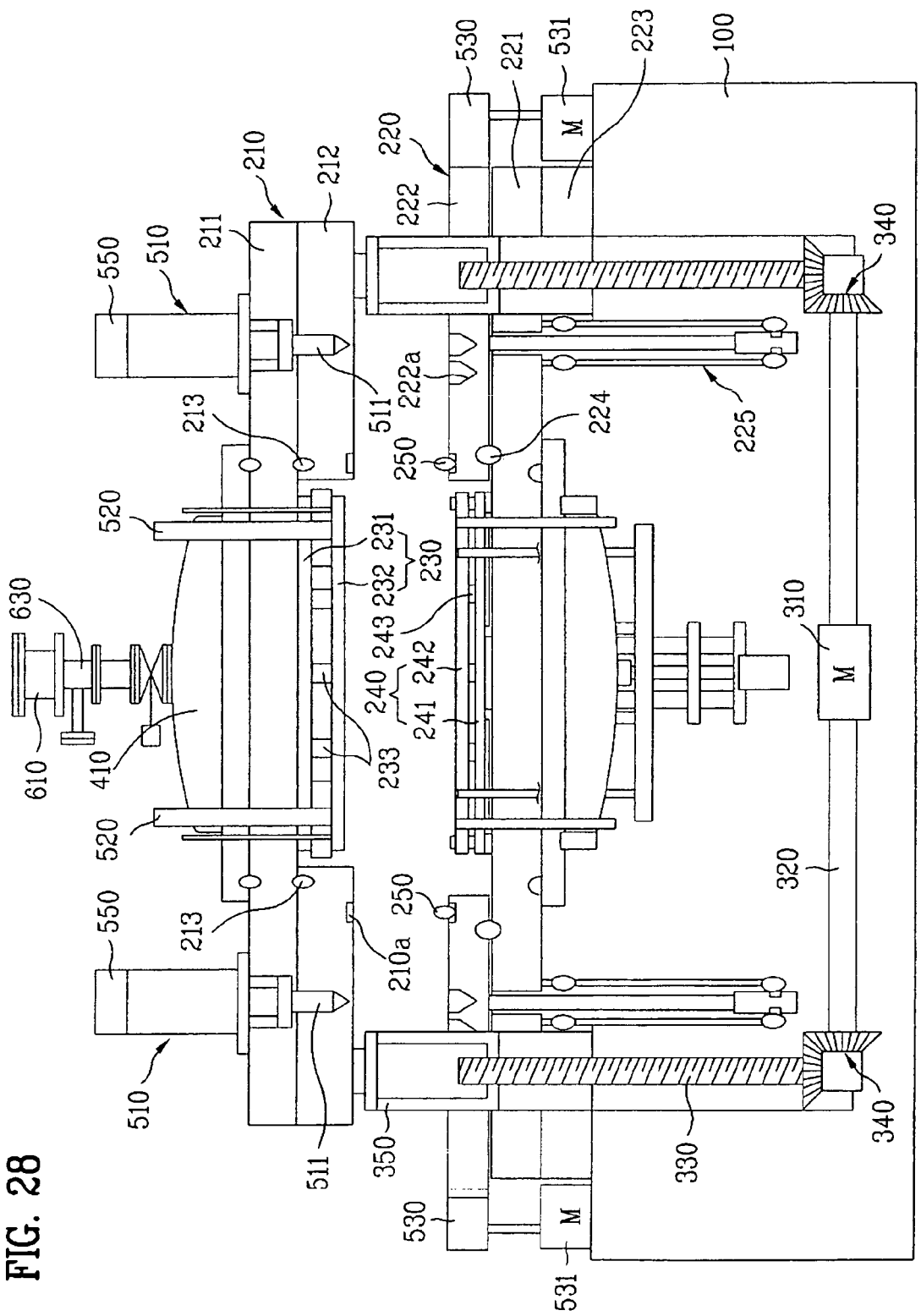
FIG. 28 illustrates a substrate thickness dependent operation of the substrate bonding apparatus used in fabricating LCD devices according to the second embodiment of the present invention.

For example, and while referring to FIG. 27, if it is determined that relatively thin substrates are to be bonded to each other (e.g., if the actual thickness of the substrates to be bonded is less than a reference thickness by about 3 μm), the cam motor 531 of the plate moving means may be driven to eccentrically rotate the cam 530 and to horizontally move the lower chamber plate 222 toward one side of the substrate bonding apparatus (e.g., the left side). More specifically, the cam 530 is eccentrically rotated away from the lower chamber plate 222 wherein the restoring means 540 applies a restoring force to the lower chamber plate 222 to maintain contact between the cam 530 and the lower chamber plate 222. Accordingly, and as shown in FIG. 28, the central sealing member 250 may be arranged vertically beneath the first interval control groove 210a for receipt by the first interval control groove 210a. In another example, if it is determined that relatively thick substrates are to be bonded to each other (e.g., if the actual thickness of the substrates to be bonded is substantially equal to the reference thickness), the cam motor 531 of the plate moving means may be driven to eccentrically rotate the cam 530 and to horizontally move the lower chamber plate 222 toward another side of the substrate bonding apparatus (e.g., the right side). More specifically, the cam 530 is eccentrically rotated toward the lower chamber plate 222 wherein the restoring means 540 applies a restoring force to the lower chamber plate 222 to maintain contact between the cam 530 and the lower chamber plate 222. Accordingly, and as shown in FIG. 26, the central sealing member 250 may be arranged to contact the bottom surface of the upper chamber plate 212, outside the first interval control groove 210a.

Figure 29:
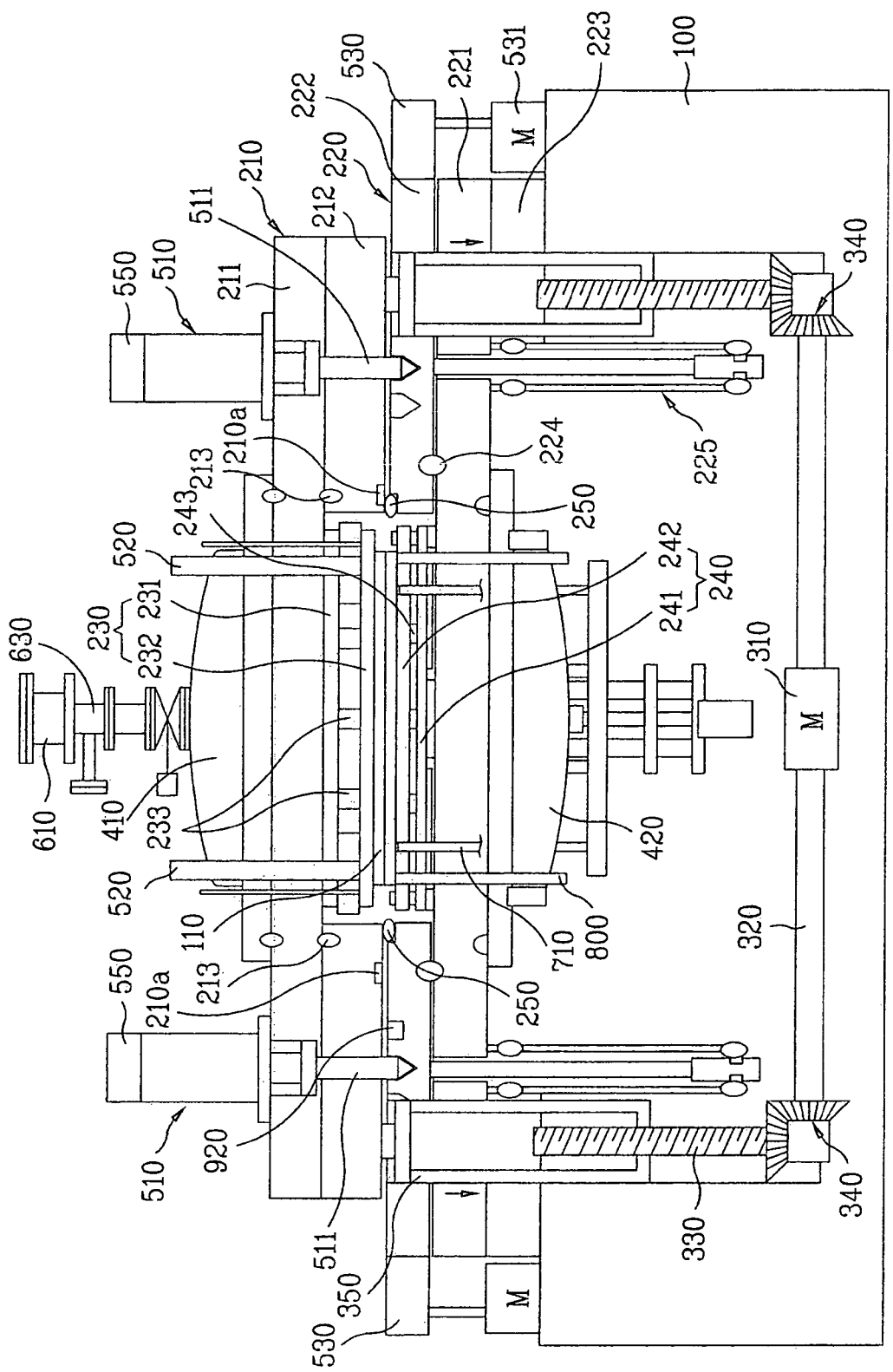
FIG. 29 illustrates the bonding of substrates within the substrate bonding apparatus used in fabricating LCD devices according to the second embodiment of the present invention.
Figure 30:
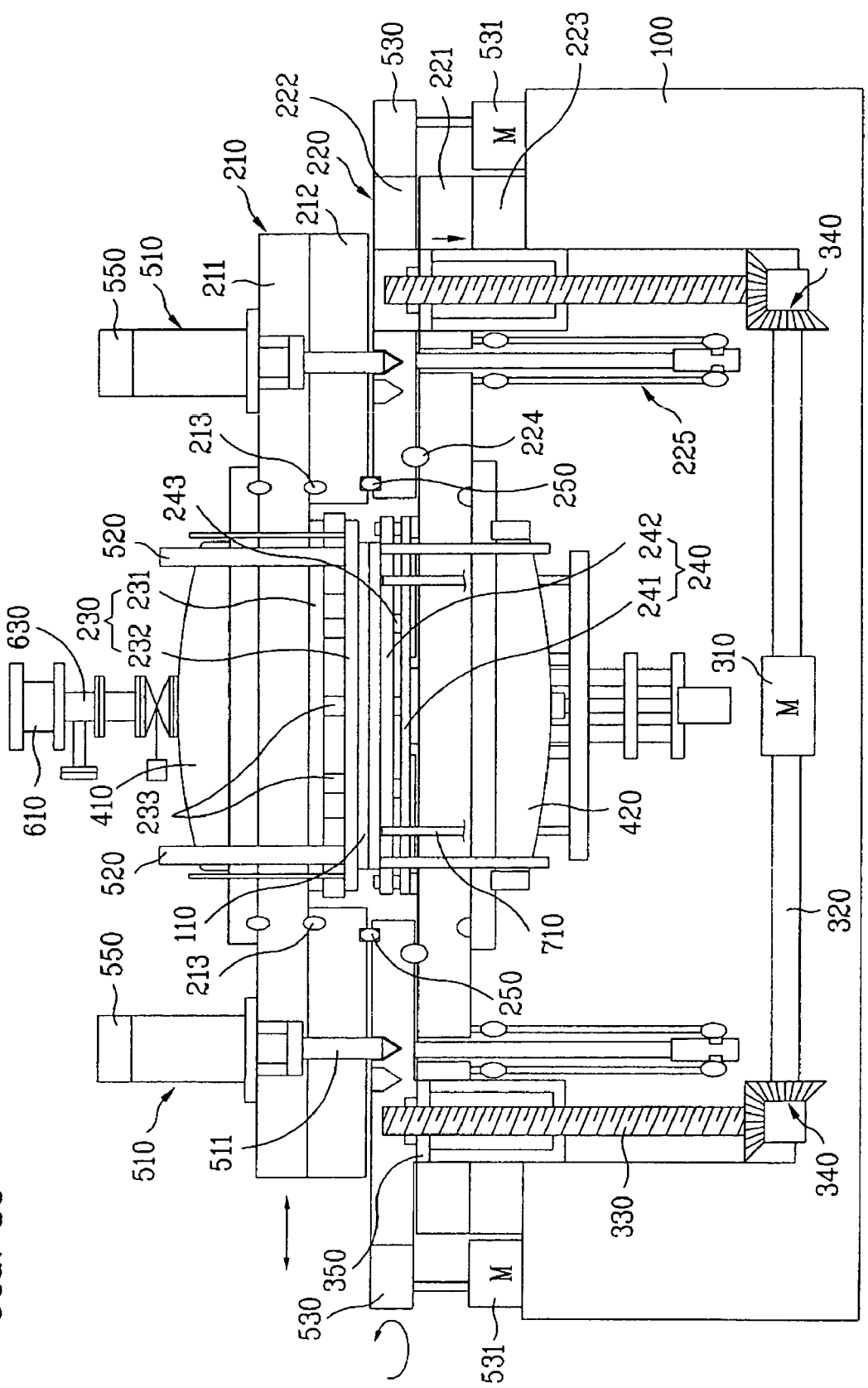
FIG. 30 illustrates bonded substrates within the substrate bonding apparatus used in fabricating LCD devices according to the second embodiment of the present invention.

After the position of the lower chamber plate 222 relative to the upper chamber plate 212 has been determined, the first and second substrates 110 and 120 may be loaded substantially as described above with respect to the first embodiment. After loading the first and second substrates 110 and 120, the lower chamber plate 222 may be positioned relative to the upper chamber plate 212 in accordance with the thickness of the first and second substrates 110 and 120. Subsequently, and as shown in FIGS. 29 and 30, the upper chamber unit 210 may be lowered. Accordingly, the upper chamber plate 212 may be arranged proximate the lower chamber plate 222 in accordance with the thickness of the first and second substrates 110 and 120 such that the first and second substrates 110 and 120 are bonded to each other. In one aspect of the present invention, the first and second substrates 110 and 120 may be bonded to each other by the same bonding process described with reference to the first embodiment.

Figure 31:
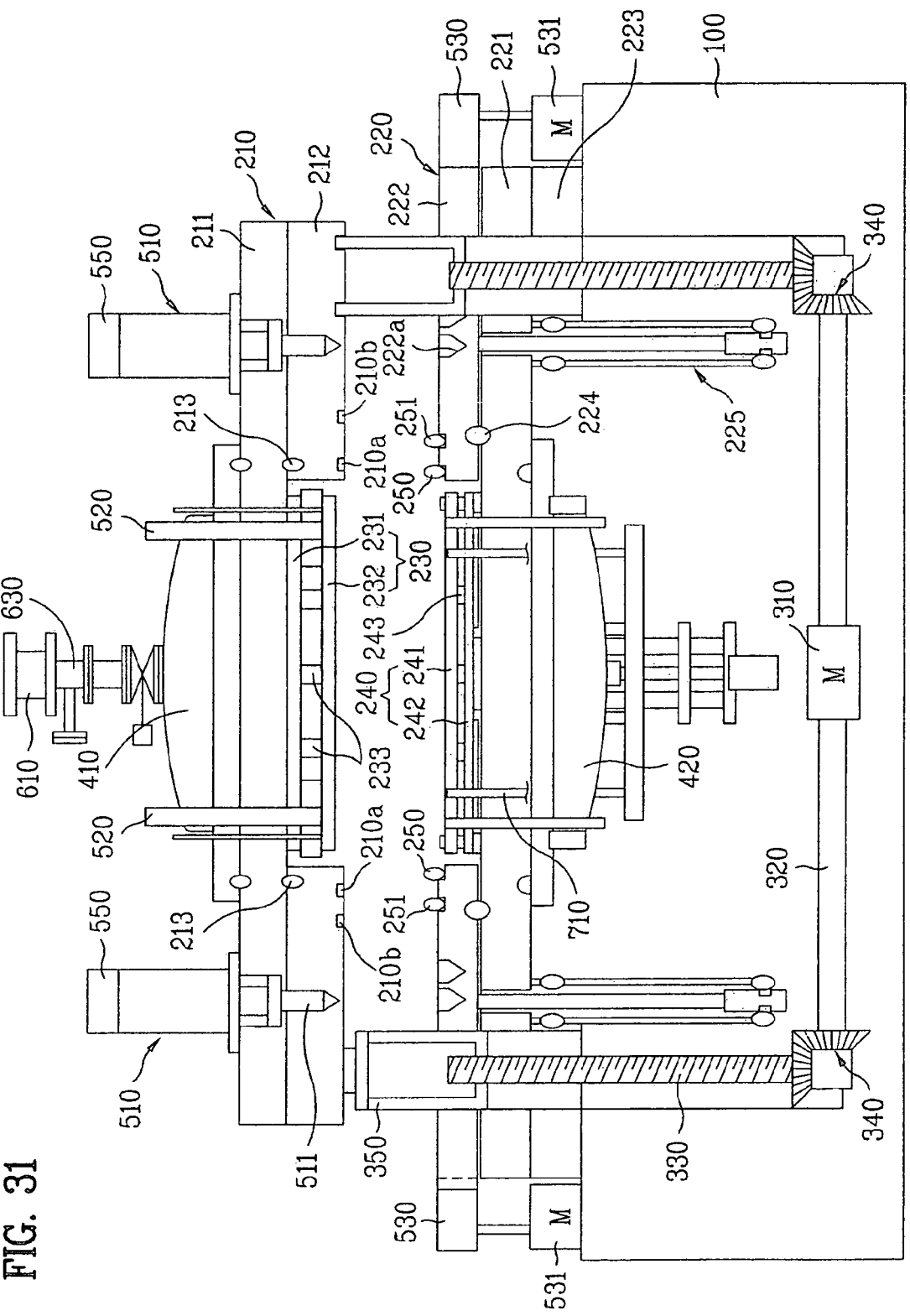
FIG. 31 illustrates a schematic view of a substrate bonding apparatus used in fabricating LCD devices according to a third embodiment of the present invention.

FIG. 31 illustrates a schematic view of a substrate bonding apparatus used in fabricating LCD devices according to a third embodiment of the present invention.

Referring to FIG. 31, the substrate bonding apparatus according to the third embodiment of the present invention may, for example, comprise substantially the same structure as the substrate bonding apparatus described above with respect to the second embodiment. The substrate bonding apparatus according to the third embodiment, however, may further include at least one auxiliary sealing member 251 and at least one second interval control groove 210b.

In one aspect of the present invention, the at least one auxiliary sealing member 251 may be arranged on the surface of the lower chamber plate 222 and spaced apart from the central sealing member 250 by a predetermined distance. In another aspect of the present invention, the second interval control groove 210b may be arranged within the bottom surface of the upper chamber plate 212 in correspondence with the auxiliary sealing member 251. In still another aspect of the present invention, the first interval control groove 210b may be spaced apart from the first interval control groove 210a by a predetermined distance. In yet another aspect of the present invention, the distance between the first and second interval control grooves 210a and 210b may be substantially equal to the distance between the central and auxiliary sealing members 250 and 251. In still a further aspect of the present invention, the auxiliary sealing member 251 may be arranged on the surface of the upper chamber plate 212 while the second interval control groove 210b may be arranged within the upper surface of the lower chamber plate 222 in correspondence with the auxiliary sealing member 251.

According to the principles of the present invention, the central sealing member 250 may degrade due to repeated contact with the upper chamber plate 222. Accordingly, the auxiliary sealing member 251 may help maintain a desired distance between the upper and lower chamber plates 212 and 222, ensure proper bonding of the first and second substrates, and assist in sealing the interior space, defined by the upper and lower chamber units 210 and 220, from the external environment. Similar to the number, arrangement, and height of the first interval control groove 210a within the upper chamber plate 212, the number, arrangement, and height of the second interval control grooves 210b within the upper chamber plate may correspond to the thickness of the substrates to be bonded and the number and arrangement of the auxiliary sealing members 251. In one aspect of the present invention, the substrate bonding apparatus may be provided with one auxiliary sealing member 251 and one second interval control groove 210b.

Figure 32:
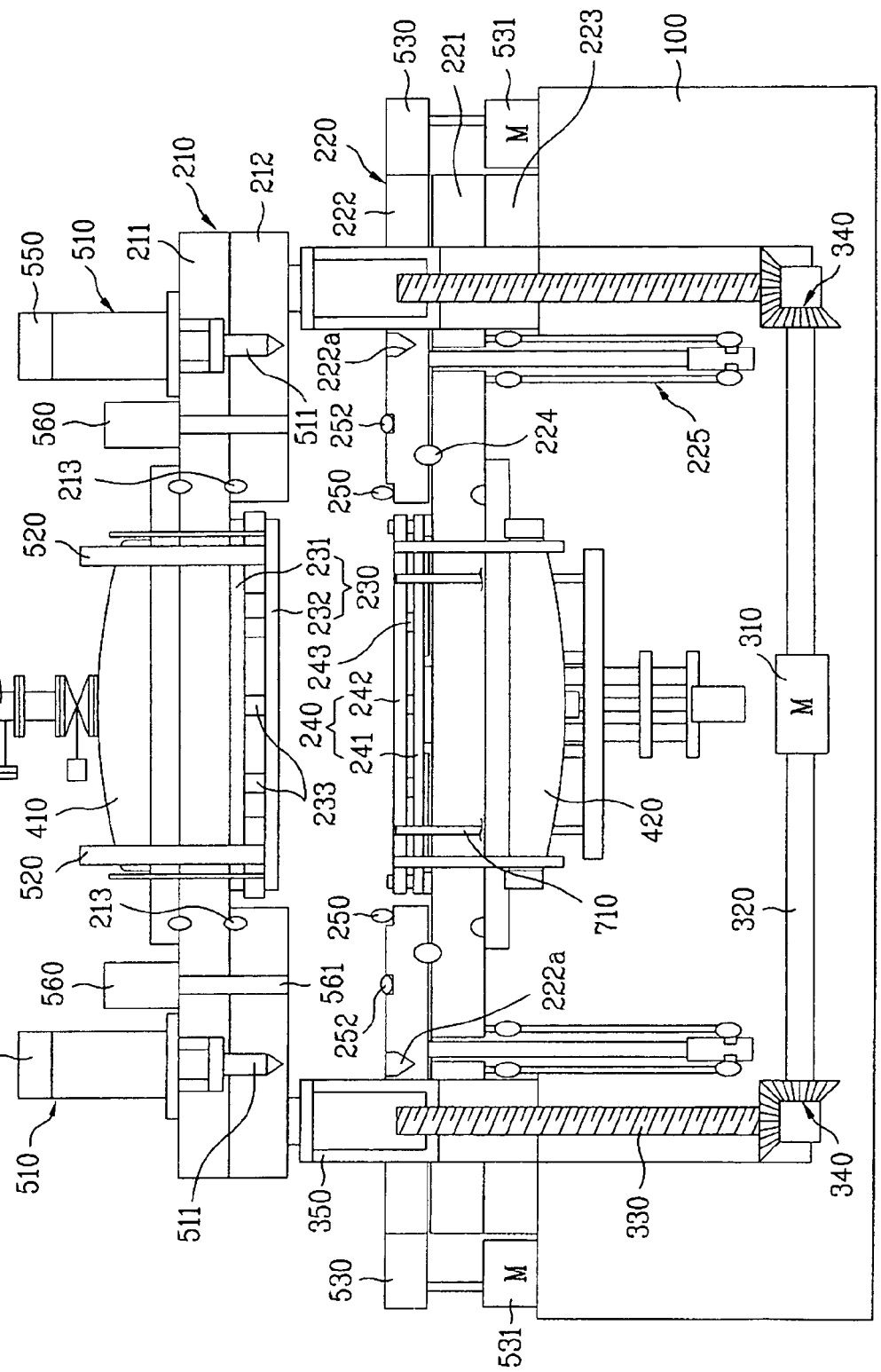
FIG. 32 illustrates a schematic view of a substrate bonding apparatus used in fabricating LCD devices according to a fourth embodiment of the present invention.

FIG. 32 illustrates a schematic view of a substrate bonding apparatus used in fabricating LCD devices according to a fourth embodiment of the present invention.

Referring to FIG. 32 the substrate bonding apparatus according to a fourth embodiment of the present invention may, for example, comprise substantially the same structure as the substrate bonding apparatus described above with respect to the first embodiment. The substrate bonding apparatus according to the fourth embodiment, however, may control the bonding distance between the upper and lower stages 230 and 240 with greater accuracy than the substrate bonding apparatus described, for example, with respect to the second embodiment of the present invention.

For example, the substrate bonding apparatus of the present invention may include an interval control means having a first end and a second end, wherein the first end may be fixed to one of the upper or lower chamber units 210 or 220, and wherein the second end may be raised or lowered to push the other of the upper and lower chamber units. Using the interval control means, the bonding distance between the stages upper and lower stages 230 and 240 may be accurately controlled.

According to the principles of the present invention, the interval control means may, for example, include a moving part 560 fixed to the upper base 211 and coupled to a second shaft 561, wherein the second actuator 560 may raise and lower a respective second shaft 561 with respect to the upper chamber unit 210. In one aspect of the present invention, the moving part 560 may comprise a second actuator, a step motor, a linear motor, or other device capable of moving the second shaft 561 minute distances.

In one aspect of the present invention, an end portion of each second shaft 561 may contact a surface of the lower chamber plate 222. In another aspect of the present invention, an interval sealing member 252 may be arranged on the surface of the lower chamber plate 222 in correspondence with the arrangement of a respective second shaft 561 for preventing the surface of the lower chamber plate 222 from being damaged upon contacting the second shaft 561.

According to the principles of the present invention, the second shaft 561 may be lowered a predetermined distance relative to the upper chamber unit 210. In one aspect of the present invention, the amount the second shaft 561 is lowered corresponds to the determined thickness of the substrates to be bonded. For example, the second shaft 561 may initially be arranged within the upper chamber unit 210 such that an end portion of the second shaft 561 does not protrude from the bottom surface of the upper chamber plate 212. Subsequently, the second shaft 561 may be lowered to protrude a predetermined distance from the bottom surface of the upper chamber plate 212. By lowering the second shaft 561, with respect to the upper chamber unit 210, the accuracy with which the upper and lower stages 230 and 240 may be spaced apart from each other may be increased.

Figure 33:
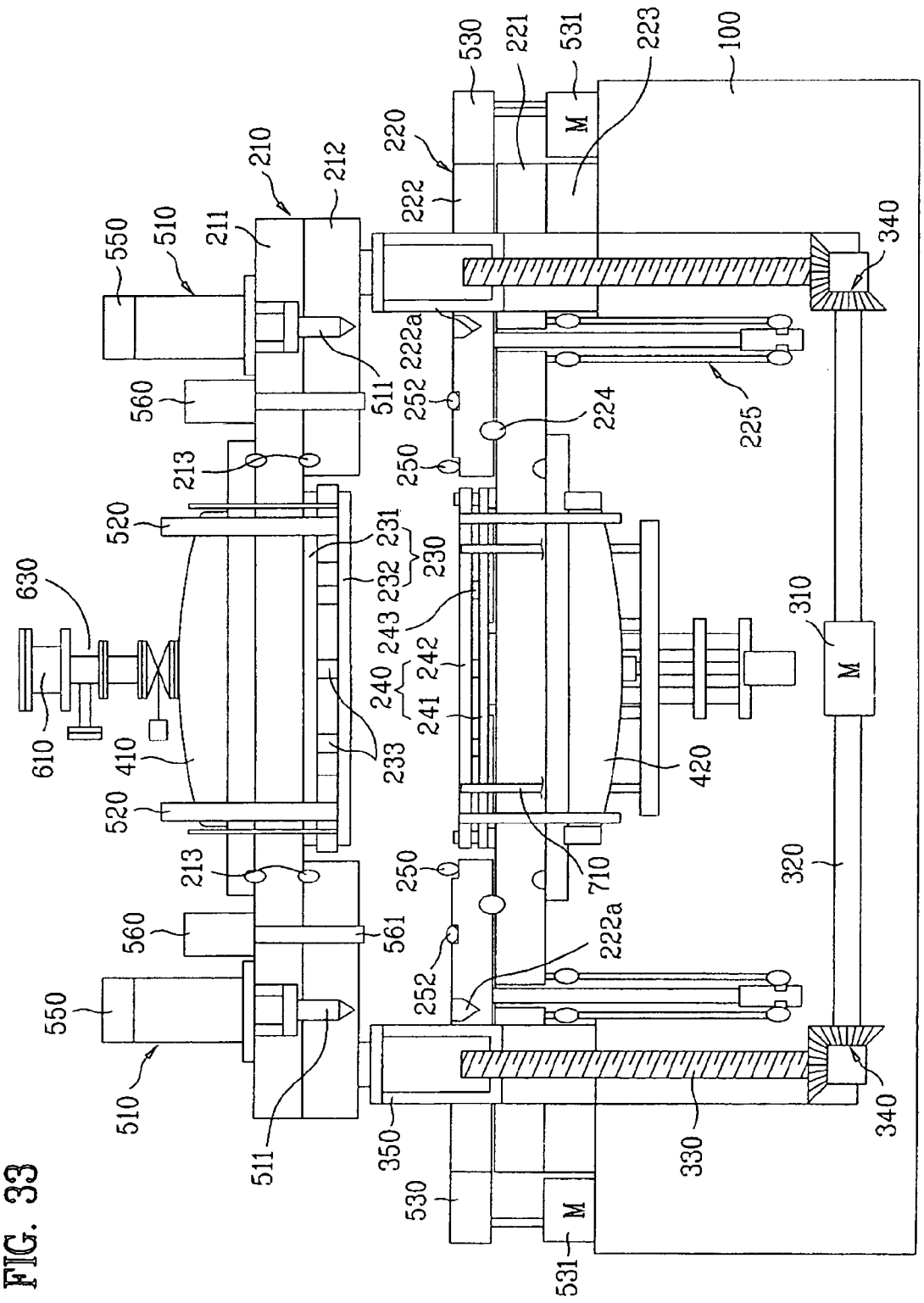
FIGS. 33 and 34 illustrate an operation of the substrate bonding apparatus used in fabricating LCD devices according to the fourth embodiment of the present invention.

Having described the substrate bonding apparatus according to the fourth embodiment of the present invention, a method of fabricating LCD devices using the substrate bonding apparatus shown in FIG. 32 will now be described in greater detail with reference to FIGS. 33 and 34.

Prior to loading any substrate within the substrate bonding apparatus of the fourth embodiment of the present invention, the thickness of the first and second substrates may be determined. In one aspect of the present invention, the thicknesses of the first and second substrates may be determined substantially as disclosed above with respect to the second embodiment. Based on the determined thickness of the first and second substrates, the predetermined distance to which to lower the second shaft 561 is determined. Accordingly, and referring to FIG. 33, the moving part 560 may lower the second shaft 561, enabling the end portion of the second shaft 561 to protrude from the bottom surface of the upper chamber plate 212 by the predetermined distance.

After the second shafts 561 have been lowered, the first and second substrates may be loaded into the substrate bonding apparatus of the fourth embodiment of the present invention. After the loading process is complete, the upper and lower stages 230 and 240 may be leveled with respect to each other via the aforementioned first alignment means and the upper and lower chamber units 210 and 220 may be joined together via the aforementioned chamber moving means. In one aspect of the present invention, the upper and lower stages and chamber units may be leveled and joined together, respectively, in substantially the same manner as disclosed above with respect to the first embodiment of the present invention.

Figure 34:
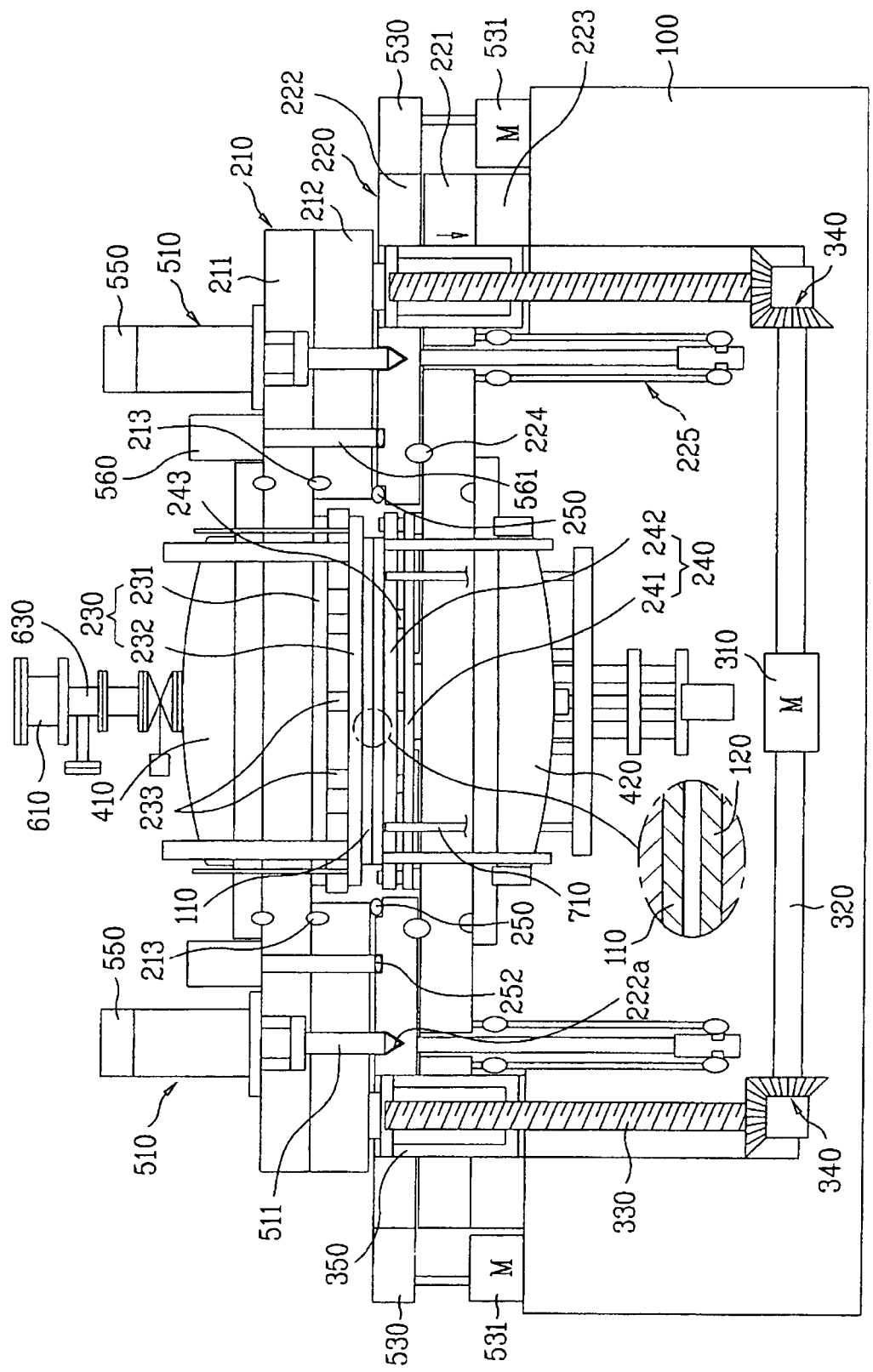

Referring to FIG. 34, after joining the upper and lower chamber units 210 and 220, the aforementioned interior space is defined, sealed from the exterior environment, and envelops the upper and lower stages 230 and 240 holding their respective first and second stages 110 and 120. Further, the second shaft 561, protruding the predetermined distance from the bottom surface of the upper chamber plate 212, contacts the interval sealing member 252 arranged on the upper surface of the lower chamber plate 222. As shown in FIG. 34, the first and second substrates 110 and 120, held within the interior space defined by the upper and lower chamber units 210 and 220, may be adhered to each other via sealant material (not shown) but not fully bonded. Before being fully bonded, the alignment of the first and second substrates 110 and 120 may be adjusted. Accordingly, even though the determined thickness may deviate from the reference thickness, the second shafts 561 and interval sealing members 252 enable the upper and lower stages 230 and 240 to be accurately spaced apart from each other to enable, for example, the alignment of the first and second substrates 110 and 120 within the sealed interior space.

After alignment of the first and second substrates 110 and 120 is complete, the interior space may be evacuated to a vacuum state and aligned substrate may be fully bonded. In one aspect of the present invention, the interior space may be evacuated substantially as described above with respect to the first embodiment. In another aspect of the present invention, the first and second substrates 110 and 120 may be fully bonded to each other as similarly described above with respect to the first embodiment. For example, during the bonding process described above with respect to the first embodiment, the chamber moving means may raise the upper chamber unit 210 to a predetermined height while maintaining contact between the central sealing member 250 and the upper chamber plate 212, as described above. However, according to the fourth embodiment, the interval control means may elevate the upper chamber unit 210 above the lower chamber unit 220. For example, the moving part 560 may be driven to project the second moving shaft 561 against the interval sealing member 252 to elevate the upper chamber unit 210 over the lower chamber unit 220. Moreover, the interval control means may elevate the upper chamber unit 210 above the lower chamber unit 220 to the predetermined height while maintaining contact between the central sealing member 250 and the upper chamber plate 212.

According to principles of the first to fourth embodiments of the present invention, the first substrate 110 may become contaminated with foreign material introduced from the upper surface of the substrate loader 910. Moreover, the foreign materials may become lodged within sealant material disposed over the first substrate 110, thereby degrading the quality of any LCD device fabricated using the substrate bonding apparatus of the first to fourth embodiments of the present invention.

Therefore, and with reference to FIGS. 35-40, a substrate bonding apparatus according to a fifth embodiment of the present invention may enable a substrate loader 910 to arrange first substrates 110 proximate the upper stage 230, wherein the substrate loader 910 contacts a surface of the first substrate 110 on which sealant material is not disposed.

Accordingly, the substrate bonding apparatus of the fifth embodiment of the present invention may be provided as a substrate bonding apparatus substantially as described above with reference to the first to fourth embodiments of the present invention and may further include, for example, at least one guiding groove 234 arranged within the surface of the holding plate 232 of the upper stage 230. In one aspect of the present invention, the number and arrangement of guiding grooves 234 corresponds to the number and arrangement of respective fingers 911 of the substrate loader 910, used in loading the first substrate 110 into the substrate bonding apparatus, so that each guiding groove 234 may receive a corresponding finger 911. In another aspect of the present invention, the aforementioned vacuum holes 232a and electrostatic chucks 232b may not be provided at the surface of the upper stage 230 where the guiding grooves 234 are formed.

Figure 35:
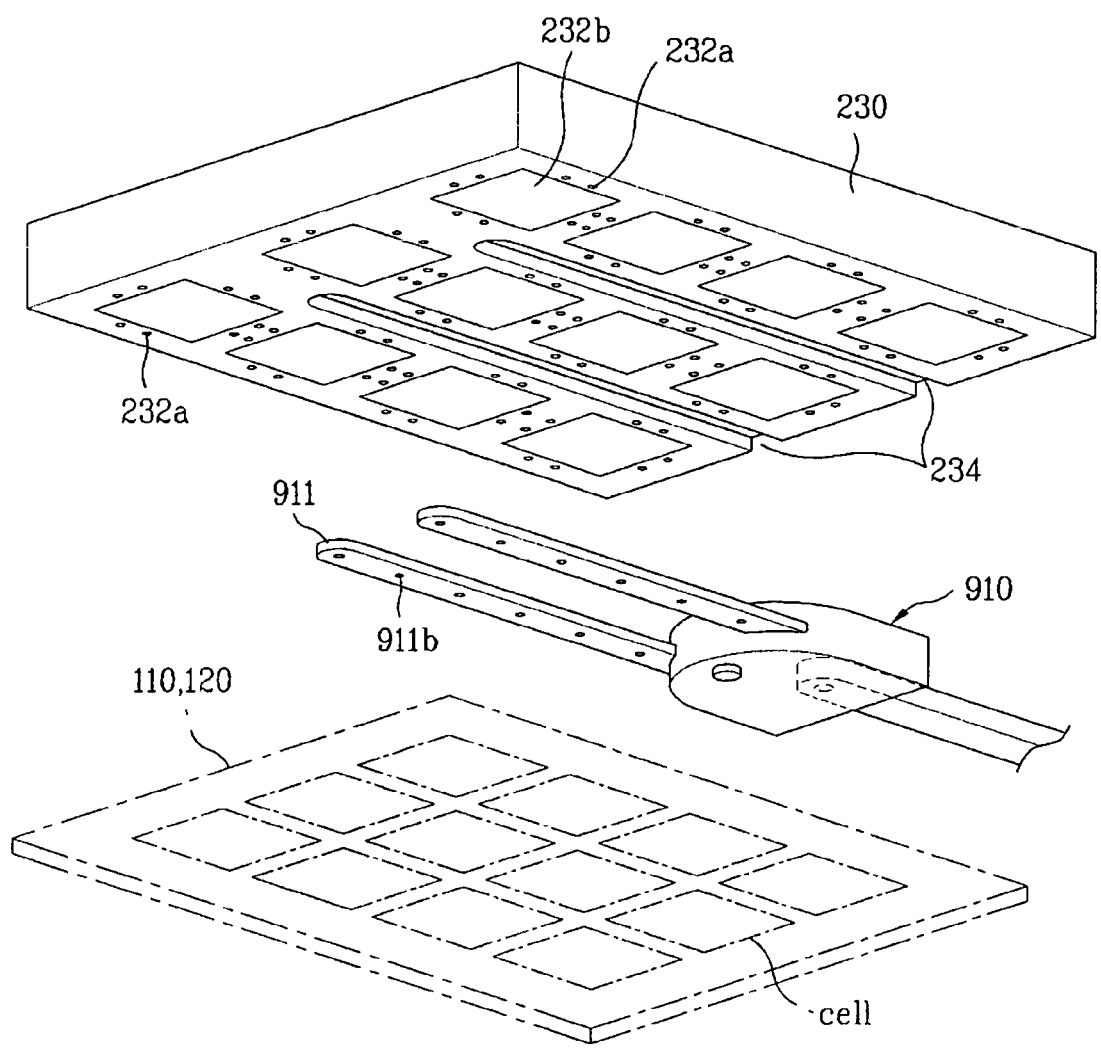
FIG. 35 illustrates a perspective view of a substrate loader and an upper stage of a substrate bonding apparatus used in fabricating LCD devices according to a fifth embodiment of the present invention.
Figure 36:
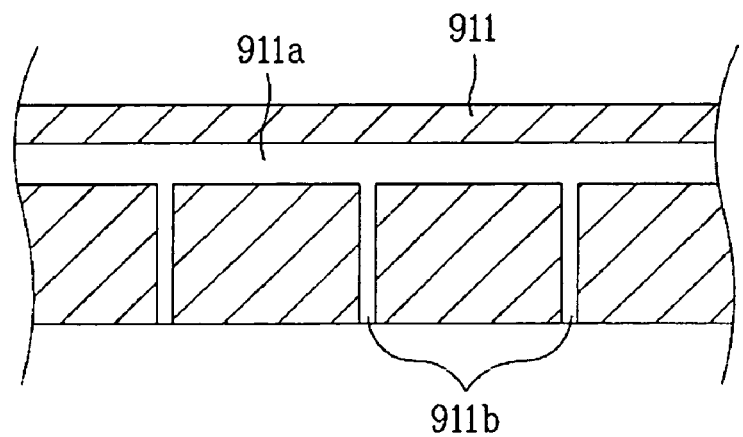
FIG. 36 illustrates a cross-sectional side view of fingers of the substrate loader of the substrate bonding apparatus used in fabricating LCD devices according to the fifth embodiment of the present invention.

Referring to FIGS. 35 and 36, each finger 911 may, for example, include a vacuum pipeline 911a and at least one first through-hole 911b in fluid communication with the vacuum pipeline 911a and intersecting a lower surface of the finger 911. Accordingly, the substrate loader 910 may arrange the first substrate 110 proximate the upper stage 230, wherein the first substrate is held by the substrate loader 910 such that the surface of the first substrate 110 on which the sealant is not disposed contacts the fingers 911 of the substrate loader 910. Moreover, since the fingers 911 may be received within the receiving grooves 234, control of the first substrate 110 may be smoothly transferred from the substrate loader 910 and the upper stage 230.

Having described the substrate bonding apparatus according to the fifth embodiment of the present invention, a method by which substrates may be loaded will now be described in greater detail with reference to FIGS. 37-40.

Figure 37:
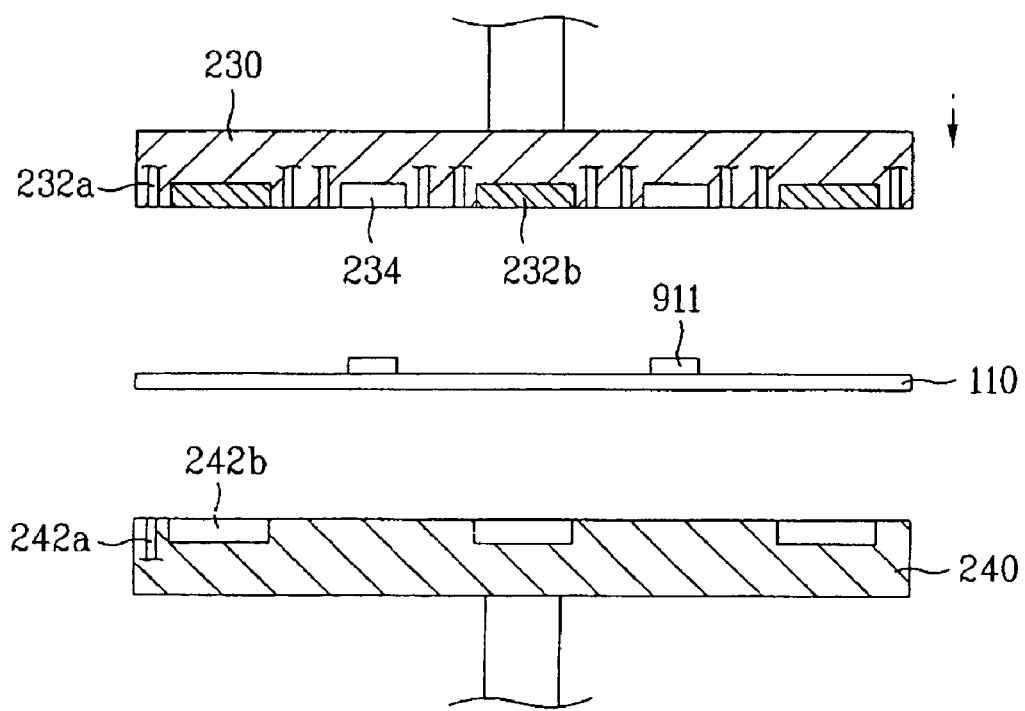
FIGS. 37 to 40 illustrate the loading of a first substrate into the substrate bonding apparatus used in fabricating LCD devices according to the fifth embodiment of the present invention.

Referring to FIG. 37, the substrate loader 910, holding an upper surface of the first substrate 110, may be arranged proximate the lower surface of the upper stage 230. In one aspect of the present invention, the substrate loader 910 may hold the first substrate 110 by transmitting a suction force generated by a vacuum pump (not shown) through the vacuum pipeline 911a to the first through-holes 911b.

Figure 38:
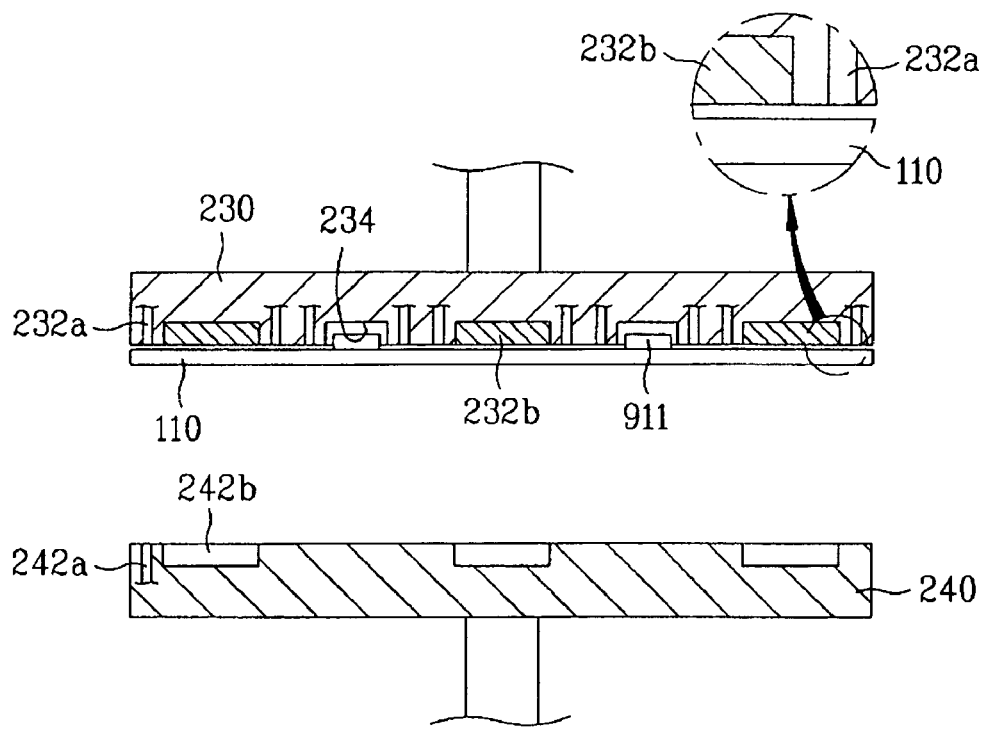

Referring to FIG. 38, upon arranging the substrate loader 910 proximate the lower surface of the upper stage 230, the upper stage 230 is lowered such that each finger 911 of substrate loader 910 is received into a corresponding guiding groove 234 and such that the first substrate 110 is arranged operably proximate the lower surface of the upper stage 230. Alternatively, the substrate loader 910 may be raised relative to the upper stage 230 such that each finger 911 of substrate loader 910 is received into a corresponding guiding groove 234 and the first substrate 110 is arranged operably proximate the lower surface of the upper stage 230.

Figure 39:
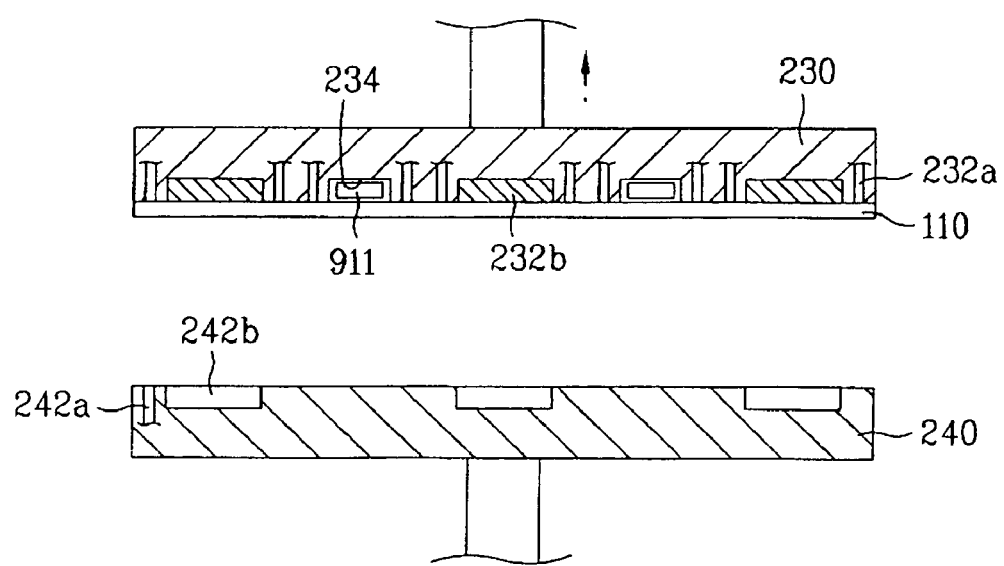

Next, referring to FIG. 39, after the first substrate 110 is arranged operably proximate the lower surface of the upper stage 230, the suction force may be transmitted by each vacuum hole 232a formed within the upper stage 230 such that the first substrate 110 is held to the lower surface of the upper stage 230. In one aspect of the present invention, the first substrate 110 may be held to the lower surface of the upper stage 230 using, for example, an electrostatic charge generated by the electrostatic chuck 232b. In another aspect of the present invention, after the suction force and/or ESC charge is transmitted/generated, the suction force transmitted by the first through-holes 911b of each finger 911 is released. After the first substrate 110 is held to the upper stage 230, each finger 911 may be removed from within the guiding groove 234 by horizontally moving the substrate loader 910 away from the upper stage 230.

Figure 40:
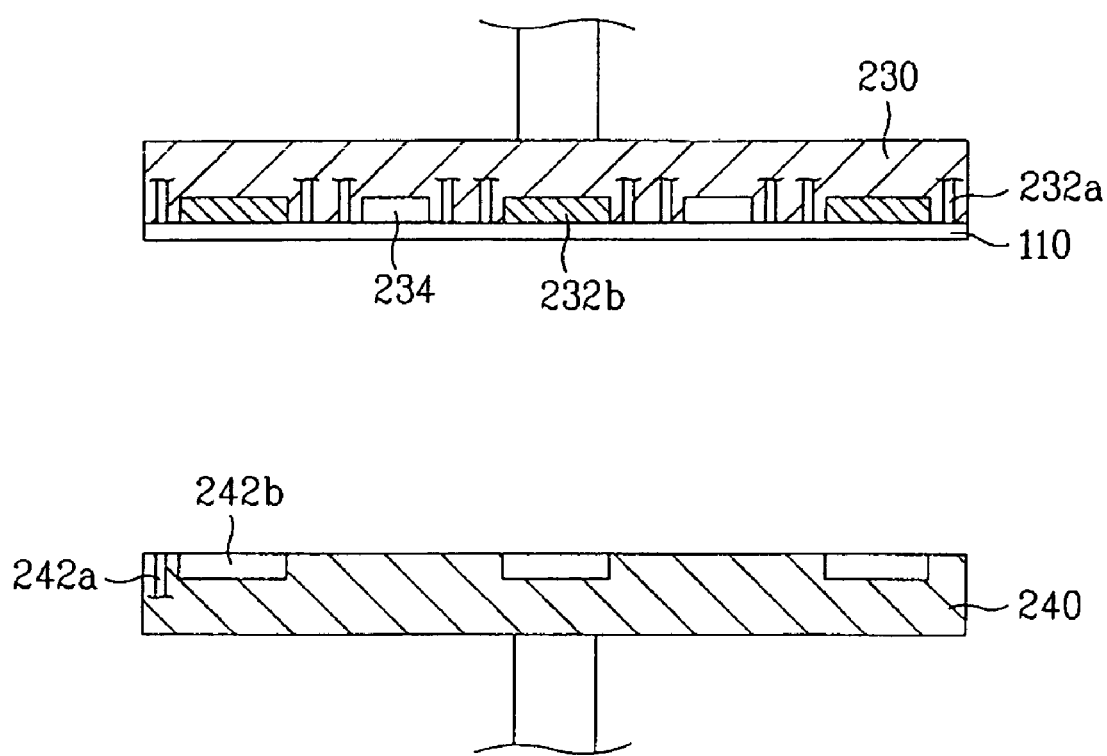

Referring to FIG. 40, the upper stage 230 holding the first substrate 110 may be raised to a predetermined height within the substrate bonding apparatus and the second substrate 120 may be loaded. In one aspect of the second substrate 120 may be loaded into the substrate bonding apparatus substantially as described above with respect to the first embodiment of the present invention. According to principles of the present invention, the loaded first and second substrates 110 and 120 may be bonded in substantially the same manner as described above with respect to the first embodiment of the present invention.

Figure 41:
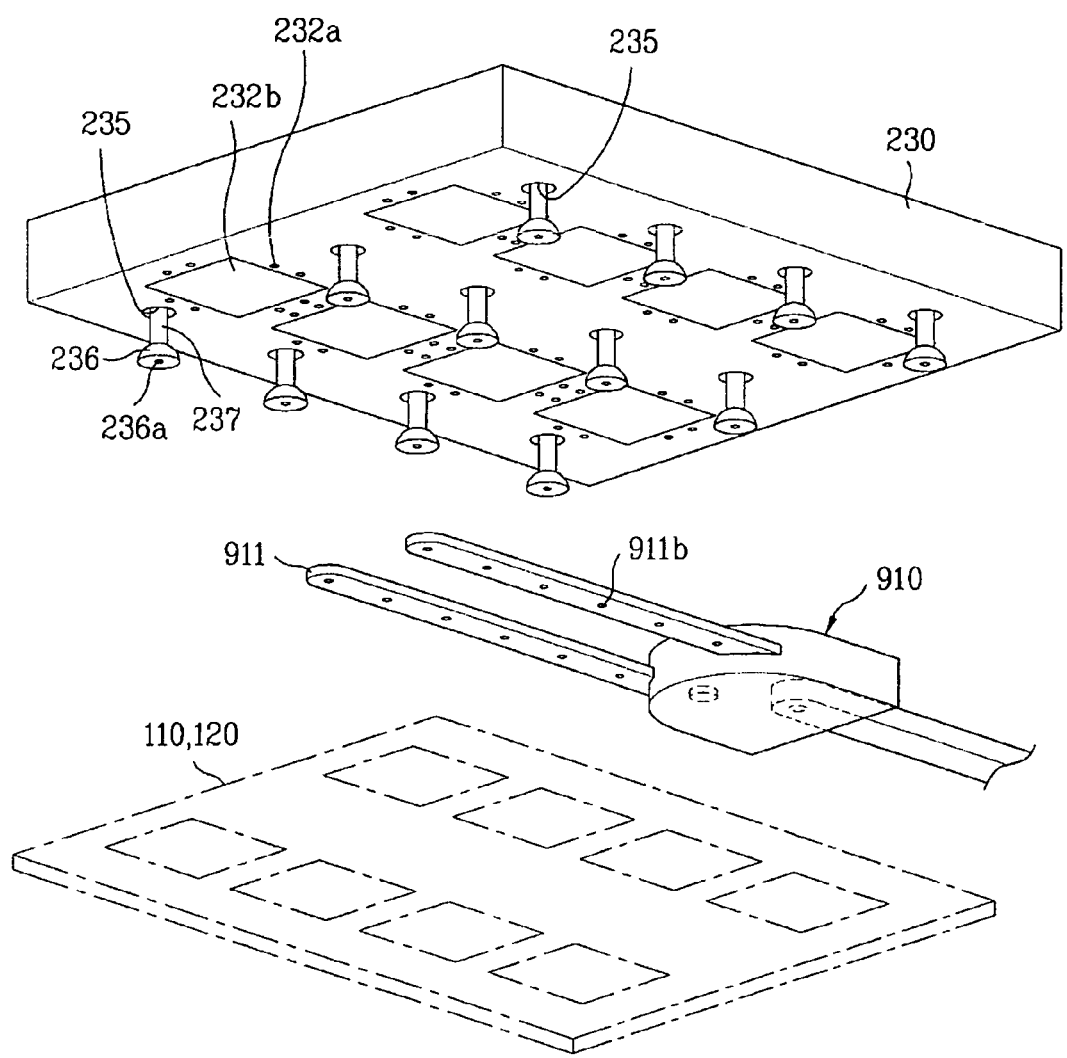
FIG. 41 illustrates a perspective view of a substrate loader part and an upper stage of a substrate bonding apparatus used in fabricating LCD devices according to a sixth embodiment of the present invention.

FIG. 41 illustrates a perspective view of a substrate loader and an upper stage of a substrate bonding apparatus used in fabricating LCD devices according to a sixth embodiment of the present invention.

Referring to FIGS. 41-46, a substrate bonding apparatus according to a sixth embodiment of the present invention may enable a substrate to be held to a lower surface of an upper stage without raising or lower either the upper stage or a substrate loader.

Accordingly, the substrate bonding apparatus of the sixth embodiment of the present invention may be provided as a substrate bonding apparatus substantially as described above with reference to the first to fourth embodiments of the present invention and may further include, for example, suction force transmitters arranged within passages 235 formed within the upper stage 230.

Figure 42:
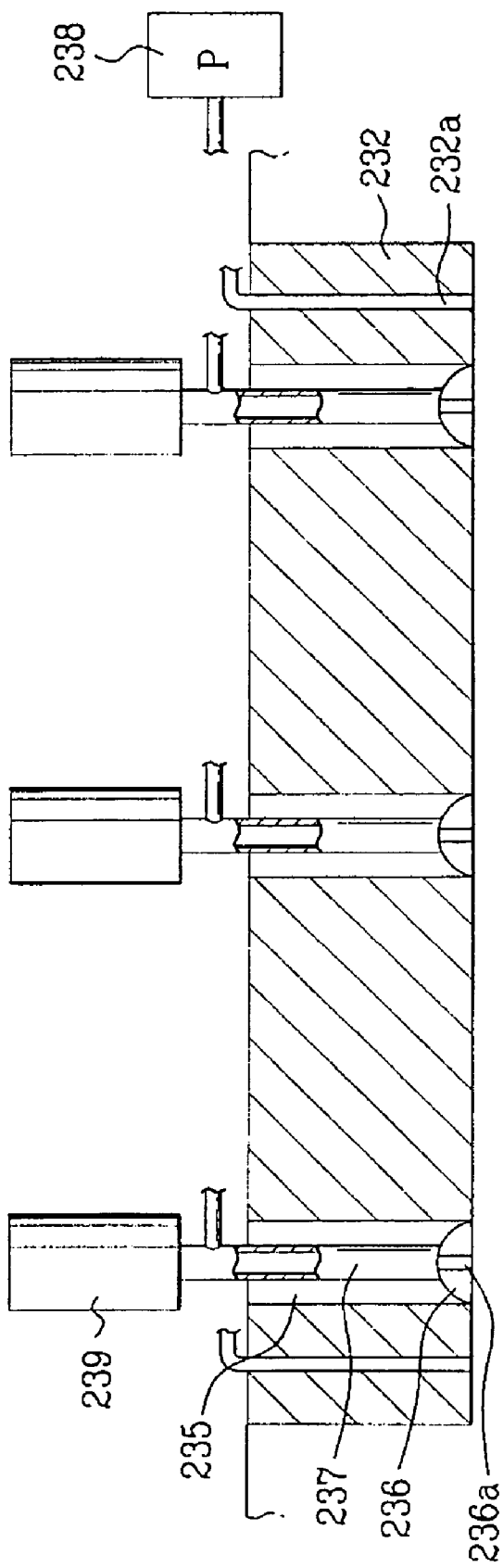
FIG. 42 illustrates a cross-sectional side view of the upper stage of the substrate bonding apparatus used in fabricating LCD devices according to the sixth embodiment of the present invention.

Referring to FIGS. 41 and 42, a plurality of passages 235 may be formed within the upper stage 230 and intersect the lower surface of the upper stage 230. In one aspect of the present invention, the suction force transmitters may be moveable within respective ones of the passages 235. According to the principles of the present invention, each suction force transmitter may, for example, include a pad 236, a moving pipeline 237, and a driving part 239. In one aspect of the present invention, each pad 236 may include at least one vacuum hole 236a for transmitting a suction force to an operably proximate portion of a substrate. In another aspect of the present invention, the moving pipeline 237 may be in fluid communication with each vacuum hole 236a within a respective pad 236. In still another aspect of the present invention, each moving pipeline 237 may raise or lower a respective pad 236 into and out of a respective passage 235. Further, each moving pipeline 237 may be in fluid communication with a vacuum pump 238, wherein the vacuum pump 238 may generate the aforementioned suction force. In one aspect of the present invention, the driving part 239 may, for example, be provided as any of an actuator, a step motor, a linear motor, and the like, wherein the moving pipeline 237 is an axis.

According to principles of the sixth embodiment of the present invention, the substrate loader 910 may be provided substantially as the substrate loader 910 described above with respect to the fifth embodiment of the present invention. For example, the substrate loader 910 may include a plurality of fingers 911 and a plurality of first through-holes 911b formed within each finger 911. In one aspect of the present invention, the guiding groove 234, described above with respect to the fifth embodiment of the present invention, may be provided within the lower surface of the upper stage 230. Accordingly, the aforementioned vacuum holes 232a and electrostatic chucks 232b may not be provided at the surface of the upper stage 230 where the guiding grooves 234 are formed.

Having described the substrate bonding apparatus according to the sixth embodiment of the present invention, a method by which substrates may be loaded will now be described in greater detail with reference to FIGS. 43-46.

Figure 43:
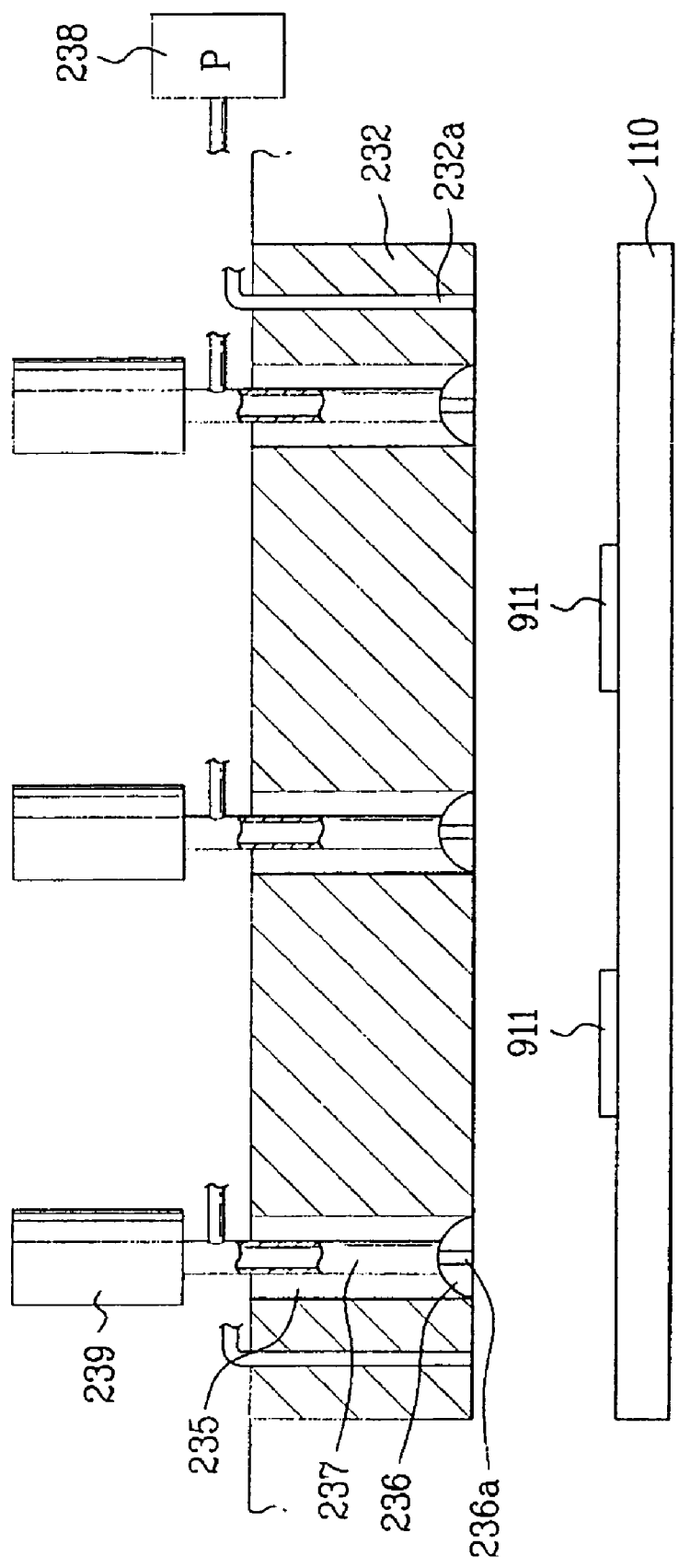
FIGS. 43 to 46 illustrate the loading of a first substrate into the substrate bonding apparatus used in fabricating LCD devices according to the sixth embodiment of the present invention.

Referring to FIG. 43, the substrate loader 910, holding an upper surface of the first substrate 110 (i.e., the surface of the first substrate 110 on which sealant material is not disposed), may be arranged proximate the lower surface of the upper stage 230.

Figure 44:
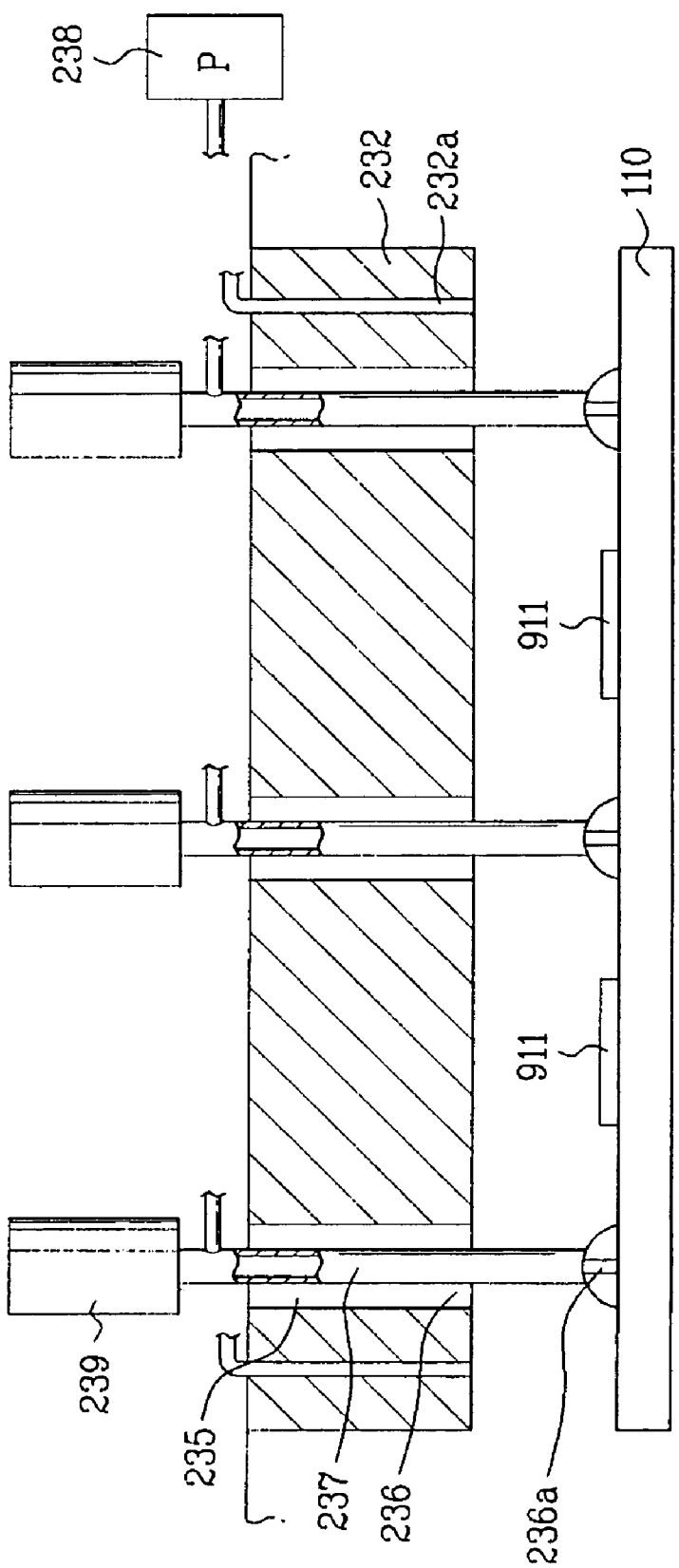

Referring to FIG. 44, upon arranging the substrate loader 910 proximate the lower surface of the upper stage 230, driving parts 239 may be driven to lower each pipeline 237 with respect to the upper stage 230. Upon lowering the moving pipelines 237, vacuum holes 236a within the pads 236 may be arranged operably proximate portions of first substrate 110. After each moving pipeline 237 has been lowered, the vacuum pump 238 may be driven to generate a suction force. Accordingly, the generated suction force may then be transmitted by each moving pipeline 237 to respective vacuum holes 236a of pads 236 to operably proximate portions of the first substrate 110. As a result, the first substrate 110 may be held to the pads 236 of the suction force transmitters. After the suction force is transmitted from the pads 236 to the first substrate 110, holding the first substrate 110 to the pads 236, the suction force transmitted by the first through-holes 911b of each finger 911 is released and the substrate loader 910 is moved away from the upper stage 230.

Figure 45:
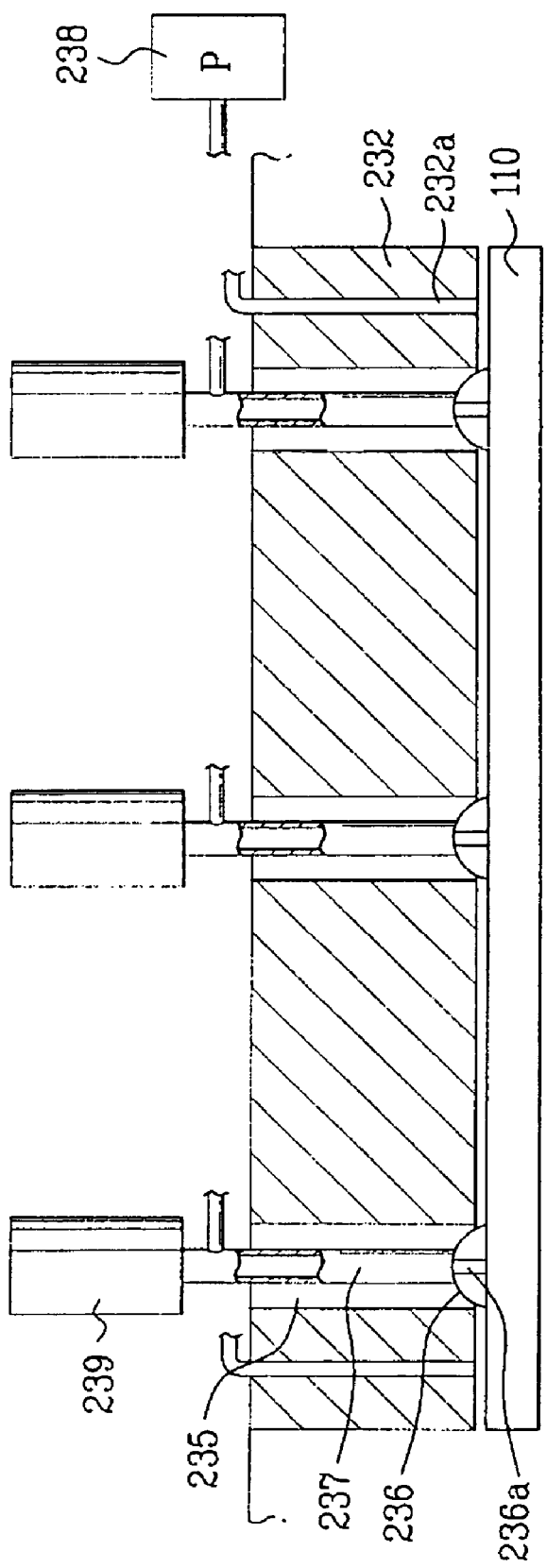
Figure 46:
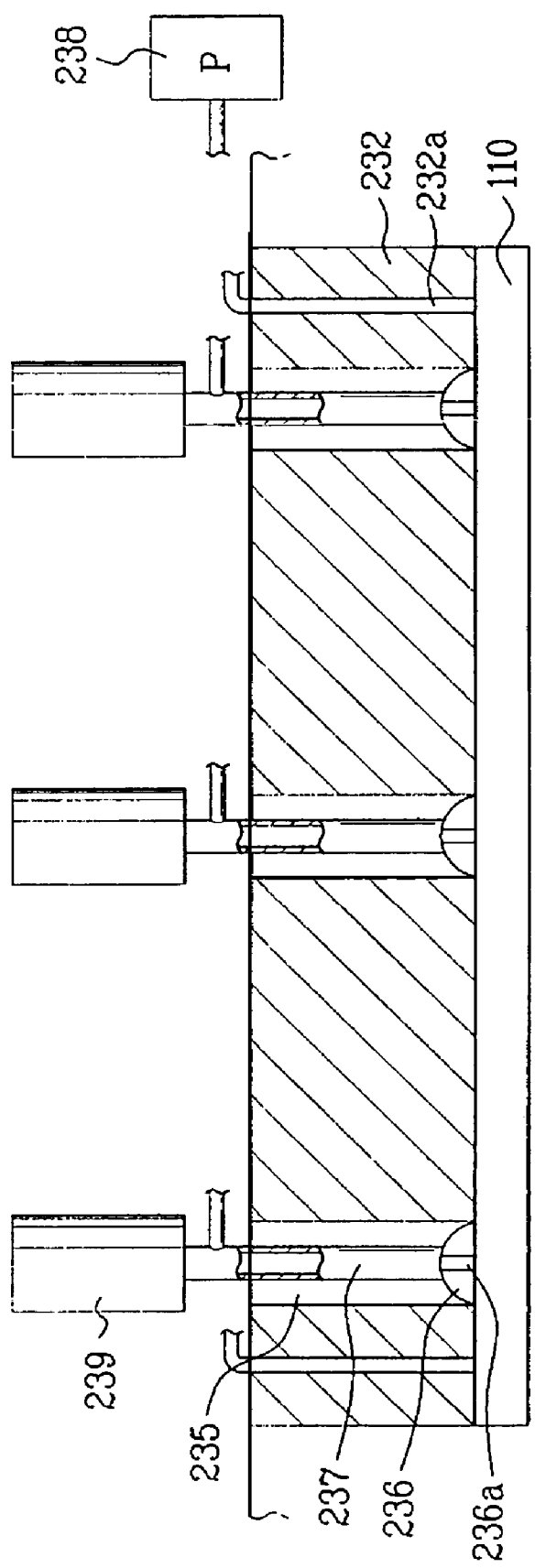

Referring to FIG. 45, each driving part 239 may be driven again to raise respective ones of the moving pipelines 237 by a predetermined distance. In one aspect of the present invention, the moving pipelines 237 may be raised such that a lower surface of each of the pads 236 is substantially flush with the lower surface of the upper stage 230. In other words, the moving pipelines 237 may be raised such that the first substrate 110 is held directly against the lower surface of the upper stage 230, as shown in FIG. 46. As further shown in FIG. 46, the suction force generated by the vacuum pump 238 may be transmitted by each vacuum hole 232a arranged within the upper stage 230. After the first substrate is raised to contact the lower surface of the upper stage 230, the suction force is cut off to the suction force transmitters, such that the first substrate 110 is held to the upper stage 230 only via the vacuum holes 232a and loading of the first substrate 110 is complete.

According to the principles of the present invention, the various concepts discussed above with respect to the aforementioned first to sixth embodiments may be combined in substantially any manner as desired.

Moreover, use of the substrate bonding apparatus described above with respect to the first to sixth embodiments is advantageous for the following reasons. First, the substrate bonding apparatus of the present invention is used only for bonding substrates together. Accordingly, the size of the substrate bonding apparatus of the present invention may be smaller than related art substrate bonding apparatuses. Second, the substrate bonding apparatus of the present invention may efficiently and accurately align substrates. Third, the interior space defined by the connected upper and lower chamber units may be substantially sealed from the external environment, preventing foreign material from entering into the interior space. Fourth, the volume of the interior space within which the substrates are bonded may be minimized, thereby minimizing the amount of time required to evacuate the interior space prior to bonding. Fifth, the interior space may remain sealed via the auxiliary sealing member even when the central sealing member becomes excessively worn. Sixth, the bonding distance between the upper and lower stages may be accurately controlled in accordance with a determined thickness of the substrates to be bonded. Seventh, fingers of the substrate loader may be prevented from contacting the surfaces of substrates on which sealant material is disposed. Accordingly, sealant material disposed on a substrate may be prevented from becoming contaminated by foreign material introduced by a substrate loader.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A substrate bonding apparatus used in fabricating LCD devices, comprising:
  a base frame;
  an upper chamber unit;
  a lower chamber unit mounted to the base frame, wherein the lower chamber unit is selectively connectable with the upper chamber unit;
  chamber moving means for raising and lowering the upper chamber unit;
  an upper stage mounted to the upper chamber unit;
  a lower stage mounted to the lower chamber unit;
  sealing means provided to a surface of one of the upper or lower chamber units;
  first alignment means for leveling the upper stage with respect to the lower stage; and
  second alignment means for horizontally aligning the upper stage with respect to the lower stage, and
  at least one receiving groove arranged within an upper surface of the lower chamber unit for receiving a respective first shaft, wherein the first alignment means includes:
    at least one first actuator fixed to the upper chamber unit;

at least one first shaft fixed to a respective first actuator, wherein an end portion of the first shaft is moveable with respect to the upper chamber unit; and sensing means for sensing a contact between each first shaft and the lower chamber unit.

2. The substrate bonding apparatus of claim 1, wherein the sealing means seals an interior space from an external environment, wherein the interior space is definable by connected ones of the upper and lower chamber units.

3. The substrate bonding apparatus of claim 2, wherein the upper and lower stages are arrangeable within the interior space; and the sealing means includes a central sealing member, wherein the central sealing member defines the lateral boundary of the interior space.

4. The substrate bonding apparatus of claim 3, wherein the central sealing member includes an elastic material.

5. The substrate bonding apparatus of claim 3, wherein the first seal member includes an O-ring.

6. The substrate bonding apparatus of claim 1, wherein the sensing means includes a load cell provided in each first actuator.

7. The substrate bonding apparatus of claim 1, further comprising a plurality of first actuators arranged at corners of the upper chamber unit.

8. The substrate bonding apparatus of claim 1, wherein dimensions of the receiving groove conform substantially to dimensions of the end portion of the first shaft.

9. The substrate bonding apparatus of claim 8, wherein the end portion of the first shaft includes a conical tapered structure.

10. The substrate bonding apparatus of claim 1, wherein the upper chamber unit comprises:

an upper base movably coupled to the base frame; and an upper chamber plate immovably coupled to a bottom peripheral surface of the upper base.

11. The substrate bonding apparatus of claim 10, wherein the upper chamber plate defines an upper space; and the upper stage is connected to the upper base within the upper space.

12. The substrate bonding apparatus of claim 1, wherein the lower chamber unit comprises:

a lower base immovably coupled to the base frame; and a lower chamber plate movably arranged over an upper surface of the lower base.

13. The substrate bonding apparatus of claim 12, wherein the lower chamber plate is horizontally moveable with respect to the lower base.

14. The substrate bonding apparatus of claim 12, wherein the lower chamber plate defines a lower space; and the lower stage is connected to the lower base within the lower space.

15. The substrate bonding apparatus of claim 1, wherein the chamber moving means includes:

a driving motor fixed to the base frame;

a driving shaft coupled to the driving motor;

a connecting part connected to the driving shaft;

a jack part connected to the upper chamber unit; and a connecting shaft including a first end connected to the jack part and a second end connected to receive a driving force translated by the connecting part.

16. The substrate bonding apparatus of claim 1, further comprising at least one guiding groove arranged within a lower surface of the upper stage, wherein fingers of a substrate loader are receivable within a respective guiding groove.

17. The substrate bonding apparatus of claim 16, wherein the upper stage includes:

a plurality of vacuum holes, wherein a suction force is transmittable by the plurality of vacuum holes; and a plurality of electrostatic chucks, wherein an electrostatic charge is generatable by the plurality of electrostatic chucks.

18. The substrate bonding apparatus of claim 17, wherein the at least one guiding groove does not comprise the vacuum holes.

19. The substrate bonding apparatus of claim 17, wherein the at least one guiding groove does not comprise the electrostatic chucks.

20. The substrate bonding apparatus of claim 1, further comprising:

at least one passage arranged within the upper stage and intersecting a lower surface of the upper stage; and a suction force transmitter arranged within each passage, the suction force transmitter including a transmission source that is projectable from within the passage to a predetermined distance from the lower surface of the upper stage, wherein a suction force is transmittable the predetermined distance from the lower surface of the upper stage.

21. A substrate bonding apparatus used in fabricating LCD devices, comprising:

a base frame;

an upper chamber unit;

a lower chamber unit mounted to the base frame, wherein the lower chamber unit is selectively connectable with the upper chamber unit;

chamber moving means for raising and lowering the upper chamber unit;

an upper stage mounted to the upper chamber unit;

a lower stage mounted to the lower chamber unit;

sealing means provided to a surface of one of the upper or lower chamber units;

first alignment means for leveling the upper stage with respect to the lower stage; and second alignment means for horizontally aligning the upper stage with respect to the lower stage, wherein the second alignment means includes:

at least one alignment camera;

a plurality of cams, wherein each cam is rotatably contactable to a portion of the lower chamber unit; and a plurality of restoring means connected between the lower base and the lower chamber unit.

22. The substrate bonding apparatus of claim 21, wherein the restoring means includes a coil spring.

23. A substrate bonding apparatus used in fabricating LCD devices, comprising:

a base frame;

an upper chamber unit;

a lower chamber unit mounted to the base frame, wherein the lower chamber unit is selectively connectable with the upper chamber unit;

chamber moving means for raising and lowering the upper chamber unit;

an upper stage mounted to the upper chamber unit;

a lower stage mounted to the lower chamber unit;

sealing means provided to a surface of one of the upper or lower chamber units;

first alignment means for leveling the upper stage with respect to the lower stage;

second alignment means for horizontally aligning the upper stage with respect to the lower stage; and at least one first interval control groove arranged within a surface of the other of the upper and lower chamber units to which the sealing means is provided for receiving the sealing means.

24. The substrate bonding apparatus of claim 23, wherein a depth of the first interval control groove within the other of the upper and lower chamber units to which the sealing means is provided varies in accordance with the distance of the first interval control groove from the center of the other of the upper and lower chamber units to which the sealing means is provided.

25. The substrate bonding apparatus of claim 23, wherein the sealing means includes a central sealing member having a predetermined thickness corresponding to a depth of the first interval control groove within the other of the upper and lower chamber units to which the sealing means is provided.

26. The substrate bonding apparatus of claim 25, wherein the central sealing member includes an elastic material.

27. The substrate bonding apparatus of claim 25, wherein the first seal member includes an O-ring.

28. The substrate bonding apparatus of claim 25, further comprising an auxiliary sealing member arranged within one of the upper and lower chamber units.

29. The substrate bonding apparatus of claim 28, wherein the auxiliary sealing member is spaced apart from the central sealing member by a predetermined distance.

30. The substrate bonding apparatus of claim 29, further comprising:
a second interval control groove arranged within a surface of the other of the upper and lower chamber units to which the auxiliary sealing member is provided.

31. The substrate bonding apparatus of claim 30, wherein the first interval control groove has a first depth within the other of the upper and lower chamber units to which the sealing means is provided; and
the second interval control groove has a second depth within the other of the upper and lower chamber units to which the auxiliary sealing member is provided, wherein the first depth is different from the second depth.

32. A substrate bonding apparatus used in fabricating LCD devices, comprising:
a base frame;
an upper chamber unit;
a lower chamber unit mounted to the base frame, wherein the lower chamber unit is selectively connectable with the upper chamber unit;
chamber moving means for raising and lowering the upper chamber unit;
an upper stage mounted to the upper chamber unit;
a lower stage mounted to the lower chamber unit;
sealing means provided to a surface of one of the upper or lower chamber units;
first alignment means for leveling the upper stage with respect to the lower stage;
second alignment means for horizontally aligning the upper stage with respect to the lower stage; and
interval control means fixed to one of the upper and lower chamber units for pushing against the other of the upper and lower chamber units to which the interval control means is fixed.

33. The substrate bonding apparatus of claim 32, wherein the interval control means includes:
at least one moving part fixed to the upper chamber unit; and
at least one second shaft coupled to the moving part, wherein the second shaft is movable with respect to the upper chamber unit for pushing against the lower chamber unit.

34. The substrate bonding apparatus of claim 33, wherein at least one moving part includes a linear actuator.

35. The substrate bonding apparatus of claim 33, wherein at least one moving part includes a step motor.

36. The substrate bonding apparatus of claim 33, wherein at least one moving part includes a linear motor.

37. The substrate bonding apparatus of claim 33, further comprising an interval sealing member arranged on the surface of the lower chamber unit, wherein the interval sealing member is contactable by the second shaft.

38. The substrate bonding apparatus of claim 37, wherein the interval sealing member is arranged within the surface of the lower chamber unit.

39. A substrate bonding apparatus used in fabricating LCD devices, comprising:
a base frame;
an upper chamber unit;
a lower chamber unit mounted to the base frame, wherein the lower chamber unit is selectively connectable with the upper chamber unit;
chamber moving means for raising and lowering the upper chamber unit;
an upper stage mounted to the upper chamber unit;
a lower stage mounted to the lower chamber unit;
sealing means provided to a surface of one of the upper or lower chamber units;
first alignment means for leveling the upper stage with respect to the lower stage, the first alignment means including an actuator fixed to the upper chamber unit and a shaft fixed to the actuator;
second alignment means for horizontally aligning the upper stage with respect to the lower stage;
a receiving groove arranged within an upper surface of the lower chamber unit for receiving the shaft;
at least one passage arranged within the upper stage and intersecting a lower surface of the upper stage; and
a suction force transmitter arranged within each passage, the suction force transmitter including a transmission source that is projectable from within the passage to a predetermined distance from the lower surface of the upper stage, wherein a suction force is transmittable the predetermined distance from the lower surface of the upper stage,
wherein the transmission source includes a pad having at least one through-hole, wherein a suction force is transmittable by the at least one through-hole; and
the suction force transmitter further includes:
a vacuum pump generating the suction force;
a pipeline in fluid communication with the at least one through-hole and the vacuum pump, wherein the pipeline is moveable within the passage; and
a driving part for moving the pipeline within the passage.

40. The substrate bonding apparatus of claim 39, wherein the driving part comprises an actuator; and
the pipeline is an axis of the actuator.

41. The substrate bonding apparatus of claim 39, wherein the driving part comprises a step motor; and
the pipeline is an axis of the step motor.

42. A substrate bonding apparatus used in fabricating LCD devices, comprising:
a base frame;
an upper chamber unit;

a lower chamber unit mounted to the base frame, wherein the lower chamber unit is selectively connectable with the upper chamber unit;
chamber moving means for raising and lowering the upper chamber unit;
an upper stage mounted to the upper chamber unit;
a lower stage mounted to the lower chamber unit;
sealing means provided to a surface of one of the upper or lower chamber units;
first alignment means for leveling the upper stage with respect to the lower stage, the first alignment means including an actuator fixed to the upper chamber unit and a shaft fixed to the actuator;
second alignment means for horizontally aligning the upper stage with respect to the lower stage;
a receiving groove arranged within an upper surface of the lower chamber unit for receiving the shaft;
at least one passage arranged within the upper stage and intersecting a lower surface of the upper stage;
a suction force transmitter arranged within each passage, the suction force transmitter including a transmission source that is projectable from within the passage to a predetermined distance from the lower surface of the upper stage, wherein a suction force is transmittable the predetermined distance from the lower surface of the upper stage; and
at least one guiding groove arranged within a lower surface of the upper stage, wherein fingers of a substrate loader are receivable within a respective guiding groove.

43. A substrate bonding apparatus for fabricating a liquid crystal display (LCD) device comprising:
a base frame;
an upper chamber unit, wherein the upper chamber unit includes an upper base and an upper chamber plate;
a lower chamber unit mounted to the base frame, wherein the lower chamber unit includes a lower base and a lower chamber plate, and wherein the lower chamber unit is selectively connectable with the upper chamber unit;
an upper stage mounted to the upper base;
a lower stage mounted to the lower base;
at least one first interval control groove arranged within a surface of one of the upper and lower chamber plates;
sealing means arranged within a surface of the other of the upper and lower chamber plates within which the at least one control groove is arranged; and
plate moving means for horizontally moving at least one chamber plate.

44. The substrate bonding apparatus of claim 43, wherein the upper base is movably coupled to the base frame; and the upper chamber plate is immovably coupled to a bottom peripheral surface of the upper base.

45. The substrate bonding apparatus of claim 43, wherein the lower base is immovably coupled to the base frame; and the lower chamber plate is movably arranged over an upper surface of the lower base.

46. The substrate bonding apparatus of claim 45, wherein the lower chamber plate is horizontally moveable with respect to the lower base.

47. The substrate bonding apparatus of claim 43, wherein the sealing means includes a central sealing member, wherein the central sealing member defines the lateral boundary of the interior space, and wherein the central sealing member is arranged opposite the first interval control groove.

48. The substrate bonding apparatus of claim 47, wherein the first interval control groove is arranged within a lower surface of the upper chamber plate; and
the central sealing member is arranged within an upper surface of the lower chamber plate.

49. The substrate bonding apparatus of claim 47, further comprising a second interval control groove arranged within the surface of the one of the upper and lower chamber plates.

50. The substrate bonding apparatus of claim 49, further comprising an auxiliary sealing member arranged on the surface of the other of the upper and lower chamber plates.

51. The substrate bonding apparatus of claim 50, wherein the auxiliary sealing member is arranged opposite the second interval control groove.

52. The substrate bonding apparatus of claim 50, wherein the first interval control groove has a first depth within the one of the upper and lower chamber units; and
the second interval control groove has a second depth within the one of the upper and lower chamber units, wherein the first depth is different from the second depth.

53. The substrate bonding apparatus of claim 50, wherein the first interval control groove is spaced apart from the second interval control groove by a predetermined distance.

54. The substrate bonding apparatus of claim 47, wherein a depth of the first interval control groove within the one of the upper and lower chamber plates varies in accordance with the distance of the first interval control groove from the center of the one of the upper and lower chamber plates.

55. The substrate bonding apparatus of claim 47, wherein the plate moving means is arranged operably proximate the lower chamber unit for horizontally moving the lower chamber plate.

56. The substrate bonding apparatus of claim 55, wherein the plate moving means includes:
a cam motor fixed to the base frame; and
a cam having eccentrically connect to the cam motor, wherein the cam is rotatably contactable to the lower chamber plate.

57. The substrate bonding apparatus of claim 47, further comprising interval control means fixed to one of the upper and lower chamber units for pushing against the other of the upper and lower chamber units on which the interval control means is fixed.

58. The substrate bonding apparatus of claim 57, wherein the interval control means is fixed to the upper chamber unit.

59. The substrate bonding apparatus of claim 58, wherein the interval control means includes:
at least one moving part fixed to the upper chamber unit; and
at least one second shaft coupled to the moving part, wherein the second shaft is movable with respect to the upper chamber unit for pushing against the lower chamber unit.

60. The substrate bonding apparatus of claim 59, wherein at least one second shaft is movable through the upper chamber plate.

61. The substrate bonding apparatus of claim 59, wherein at least one moving part includes a linear actuator.

62. The substrate bonding apparatus of claim 59, wherein at least one moving part includes a step motor.

63. The substrate bonding apparatus of claim 59, wherein at least one moving part includes a linear motor.

64. The substrate bonding apparatus of claim 59, further comprising an interval sealing member arranged on the surface of the lower chamber plate, wherein the interval sealing member is contactable by the second shaft.

65. The substrate bonding apparatus of claim 64, wherein the interval sealing member is arranged within the surface of the lower chamber plate.

66. The substrate bonding apparatus of claim 47, further comprising at least one guiding groove arranged within a lower surface of the upper stage, wherein fingers of a substrate loader are receivable within a respective guiding groove.

67. The substrate bonding apparatus of claim 66, wherein the upper stage includes:
a plurality of vacuum holes, wherein a suction force is transmittable by the plurality of vacuum holes; and
a plurality of electrostatic chucks, wherein an electrostatic charge is generatable by the plurality of electrostatic chucks.

68. The substrate bonding apparatus of claim 67, wherein the at least one guiding grooves does not comprise the vacuum holes.

69. The substrate bonding apparatus of claim 67, wherein the at least one guiding groove does not comprise the electrostatic chucks.

70. The substrate bonding apparatus of claim 47, further comprising:
at least one passage arranged within the upper stage and intersecting a lower surface of the upper stage; and
a suction force transmitter arranged within each passage, the suction force transmitter including a transmission source that is projectable from within the passage to a predetermined distance from the lower surface of the upper stage, wherein a suction force is transmittable the predetermined distance from the lower surface of the upper stage.

71. The substrate bonding apparatus of claim 70, wherein the transmission source includes a pad having at least one through-hole, wherein a suction force is transmittable by the at least one through-hole; and
the suction force transmitter further includes:
a vacuum pump generating the suction force;
a pipeline in fluid communication with the at least one through-hole and the vacuum pump, wherein the pipeline is moveable within the passage; and
a driving part for moving the pipeline within the passage.

72. The substrate bonding apparatus of claim 71, wherein the driving part comprises an actuator; and
the pipeline is an axis of the actuator.

73. The substrate bonding apparatus of claim 71, wherein the driving part comprises an step motor; and
the pipeline is an axis of the step motor.

74. The substrate bonding apparatus of claim 70, further comprising at least one guiding groove arranged within a lower surface of the upper stage, wherein fingers of a substrate loader are receivable within a respective guiding groove.

75. A substrate bonding apparatus for fabricating an LCD device comprising:
a base frame;
an upper chamber unit;
a lower chamber unit mounted to the base frame, wherein the lower chamber unit is selectively connectable with the upper chamber unit;
chamber moving means for raising and lowering the upper chamber unit;
an upper stage mounted to the upper chamber unit;
a lower stage mounted to the lower chamber unit;
first alignment means for leveling the upper stage with respect to the lower stage;
interval control means fixed to one of the upper and lower chamber units for pushing against the other of the upper and lower chamber units on which the interval control means is fixed; and
sealing means provided to a surface of one of the upper and lower chamber units.

76. The substrate bonding apparatus of claim 75, wherein the upper chamber unit comprises:
an upper base; and
an upper chamber plate coupled to the upper base; and
wherein the lower chamber unit comprises:
a lower base; and
a lower chamber plate arranged over the lower base.

77. The substrate bonding apparatus of claim 76, wherein the interval control means is fixed to the upper base.

78. The substrate bonding apparatus of claim 77, wherein the interval control means includes:
at least one moving part fixed to the upper base; and
at least one second shaft coupled to the moving part, wherein the second shaft is movable with respect to the upper chamber unit for pushing against the lower chamber plate.

79. The substrate bonding apparatus of claim 77, wherein at least one second shaft is movable through the upper chamber plate.

80. The substrate bonding apparatus of claim 79, wherein at least one moving part includes a linear actuator.

81. The substrate bonding apparatus of claim 79, wherein at least one moving part includes a step motor.

82. The substrate bonding apparatus of claim 79, wherein at least one moving part includes a linear motor.

83. The substrate bonding apparatus of claim 79, further comprising an interval sealing member arranged on the surface of the lower chamber plate, wherein the interval sealing member is contactable by the second shaft.

84. The substrate bonding apparatus of claim 83, wherein the interval sealing member is arranged within the surface of the lower chamber plate.

85. The substrate bonding apparatus of claim 75, wherein the first alignment means includes:
at least one receiving groove arranged within an upper surface of the lower chamber unit, wherein a center portion of each receiving groove is deeper within the lower chamber unit than peripheral portions of the receiving groove;
at least one linear actuator; and
at least one first shaft fixed to a respective linear actuator, wherein an end portion of the first shaft is movable with respect to the upper chamber unit, wherein the end portion of the first shaft is receivable within a corresponding receiving groove, and wherein dimensions of the end portion of the first shaft substantially conform to dimensions of the at least one receiving groove.

86. The substrate bonding apparatus of claim 75, wherein the chamber moving means includes:
a driving motor fixed to the base frame;
a driving shaft coupled to the driving motor;
a connecting part connected to the driving shaft;
a jack part connected to the upper chamber unit; and
a connecting shaft including a first end connected to the jack part and a second end connected to receive a driving force translated by the connecting part.

87. The substrate bonding apparatus of claim 75, further comprising at least one guiding groove arranged within a lower surface of the upper stage, wherein fingers of a substrate loader are receivable within a respective guiding groove.

88. The substrate bonding apparatus of claim 75, wherein the upper stage includes:
a plurality of vacuum holes, wherein a suction force is transmittable by the plurality of vacuum holes; and
a plurality of electrostatic chucks, wherein an electrostatic charge is generatable by the plurality of electrostatic chucks.

89. The substrate bonding apparatus of claim 88, wherein the at least one guiding groove does not comprise the vacuum holes.

90. The substrate bonding apparatus of claim 88, wherein the at least one guiding groove does not comprise the electrostatic chucks.

91. The substrate bonding apparatus of claim 75, further comprising:
at least one passage arranged within the upper stage and intersecting a lower surface of the upper stage; and
a suction force transmitter arranged within each passage, the suction force transmitter including a transmission source that is projectable from within the passage to a predetermined distance from the lower surface of the upper stage, wherein a suction force is transmittable the predetermined distance from the lower surface of the upper stage.

92. The substrate bonding apparatus of claim 91, wherein the transmission source includes a pad having at least one through-hole, wherein a suction force is transmittable by the at least one through-hole; and
the suction force transmitter further includes:
a vacuum pump generating the suction force;
a pipeline in fluid communication with the at least one through-hole and the vacuum pump, wherein the pipeline is moveable within the passage; and
a driving part for moving the pipeline within the passage.

93. The substrate bonding apparatus of claim 92, wherein the driving part comprises an actuator; and
the pipeline is an axis of the actuator.

94. The substrate bonding apparatus of claim 92, wherein the driving part comprises a step motor; and
the pipeline is an axis of the step motor.

95. The substrate bonding apparatus of claim 91, further comprising at least one guiding groove arranged within a lower surface of the upper stage, wherein fingers of a substrate loader are receivable within a respective guiding groove.

96. A substrate bonding apparatus for fabricating a liquid crystal display (LCD) device, comprising:
upper and lower chamber units;
an upper stage mounted to the upper chamber unit and including a lower surface and at least one guiding groove within the lower surface, wherein a finger of a substrate loader is receivable within the guiding groove;
a lower stage mounted to the lower chamber unit and arranged opposite the upper stage;
a sealing member arranged within a surface of one of the upper and lower chamber units; and
an interval control groove arranged within a surface of the other of the upper and lower chamber units, wherein at least a portion of the sealing member is receivable within the interval control groove.

97. The substrate bonding apparatus of claim 96, wherein the upper stage includes:
a plurality of vacuum holes, wherein a suction force is transmittable by the plurality of vacuum holes; and
a plurality of electrostatic chucks, wherein an electrostatic charge is generatable by the plurality of electrostatic chucks.

98. The substrate bonding apparatus of claim 97, wherein the at least one guiding groove does not comprise the vacuum holes.

99. The substrate bonding apparatus of claim 97, wherein the at least one guiding groove does not comprise the electrostatic chucks.

100. A fabricating apparatus for a liquid crystal display (LCD) device, comprising:
a base frame;
an upper chamber unit including an upper base and an upper chamber plate;
a lower chamber unit mounted to the base frame and including a lower base and a lower chamber plate;
a substrate loader including at least one finger, wherein an upper surface of a first substrate is fixable to the at least one finger;
an upper stage mounted to the upper base and including a lower surface and at least one guiding groove within the lower surface, wherein fingers of the substrate loader are receivable within a respective guiding groove, wherein the upper surface of the first substrate is contactable to the lower surface of the upper stage;
a lower stage mounted to the lower base and arranged opposite the upper stage;
a sealing member arranged within a surface of one of the upper and lower chamber units; and
an interval control groove arranged within a surface of the other of the upper and lower chamber units, wherein at least a portion of the sealing member is receivable within the interval control groove.

101. The fabricating apparatus for the LCD device of claim 100, wherein at least one finger comprises:
a vacuum pipeline; and
at least one first through-hole in fluid communication with the vacuum pipeline, wherein a suction force is transmittable by the at least one first through-hole to the upper surface of the first substrate.

102. A fabricating apparatus for a liquid crystal display (LCD) device, comprising:
upper and lower chamber units;
an upper stage mounted to the upper chamber unit and including a lower surface;
a lower stage mounted to the lower chamber unit and arranged opposite the upper stage;
at least one passage arranged within the upper stage and intersecting the lower surface of the upper stage;
a suction force transmitter arranged within each passage, the suction force transmitter having a transmission source that is projectable from within the passage to a predetermined distance from the lower surface, wherein a suction force is transmittable the predetermined distance from the lower surface of the upper stage;
a substrate loader including at least one finger, wherein the upper surface of the substrate is fixable to the at least one finger;
a sealing member arranged within a surface of one of the upper and lower chamber units; and an interval control groove arranged within a surface of the other of the upper and lower chamber units, wherein at least a portion of the sealing member is receivable within the interval control groove.

103. The fabricating apparatus for the LCD device of claim 102, wherein the transmission source includes a pad having at least one through-hole, wherein a suction force is transmittable by the at least one through-hole; and the suction force transmitter further includes:

a vacuum pump generating the suction force;

a pipe line in fluid communication with the at least one through-hole and the vacuum pump, wherein the pipeline is moveable within the passage; and a driving part for moving the pipeline within the passage.

104. The fabricating apparatus for the LCD device of claim 103, wherein the driving part comprises an actuator; and the pipeline is an axis of the actuator.

105. The fabricating apparatus of claim 103, wherein the driving part comprises a step motor; and the pipeline is an axis of the step motor.

* * * * *